United States Patent [19]

Sheridon

[11] Patent Number: 5,717,515
[45] Date of Patent: Feb. 10, 1998

[54] CANTED ELECTRIC FIELDS FOR ADDRESSING A TWISTING BALL DISPLAY

[75] Inventor: Nicholas K. Sheridon, Los Altos, Calif.

[73] Assignee: Xerox Corporation, Stamford, Conn.

[21] Appl. No.: 572,819

[22] Filed: Dec. 15, 1995

[51] Int. Cl.$^6$ .................................................. G02B 26/00
[52] U.S. Cl. .................. 359/296; 345/107; 345/111; 349/117; 349/188; 427/214
[58] Field of Search .................... 359/296, 298; 345/111, 107; 427/214, 282; 349/117, 188

[56] References Cited

U.S. PATENT DOCUMENTS

| | | | |
|---|---|---|---|
| Re. 34,942 | 5/1995 | Clark et al. | 349/188 |
| 4,126,854 | 11/1978 | Sheridon | 345/107 |
| 4,143,103 | 3/1979 | Sheridon | 264/4 |
| 4,261,653 | 4/1981 | Goodrich | 359/296 |
| 4,268,413 | 5/1981 | Dabisch | 252/408 |
| 4,299,880 | 11/1981 | Arens | 428/304 |
| 4,374,889 | 2/1983 | Arens | 428/207 |

(List continued on next page.)

OTHER PUBLICATIONS

Lawrence L. Lee, "A Magnetic Particles Display," *IEEE Transactions on Electron Devices*, vol. ED–22, No. 9, Sep. 1975, pp. 758–765.
Richard A. Strain, "Additive Color Mixture with Fluorescent Pigments and Special Illumination," *Color Research and Applications*, vol. 1, No. 3, Fall 1976, pp. 146–147.
*Business Wire* (available through Dialog, File 610), "S.I.P. and ETIP to jointly develop the world's first eraseable and reusable paper for printing," Aug. 19, 1991.
*IEEE Grid*, Jan. 1996, pp. 17–20 (includes article entitled "Electric Paper: A Research Odyssey" and corresponding calendar listing at p. 19).
Philip Yam, "Plastics Get Wired", *Scientific American*, Jul. 1995, pp. 82–87.
*OEP (Office Equipment and Products)*, "Thermal Film Medium from Ricoh Permits Rewriting", Dec. 1993, p. 610.
Peter Tebbutt, "Now you see it . . . now you don't", *New Scientist*, May 30, 1992, p. 17.
J.D. Mosley, "Flexible LCD is lighter and thinner than glass", *EDN*, Oct. 31, 1985, p. 93.
A. Chiang, D. Curry and M. Zarzycki, "A Stylus Writable Electrophoretic Display Device", *SID 79 Digest*, pp. 44–45.
N. K. Sheridon and M. A. Berkovitz, "The Gyricon–A Twisting Ball Display", *Proceedings of the SID*, vol 18/3 & 4, 1977, pp. 289–293.
R. Yamaguchi and S. Sato, "Light Scattering and Reflection Properties in Polymer Dispersed Liquid Crystal Cell with Memory Effects", *IEICE Trans. Electron.*, vol. E 78 C No. 1, Jan. 1995, pp. 106–110.

*Primary Examiner*—Loha Ben
*Attorney, Agent, or Firm*—Alexander E. Silverman

[57] ABSTRACT

A method for producing a canted electric field for an electrical twisting ball display device made up of electrically and optically anisotropic spheroidal balls rotatably disposed in a substrate. The display has an array of addressable elements, each array element including at least one spheroidal ball. According to the method, an array element is selected. A preferred direction of orientation is selected for balls of the selected array element, the direction of orientation forming an angle with a vector normal to a planar portion of the substrate surface in a vicinity of the selected array element, the angle being greater than 0 degree and less than 180 degrees. Balls of the selected array element are aligned with the preferred direction of orientation by applying an electric field in the vicinity of the selected array element, the electric field having an electric field vector oriented parallel to the selected preferred direction, thereby causing balls of the selected array element to rotate so as to align with the preferred direction of orientation. Also disclosed are: an electrode assembly for addressing a twisting ball display, capable of producing an electric field adjustable as to the direction of orientation of the field over a continuous angular range of directions; and a twisting ball apparatus incorporating this electrode assembly.

20 Claims, 32 Drawing Sheets

U.S. PATENT DOCUMENTS

| | | | |
|---|---|---|---|
| 4,418,098 | 11/1983 | Maistrovich | 427/161 |
| 4,438,160 | 3/1984 | Ishikawa et al. | 427/214 |
| 4,500,172 | 2/1985 | Gagnon et al. | 349/9 |
| 4,688,900 | 8/1987 | Doane et al. | 349/87 |
| 4,695,528 | 9/1987 | Dabisch et al. | 430/290 |
| 4,729,687 | 3/1988 | Arens | 401/198 |
| 4,810,431 | 3/1989 | Leidner | 264/15 |
| 4,837,071 | 6/1989 | Tagoku et al. | 428/195 |
| 4,877,253 | 10/1989 | Arens | 273/240 |
| 4,890,902 | 1/1990 | Doane et al. | 349/94 |
| 4,919,521 | 4/1990 | Tada et al. | 359/296 |
| 4,948,232 | 8/1990 | Lange | 349/142 |
| 4,991,941 | 2/1991 | Kalmanash | 349/33 |
| 4,994,204 | 2/1991 | Doane et al. | 252/299.01 |
| 5,075,186 | 12/1991 | Sheridon | 430/47 |
| 5,155,607 | 10/1992 | Inoue et al. | 359/51 |
| 5,157,011 | 10/1992 | Okabe et al. | 503/201 |
| 5,189,658 | 2/1993 | Moses | 369/100 |
| 5,219,820 | 6/1993 | Morohoshi et al. | 503/204 |
| 5,249,000 | 9/1993 | Okabe et al. | 346/151 |
| 5,251,048 | 10/1993 | Doane et al. | 345/87 |
| 5,262,098 | 11/1993 | Crowley et al. | 264/8 |
| 5,262,374 | 11/1993 | Okabe et al. | 503/201 |
| 5,274,460 | 12/1993 | Yamada et al. | 358/296 |
| 5,315,418 | 5/1994 | Sprague et al. | 349/112 |
| 5,344,594 | 9/1994 | Sheridon | 264/4 |
| 5,354,598 | 10/1994 | Arens | 428/195 |
| 5,363,222 | 11/1994 | Ledebuhr | 349/8 |
| 5,383,008 | 1/1995 | Sheridon | 355/256 |
| 5,384,067 | 1/1995 | Doane et al. | 252/299.01 |
| 5,389,426 | 2/1995 | Arens et al. | 428/195 |
| 5,389,945 | 2/1995 | Sheridon | 345/85 |
| 5,397,503 | 3/1995 | Yuasa et al. | 252/299.01 |
| 5,432,526 | 7/1995 | Hyatt | 345/87 |
| 5,432,534 | 7/1995 | Maruyama et al. | 347/172 |
| 5,469,020 | 11/1995 | Herrick | 313/511 |
| 5,515,075 | 5/1996 | Nakagiri et al. | 345/111 |
| 5,526,016 | 6/1996 | Nakagiri et al. | 345/111 |
| 5,570,214 | 10/1996 | Abileah et al. | 349/117 |

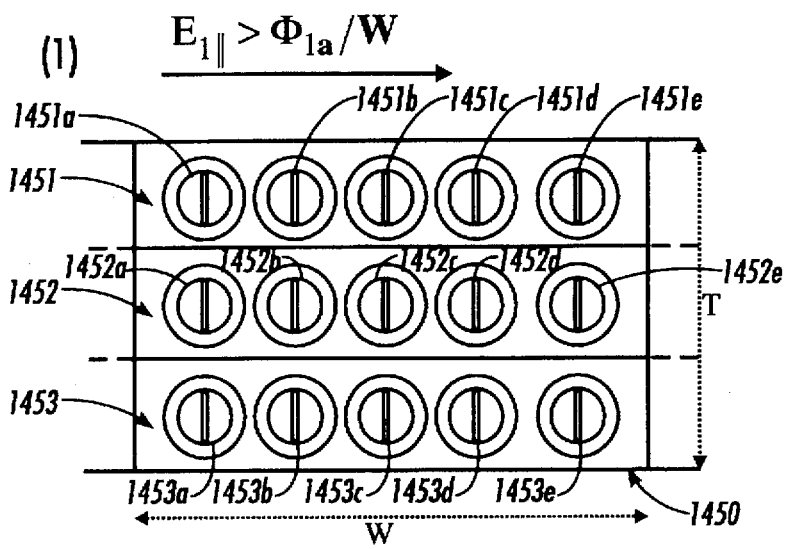
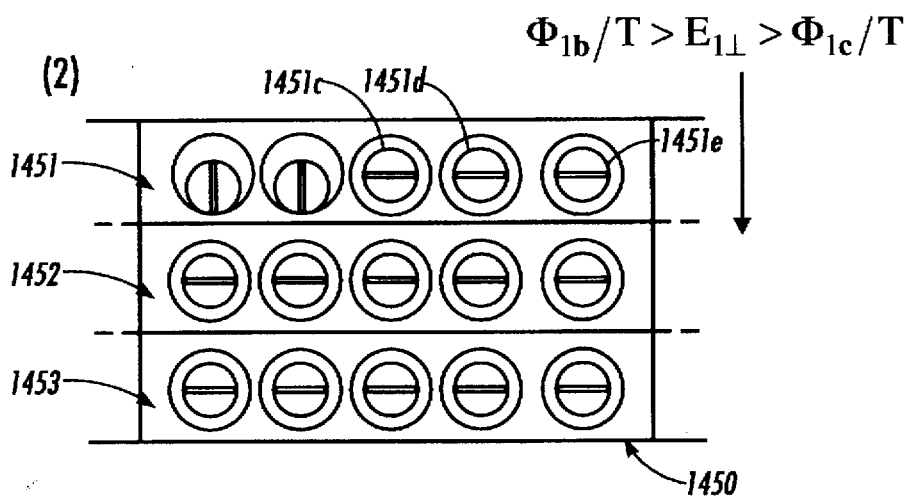
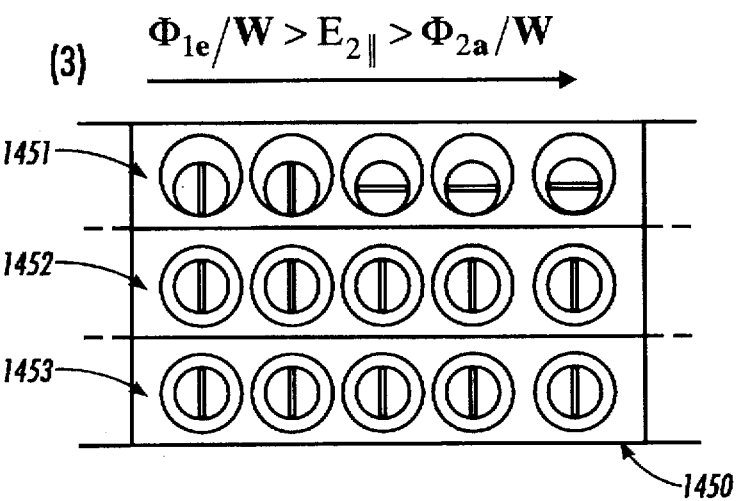
FIG. 14G (views 1-3)

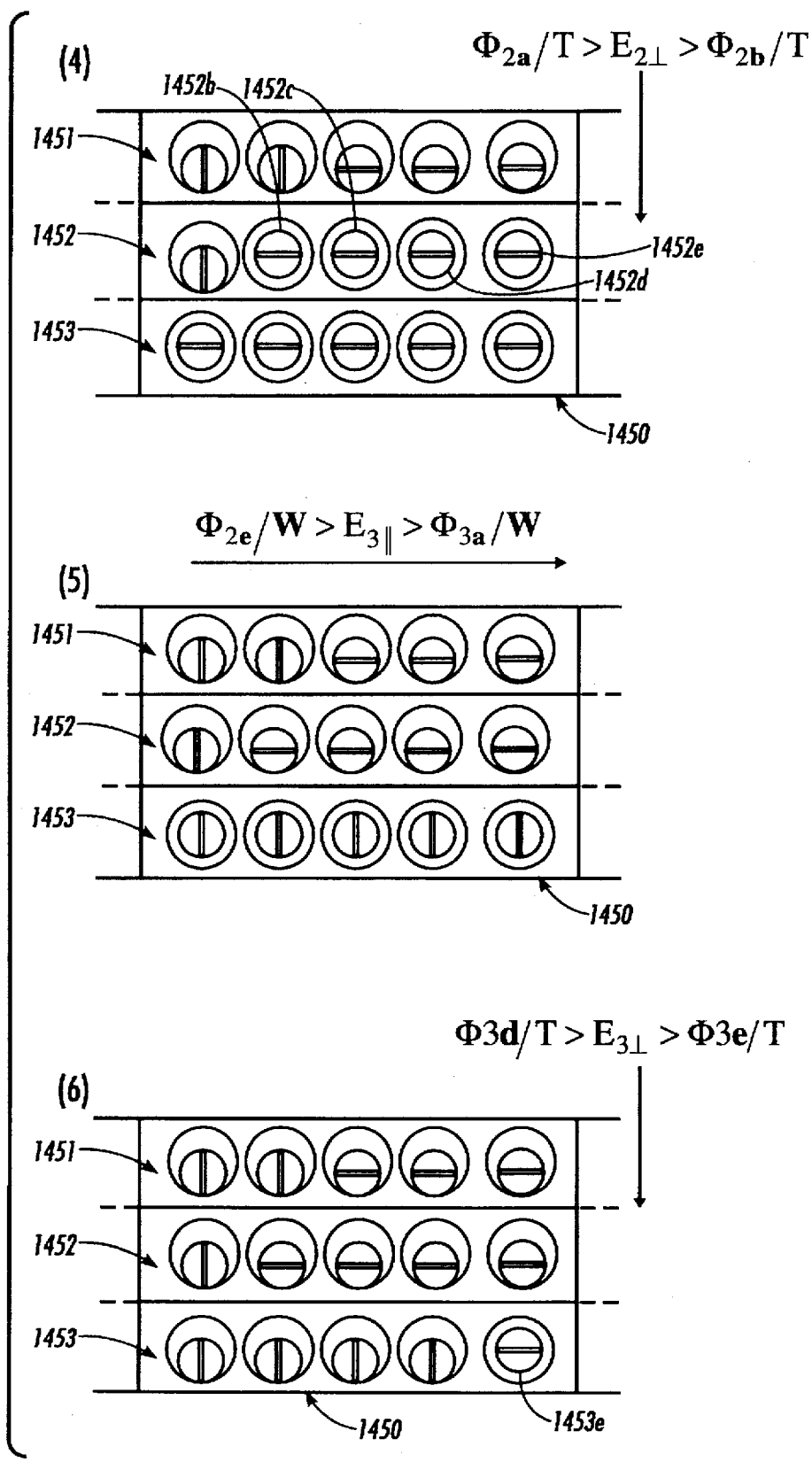
FIG.14G (views 4-6)

CANTED ELECTRIC FIELDS FOR ADDRESSING A TWISTING BALL DISPLAY

INCORPORATION BY REFERENCE

The following U.S. patents are fully incorporated herein by reference: U.S. Pat. No. 4,126,854, (Sheridon, "Twisting Ball Panel Display"); U.S. Pat. No. 4,143,103 (Sheridon, "Method of Making a Twisting Ball Panel Display"); U.S. Pat. No. 5,075,186 (Sheridon, "image-Wise Adhesion Layers for Printing"); U.S. Pat. No. 5,262,098 (Crowley et al., "Method and Apparatus for Fabricating Bichromal Balls for a Twisting Ball Display"); U.S. Pat. No. 5,344,594 (Sheridon, "Method for the Fabrication of Multicolored Balls for a Twisting Ball Display"); and U.S. Pat. No. 5,389,945 (Sheridon, "Writing System Including Paper-Like Digitally Addressed Media and Addressing Device Therefor").

RELATED PATENT APPLICATIONS

The following copending, coassigned U.S. Patent Applications are related to this case:

U.S. patent application Ser. No. 08/552,779 (Attorney Docket No. D/95115), entitled "POLYCHROMAL SEGMENTED BALLS FOR A TWISTING BALL DISPLAY";

U.S. patent application Ser. No. 08/552,778 (Attorney Docket No. D/95115Q1), entitled "APPLICATIONS OF A TRANSMISSIVE TWISTING BALL DISPLAY";

U.S. patent application Ser. No. 08/552,927 (Attorney Docket No. D/95115Q3), entitled "HIGH LIGHT COLOR TWISTING BALL DISPLAY";

U.S. patent application Ser. No. 08/552,912 (Attorney Docket No. D/95115Q4), entitled "PSEUDO-FOUR COLOR TWISTING BALL DISPLAY";

U.S. patent application Ser. No. 08/552,820 (Attorney Docket No. D/95116), entitled "ADDITIVE COLOR TRANSMISSIVE TWISTING BALL DISPLAY";

U.S. patent application Ser. No. 08/552,780 (Attorney Docket No. D/95116Q1), entitled "SUBTRACTIVE COLOR TWISTING BALL DISPLAY";

U.S. patent application Ser. No. 08/552,775 (Attorney Docket No. D/95116Q2), entitled "MULTITHRESHOLD ADDRESSING OF A TWISTING BALL DISPLAY";

U.S. patent application Ser. No. 08/552,777 (Attorney Docket No. D/95116Q3), entitled "FABRICATION OF A TWISTING BALL DISPLAY HAVING TWO OR MORE DIFFERENT KINDS OF BALLS"; and U.S. patent application Ser. No. 08/553,922 (Attorney Docket No. D/95271), entitled "ADDITIVE COLOR TRISTATE LIGHT VALVE TWISTING BALL DISPLAY."

BACKGROUND OF THE INVENTION

The present invention relates to visual displays, and more particularly to addressable, reusable, paper-like visual displays, and to gyricon or twisting-ball displays.

Since ancient times, paper has been a preferred medium for the presentation and display of text and images. The advantages of paper as a display medium are evident. For example, it is lightweight, thin, portable, flexible, foldable, high-contrast, low-cost, relatively permanent, and readily configured into a myriad of shapes. It can maintain its displayed image without using any electricity. Paper can be read in ambient light and can be written or marked upon with a pen, pencil, paintbrush, or any number of other implements, including a computer printer.

Unfortunately, paper is not well suited for real-time display purposes. Real-time imagery from computer, video, or other sources cannot be displayed directly with paper, but must be displayed by other means, such as by a cathode-ray tube (CRT) display or a liquid-crystal display (LCD). Typically, real-time display media lack many of the desirable qualities of paper, such as physical flexibility and stable retention of the displayed image in the absence of an electric power source.

Attempts have been made to combine the desirable qualities of paper with those of real-time display media in order to create something that offers the best of both worlds. That something can be called electric paper.

Like ordinary paper, electric paper preferably can be written and erased, can be read in ambient light, and can retain imposed information in the absence of an electric field or other external retaining force. Also like ordinary paper, electric paper preferably can be made in the form of a lightweight, flexible, durable sheet that can be folded or rolled into tubular form about any axis and conveniently placed into a shirt or coat pocket, and then later retrieved, re-straightened, and read substantially without loss of information. Yet unlike ordinary paper, electric paper preferably can be used to display full-motion and other real-time imagery as well as still images and text. Thus it is adaptable for use in a computer system display screen or a television.

The gyricon, also called the twisting-ball display, rotary ball display, particle display, dipolar particle light valve, etc., offers a technology for making a form of electric paper. Briefly, a gyricon is an addressable display made up of a multiplicity of optically anisotropic balls, each of which can be selectively rotated to present a desired face to an observer. For example, a gyricon can incorporate balls each having two distinct hemispheres, one black and the other white, with each hemisphere having a distinct electrical characteristic (e.g., zeta potential with respect to a dielectric fluid) so that the balls are electrically as well as optically anisotropic. The black-and-white balls are embedded in a sheet of optically transparent material, such as an elastomer layer, that contains a multiplicity of spheroidal cavities and is permeated by a transparent dielectric fluid, such as a plasticizer. The fluid-filled cavities accomodate the balls, one ball per cavity, so as to prevent the balls from migrating within the sheet. A ball can be selectively rotated within its respective fluid-filled cavity, for example by application of an electric field, so as to present either the black or the white hemisphere to an observer viewing the surface of the sheet. Thus, by application of an electric field addressable in two dimensions (as by a matrix addressing scheme), the black and white sides of the balls can be caused to appear as the image elements (e.g., pixels or subpixels) of a displayed image.

The gyricon is described further in the patents incorporated by reference hereinabove. In particular, U.S. Pat. No. 5,389,945 (Sheridon, "Writing System Including Paper-Like Digitally Addressed Media and Addressing Device Therefor") shows that gyricon displays can be made that have many of the desirable qualities of paper, such as flexibility and stable retention of a displayed image in the absence of power, not found in CRTs, LCDs, or other conventional display media. Gyricon displays can also be made that are not paper-like, for example, in the form of rigid display screens for flat-panel displays.

Although the gyricon represents an important step toward the goal of electric paper, there is still a long way to go. For example, a gyricon constructed of black-and-white balls cannot provide a multicolor image. As another example, a gyricon designed to operate in ambient reflected light cannot provide a projective or transmissive display. What is needed is an advanced gyricon technology that can provide a more full range of display capabilities while preserving paper-like advantages.

GOODRICH (U.S. Pat. No. 4,261,653, "Light Valve Including Dipolar Particle Construction and Method of Manufacture") discloses a light valve based on a spherical ball that can be rotated between a first orientation and a second orientation through the application of oscillating electric fields of two different frequencies. Goodrich's spherical ball is made up of a light-absorptive or light-reflective central segment surrounded by transparent intermediate and outer segments. In the first orientation of the ball, the central segment is transverse to the direction of incident light and so blocks the passage of light. In the second orientation of the ball, the central segment is aligned with the direction of incident light and so admits the passage of light, which passes through the transparent portions of the ball. Rotation between the first and second orientations is accomplished by changing the frequency of an applied oscillating electric field from a high frequency (e.g., 10,000 Hz) to a low frequency (e.g., 100 Hz), and taking advantage of the frequency-dependent dielectric characteristics of the intermediate segments and the frequency-insensitive dielectric characteristics of the outer segments. When the frequency of the applied field is high, the dielectric constant of the intermediate segments becomes less than that of the outer segments, and the induced charge in the intermediate segments causes the ball to orient in the first orientation. When the frequency of the applied field is low, the dielectric constant of the intermediate segments becomes greater than that of the outer segments, and the induced charge in the intermediate segments causes the ball to orient in the second orientation.

Goodrich's frequency-dependent addressing scheme requires specialized, possibly cumbersome addressing electronics and an AC voltage source capable of delivering high frequencies (e.g., RF frequencies). Goodrich's light valve balls (although said by Goodrich to be "dipolar") would not be responsive to a change in orientation of the electric field vector of a steady-state, nonoscillating electric field. Thus Goodrich's overall approach does not appear to be readily adaptable for use with electric fields produced from a simple DC voltage source without transformation to high-frequency AC.

SUMMARY OF THE INVENTION

According to the invention, an electrode assembly for an addressable light-modulating apparatus is provided. The light-modulating apparatus is a gyricon made up of electrically and optically anisotropic spheroidal balls rotatably disposed in a substrate, and has addressable elements each occupying a spatial volume bounded by edges. Each addressable element contains at least one of the spheroidal balls. The electrode assembly includes addressing means for selecting an element from among the plurality of elements, means for establishing a first electric potential in a vicinity of the selected element along a first edge of the selected element, means for establishing a second electric potential in a vicinity of the selected element along a second edge of the selected element parallel to the first edge, means for establishing a third electric potential in a vicinity of the selected element along a third edge of the selected element parallel to the first and second edges, and means for establishing a fourth electric potential in a vicinity of the selected element along a fourth edge of the selected element parallel to the first, second, and third edges.

In another aspect of the invention, an electrode apparatus for addressing an array of optical elements of a gyricon is provided, each of the optical elements being made up of at least one electrically and optically anisotropic spheroidal ball rotatably disposed in a substrate. The electrode apparatus includes means for choosing an element of the array, means for generating an electric field in a vicinity of the chosen element, the field having a direction of orientation, and means for adjusting the direction of orientation of the field over a continuous angular range of directions.

In still another aspect of the invention, an apparatus is provided that includes a substrate having a surface, a plurality of electrically and optically anisotropic spheroidal balls disposed in the substrate, and means for selectively producing an electric field in a vicinity of at least one ball disposed rotatably in the substrate. The electric field has an electric field vector oriented at an orientation angle with respect to a planar portion of the surface proximate to the vicinity, the orientation angle being an angle other than a right angle.

In yet another aspect of the invention, a method is provided for producing a canted electric field for a light-modulating apparatus made up of a plurality of electrically and optically anisotropic spheroidal balls rotatably disposed in a substrate. The light-modulating apparatus includes light-modulating elements that each occupy a spatial volume bounded by edges, with each element containing at least one of the spheroidal balls. According to the method, a light-modulating element is selected from among the elements of the apparatus. Four electric potentials are established in a vicinity of the selected element: a first potential along a first edge of the selected element; a second electric potential along a second edge of the selected element parallel to the first edge; a third electric potential along a third edge of the selected element parallel to the first and second edges; and a fourth electric potential along a fourth edge of the selected element parallel to the first, second, and third edges.

In yet still another aspect of the invention, a method is provided for using a light-modulating device. According to the method, light from a light source is provided incident on a light-modulating device made up of a plurality of electrically and optically anisotropic spheroidal balls rotatably disposed in a substrate having a surface. An electric field is selectively produced in a vicinity of at least one ball thus disposed in the substrate. The electric field has an electric field vector oriented at an orientation angle with respect to a planar portion of the surface proximate to the vicinity, the orientation angle being an angle other than a right angle. At least a portion of the light incident on the modulating device is modulated with the modulating device.

In even another aspect of the invention, a method is provided for using a light-modulating apparatus having a plurality of electrically and optically anisotropic spheroidal balls rotatably disposed in a substrate having a surface. The apparatus has an array of addressable elements, each array element including at least one of the spheroidal balls. According to the method, an array element is selected. A preferred direction of orientation is selected for balls of the selected array element, the direction of orientation forming an angle with a vector normal to a planar portion of the substrate surface in a vicinity of the selected array element, the angle being greater than 0 degrees and less than 180 degrees. Balls of the selected array element are aligned with the preferred direction of orientation by applying an electric field in the vicinity of the selected array element, the electric field having an electric field vector oriented parallel to the selected preferred direction, thereby causing balls of the selected array element to rotate so as to align with the preferred direction of orientation.

The invention will be better understood with reference to the drawings and detailed description below. In the drawings, like reference numerals indicate like components.

BRIEF DESCRIPTION OF THE DRAWINGS

FIG. 14G is a series of views showing successive stages of addressing in a multilayer gyricon having multithreshold color saturation control within each layer;

DETAILED DESCRIPTION OF SPECIFIC EMBODIMENTS

Multilayer Polychromal Gyricon Structures

Typically, known gyricon displays are made up of bichromal balls that are black in one hemisphere and white in the other. Other kinds of balls are also known. For example, U.S. Pat. No. 4,261,653 (Goodrich) shows a multilayer ball, although it is made at least in part from glass and its use depends on a cumbersome addressing scheme involving high-frequency electric fields. U.S. Pat. No. 5,344,594 (Sheridon), which is incorporated by reference hereinabove, at FIG. 4 indicates how a multi-stream fabrication method for bichromal balls can be extended for use in making certain multilayer, multichromal balls. Even so, the present invention uses multichromal gyricon balls in new ways and in conjunction with other new techniques, such as canted fields, to provide a wealth of new possibilities for gyricon displays.

Figure 1:
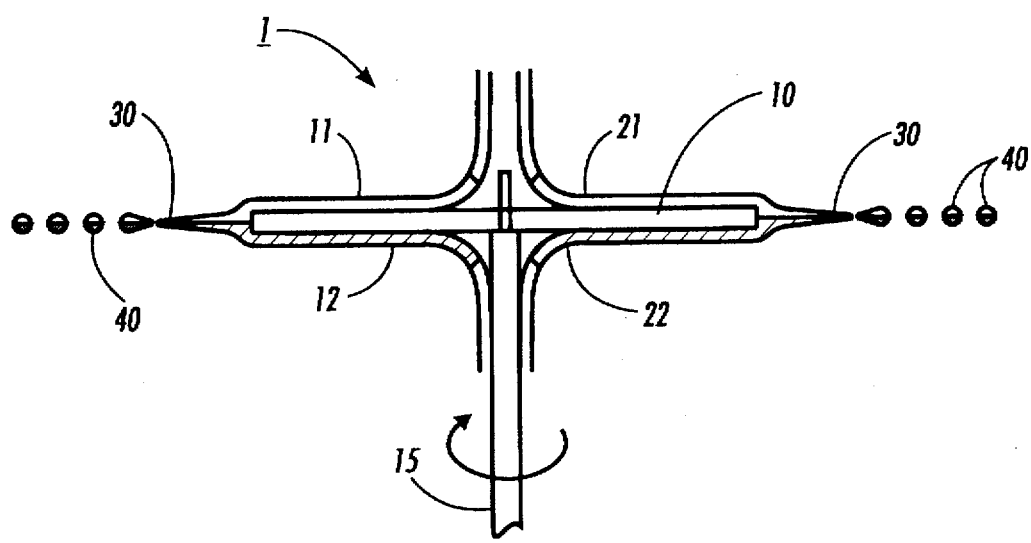
FIG. 1 illustrates a technique for fabricating bichromal gyricon balls in the prior art.

FIG. 1 illustrates a technique for fabricating bichromal balls in the prior art, using apparatus 1. Pigmented plastic liquids 21, 22 are applied to opposite sides 11, 12 of a spinning disk 10, which rotates uniformly about shaft 15. Centrifugal force causes liquids 21, 22 to flow toward the periphery of disk 10, where they combine at the edge to form bichromal ligaments 30 that eventually break up as bichromal balls 40. When liquids 21, 22 flow with equal rates to the edge of disk 10, the technique produces bichromal balls with equal hemispheres of color.

Figure 2A:
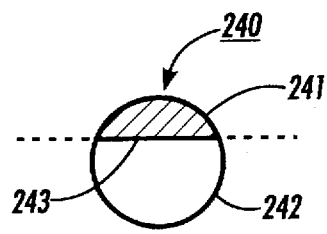
FIGS. 2A–2B illustrate bichromal gyricon balls obtained using unequal liquid flow rates.
Figure 2B:
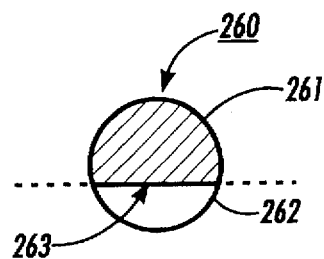
Figure 2C:
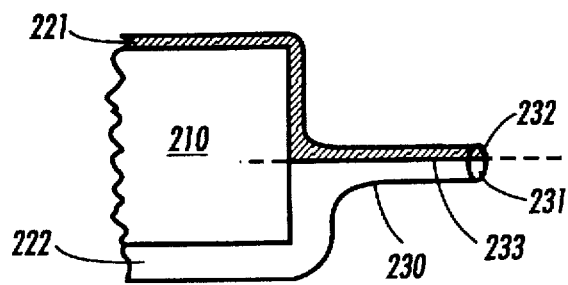
FIGS. 2C–2D are close-up cross-sectional views of the edge of a disk to which pigmented plastic liquids are applied at unequal flow rates.
Figure 2D:
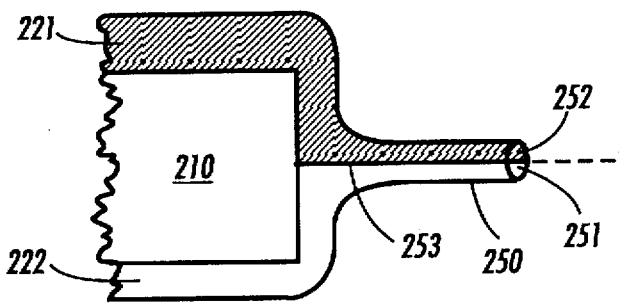

FIGS. 2A–2B illustrate the balls obtained when the pigmented liquid flow rates in the spinning-disk technique of FIG. 1 are made unequal. In FIG. 2A, ball 240 has segments 241, 242 joined at planar interface 243, and in FIG. 2B, ball 260 has segments 261, 262 joined at planar interface 263. Thus in both FIGS. 2A and 2B, the balls are made up of unequal spherical segments of pigmented material, with a planar interface. This planar interface is important, as will be seen below. FIGS. 2C–2D illustrate how ligaments at the edge of a spinning disk can produce the balls of FIGS. 2A–2B. FIGS. 2C–2D show close-up cross-sectional views of the edge of a spinning disk 210 to which pigmented plastic liquids 221, 222 are applied at unequal rates. In FIG. 2C, black liquid 221 is applied at a lesser flow rate than white liquid 222. The resulting ligament 230 contains a broad white segment 231 and a narrow black segment 232 separated by a planar interface 233. Upon breakup, ligament 230 produces balls like the ball 240 shown in FIG. 2A. In FIG. 2D, black liquid 221 is applied at a greater flow rate than white liquid 222. The resulting ligament 250 contains a narrow white segment 251 and a broad black segment 252 separated by a planar interface 253. Upon breakup, ligament 250 produces balls like the ball 260 shown in FIG. 2B. Again, the planar interfaces are important, as will be seen below.

The unevenly segmented balls of FIGS. 2A–2B show that the circular ligaments produced by the spinning disk, and the balls that derive from these ligaments, act as though they are made from slabs, with the widths of the slabs depending on the feed rates of the pigmented liquids.

Figure 3A:
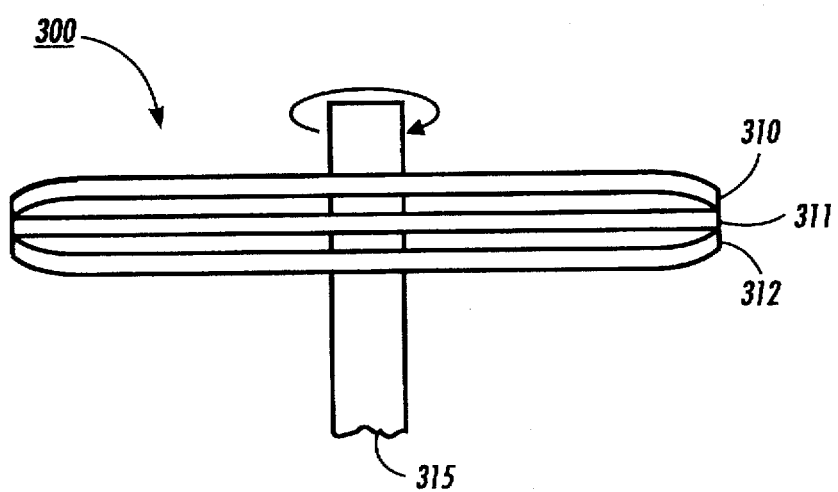
FIGS. 3A–3D illustrate a multiple-disk assembly for fabricating multichromal gyricon balls.

A modification of the spinning-disk technique can be used to fabricate multichromal balls. The modification uses a spinning multiple-disk assembly instead of a single spinning disk. An example is illustrated in FIG. 3A. Assembly 300 has three disks 310, 311, 312 that rotate uniformly about shaft 315. The concave or "dish-shaped" outer disks 310, 312 curve or slope toward the flat inner disk 311 at their respective peripheries. Other geometries are possible, and the exact geometry for a particular embodiment can be determined, for example, by hydrodynamic modeling, as will be appreciated by those of skill in the art.

The three-disk assembly of FIG. 3A can be used to produce multichromal balls having certain useful properties, as will be discussed below. It will be appreciated, however, that other assemblies having different numbers of disks can also be used in the present invention, with the number and configuration of the disks varying according to the kind of ball that is to be produced.

Figure 3B:
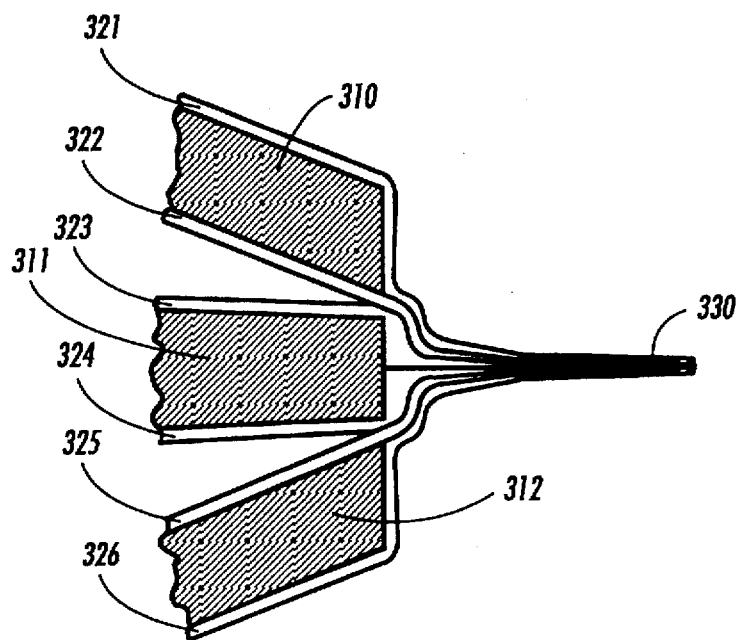
Figure 3C:
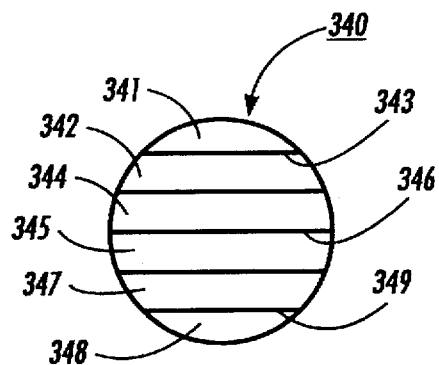
Figure 3D:
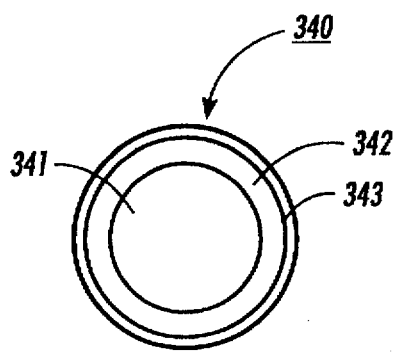

If differently pigmented plastic liquids are introduced to each side of each of the three disks 310, 311, 312 in FIG. 3A, flow patterns of pigmented liquids at the edge of the disks can be obtained that result in multichromal ligaments that break up to form multichromal balls. FIG. 3B illustrates a close-up cross-sectional view of an example of the flow of pigmented plastic liquids at the edge of the three-disk assembly of FIG. 3A. First and second liquids 321, 322 flow over opposite sides of disk 310, whose downward-sloping edge can be seen in the figure. Third and fourth liquids 323, 324 flow over opposite sides of disk 311, and fifth and sixth liquids 325, 326 flow over opposite sides of disk 312. The combined flows give rise to ligament 330, which breaks up into multilayer balls such as the ball 340 illustrated in FIG. 3C (side view) and FIG. 3D (top view).

Ball 340 has six segments corresponding to the six streams of plastic liquid used to make it. Segments 341 and 342 join at planar interface 343; segments 344 and 345, at planar interface 346; and segments 347 and 348, at planar interface 349. If different pigments are used in the various plastic liquids 321, 322, 323, 324, 325, 326, then ball 340 will be multichromal. In general, a three-disk assembly like the one shown in FIG. 3A can produce gyricon balls having six segments of up to six different colors.

More generally, a multi-disk assembly with N disks can be used to produce gyricon balls having up to 2N segments in arbitrary color combinations. Black, white, or other color pigments or dyes can be used, alone or in combination, so that segments can be made in virtually any desired color or shade. Segments can be made clear by using unpigmented, undyed plastic liquid. Different segments can be made to have different widths by adjusting the flow rates of the various plastic liquids used to make the segments, with faster flow rates corresponding to wider segments and slower rates to narrower segments according to the techniques illustrated previously with reference to FIGS. 2A–2D. Two or more adjacent segments can be made the same color so that they effectively merge to form a single broader segment.

By way of example, any given gyricon ball segment can be: black; white; clear (that is, essentially transparent and without chroma, like water or ordinary window glass); a transparent color (e.g., transparent red, blue, or green, as for certain additive color applications; transparent cyan, magenta, or yellow, as for certain subtractive color applications); an opaque color of any hue, saturation, and luminance; any shade of gray, whether opaque or translucent; and so forth. For ease of reference, "achromatic colors" will be used hereinbelow to refer to colors essentially lacking in chroma, that is, to black, white, gray, and clear, and "chromatic colors" will be used hereinbelow to refer to other colors, including red, orange, yellow, green, blue, indigo, violet, cyan, magenta, pink, brown, beige, etc.

Highlight Color Gyricon

Figure 4A:
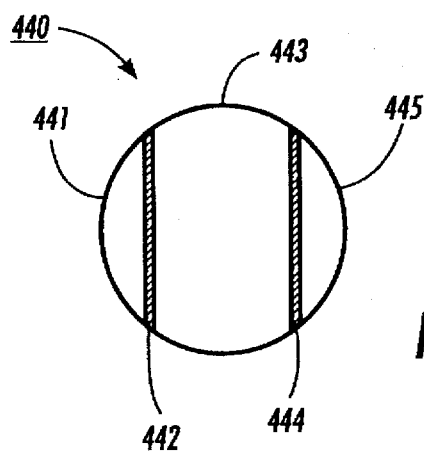
FIGS. 4A–4B show side and top views, respectively, of a multi-segmented, highlight color gyricon ball.
Figure 4B:
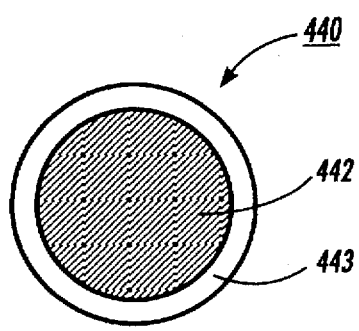

FIGS. 4A–4B illustrate a gyricon ball 440 having five segments 441, 442, 443, 444, 445. FIG. 4A shows a side view of ball 440, and FIG. 4B shows a top view. As can be seen in FIG. 4A, central segment 443 is quite wide in relation to the other segments, and segments 442 and 444 are quite thin. The wide central segment 443 can be made by using two smaller adjacent segments of identical pigment (not shown). The thin segments 442 and 444 can be made using low flow rates of their respective pigmented plastic liquids.

If segments 441 and 445 are made transparent (for example, of clear plastic liquid having an optical refractive index closely matching the refractive indices of the sheet material and dielectric fluid that surround ball 440), segment 442 is made in a dark color such as black, segment 444 is made in a contrasting color such as red or blue, and the broad central segment 443 is made white, a gyricon ball results that is suitable for highlight color. A highlight color display typically provides a black-and-white display with the addition of one other color, such as red, blue, yellow, green, or a "custom color" chosen for a particular application (for example, a special color used for a company logo), that can be applied to any selected portion or portions of the display in order to call attention to text or other matter there. Although highlight color is known in other contexts, for example in certain laser printers and copiers, highlight color in gyricon displays is new to the present invention.

The ball of FIGS. 4A–4B can be used to construct a highlight color gyricon display. For example, the balls can be uniformly dispersed in a sheet of elastomer or other substrate material permeated by dielectric fluid. Each ball resides in its own liquid-filled cavity within the sheet. One or more balls can be used per pixel of display; here, for simplicity of exposition, one ball per pixel is assumed. The black face of the ball can be turned toward the observer to provide a black pixel, and the red or other highlight color face can be turned toward the observer to provide a highlight color pixel. The ball can be turned at 90 degrees between these two positions to provide a white pixel. (When the ball is turned so as to provide a white pixel, the edges of the black and highlight color segments can be observed along with the white central segment; however, this does not significantly affect the overall white appearance of the pixel if the black and highlight color edges are made sufficiently thin.)

Figure 5:
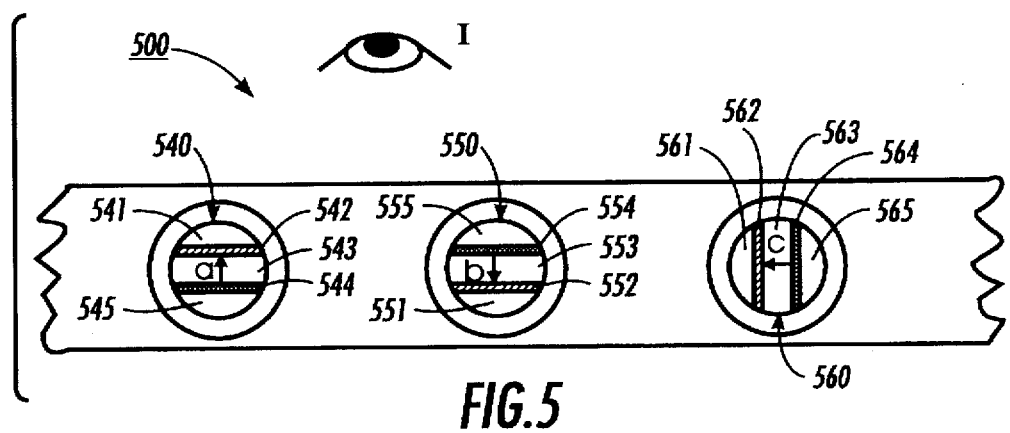
FIG. 5 illustrates an example of a highlight color gyricon display.

FIG. 5 illustrates an example of a highlight color gyricon display. A portion of highlight color gyricon display 500 is shown in enlarged cross section, with balls 540, 550, and 560 shown in detail. Ball 540 has five segments 541 (transparent), 542 (highlight color), 543 (white), 544 (black), 545 (transparent) and is oriented in a direction indicated by arrow a. Ball 550 has five segments 551 (transparent), 552 (highlight color), 553 (white), 554 (black), 555 (transparent) and is oriented in a direction indicated by arrow b. Ball 560 has five segments 561 (transparent), 562 (highlight color), 563 (white), 564 (black), 565 (transparent) and is oriented in a direction indicated by arrow c. An observer at I sees ball 540 as a highlight color pixel, ball 550 as a black pixel, and ball 560 as a white pixel.

The balls for the highlight color gyricon display 500 are made with segments of different zeta potentials, so that the balls can be oriented to any of the three possible orientations by application of suitable electric fields. For example, the transparent segment in contact with the highlight color segment can be made to have the highest positive zeta potential in contact with the working fluid of the gyricon (i.e., the dielectric fluid that permeates the optically transparent sheet of material in which the balls are embedded), and the transparent segment in contact with the black segment can be made to have the highest negative zeta potential. According to this scheme, in FIG. 5 ball 540 is made with transparent segment 541 having the highest positive zeta potential of any segment of ball 540 and transparent segment 545 having the highest negative zeta potential of any segment of ball 540. Similarly, ball 550 is made with transparent segment 551 having the highest positive zeta potential and transparent segment 555 having the highest negative zeta potential, and ball 560 is made with transparent segment 561 having the highest positive zeta potential and transparent segment 565 having the highest negative zeta potential.

Because the segments of gyricon balls are made with different zeta potentials, the balls are electrically anisotropic. When a suitable electric field is applied in the vicinity of a ball, the ball will tend to rotate, with its direction of rotation and its final orientation being substantially determined by its electrical anisotropy. The ball will retain its orientation even after the applied field is removed.

Different plastic materials can have different zeta potentials. The two transparent sections of a highlight color gyricon ball (for example, segments 541 and 545 of ball 540) can be made from two different plastics having two different zeta potentials. The zeta potential characteristics of the ball and its various segments can thus be shaped through deliberate choice of materials, as well as by choice of coloring agents for the nontransparent segments.

Some illustrative examples of plastic materials suitable for making gyricon ball segments are polyethylene, polyester, carnuba wax, and castor wax. (Although waxes are not polymerized hydrocarbons, they are, strictly speaking, plastic materials.) Other materials, such as epoxy, can also be suitable. The same or similar materials can be used for both transparent and nontransparent ball segments, with suitable coloring agents being added in the case of the nontransparent segments. For transparent segments, the materials are preferably chosen to have refractive indices closely matching that of the plasticizer liquid used to swell the elastomer sheet.

To orient an individual highlight color ball so that the black or the highlight color faces the observer, as for balls 550 and 540 in FIG. 5, respectively, a suitable electric field can be applied perpendicular to the plane of the sheet of material in which the ball is embedded. To orient a highlight color ball so that its black and highlight color segments are perpendicular to the observer and its white central segment is displayed, as for ball 560 in FIG. 5, an electric field can be applied parallel to or in the plane of the sheet of material in which the ball is embedded. A matrix addressing scheme (controlled, for example, by computer or by digital video) can be used to cause the field to be applied selectively in the vicinity of an individual ball to be addressed.

An electrical stylus can also be used to address the balls, thus enabling a human user to write directly on the gyricon. For example, the parallel field can initially be applied to the entire sheet, orienting all the balls so that their white central segments are presented to the user. This effectively erases the electric paper, giving the user a blank sheet on which to write. Thereafter, the user can apply a stylus having a positive potential and move it across the surface of the sheet to reorient the balls in the vicinity of the stylus tip so that their black faces are presented to the user. The user can apply a stylus having a negative potential and move it across the surface of the sheet to reorient the balls in the vicinity of the stylus tip so that their highlight color faces are presented to the user. The user can erase the sheet by applying the parallel field, so that the sheet can thereafter be reused.

In general, a gyricon display can be made in various sizes and shapes, and using various kinds of materials for the gyricon balls, elastomer sheet, and plasticizer fluid. The highlight color display of FIG. 5 is exemplary in this regard. For instance, the highlight color display of FIG. 5 can be made about the size of an ordinary sheet of paper by using, for example, an 8.5 by 11 inch sheet of SYLGARD 184 elastomer material of 20 mils (thousandths of an inch) thickness with ISOPAR L plasticizer and highlight color balls of 100 micron diameters with center segments 50 microns thick, the top segment of each ball being made from carnuba wax material, the bottom from castor wax material, and the three interior segments from castor wax colored with carbon black, titanium dioxide, and a chromatically colored dye or pigment to provide, respectively, the black, white, and highlight colors of the interior segments.

Many different dyes and pigments can be suitable for use as coloring agents to provide chromatic and achromatic colors in gyricon balls and segments of gyricon balls, depending on the application and on the material or materials used in constructing the balls. By way of example, if the balls are made from wax materials, some dyes that can be used include BAKER CHEMICAL Cresyl violet blue, BAKER CHEMICAL Rhodamine 6G, DUPONT Rhodamine BI, DUPONT Spirit Blue NS, DUPONT Victoria Blue B base, ALLIED CHEMICALS Iosol Blue, EASTMAN Acridine orange, CALCO OIL blue N, and CALCO OIL black; and some pigments that can be used include DUPONT R900 titanium dioxide, FERRO 6331 black pigment, CABOT MOGUL L carbon black, and CABOT MONARCH 1000 carbon black.

Figure 6A:
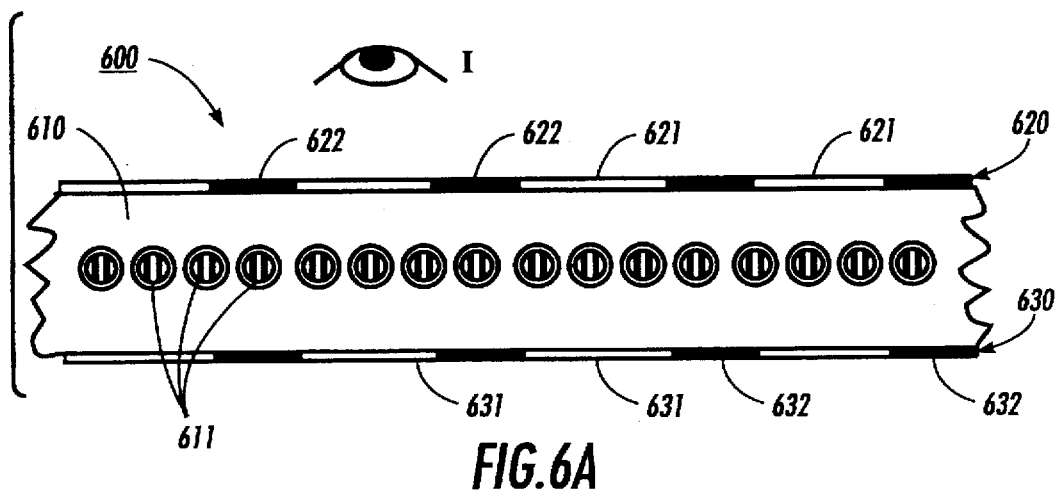
FIG. 6A illustrates an enlarged cross-section of a portion of a highlight color gyricon display.

FIGS. 6A–6G illustrate an example of an electrode structure that can provide a parallel field suitable for erasing a highlight color gyricon display. FIG. 6A shows an enlarged cross-section of a portion of highlight color gyricon display 600. Electrode assemblies 620, 630 are located on either side of an elastomer sheet 610 in which balls 611 are embedded. Top electrode assembly 620, which is closest to an observer at I, is made of an optically transparent conductor with a very high resistivity. Bottom electrode assembly 630, which is on the opposite side of sheet 610 from an observer at I, also has a very high resistivity. Each of the top and bottom electrode assemblies 620, 630 is divided into rectangular regions; in particular, top electrode assembly 620 includes regions 621 and bottom electrode assembly 630 includes regions 631. The rectangular regions are separated by low-resistivity bus bars; in particular, bus bars 622 separate the regions 621 of top electrode assembly 620 and bus bars 632 separate the regions 631 of bottom electrode assembly 630. Both electrode assemblies 620, 630 can be connected to a power supply (not shown).

Addressing electrodes for gyricons, such as electrode assemblies 620, 630, can be made by depositing a conductive material on a glass or plastic (e.g., MYLAR) backing or substrate. Typically, the conductive material is indium/tin oxide (ITO), which can be applied to glass by sputtering. A tin oxide (NESA glass) coating can also be used. The electrodes formed using these materials are optically transparent, and so are well suited for addressing the gyricon while minimally interfering with the visibility thereof.

To minimize the electrical power drain caused by passing current through electrode assemblies 620, 630, it is preferable to use electrodes having high surface resistivities. However, if resistivity values are too high, switching speeds will be slow. Resistivity values can range up to approximately $10^9$ ohms per square (that is, ohms per unit of area), depending on the particular application or environment in which display 600 is used.

Preferably, top electrode assembly 620 is made so as not to electrically isolate the balls 611 from an applied addressing field, such as the field of a writing stylus. Since an electrode is transparent to electric fields that change at a rate faster than the capacitive response time of the electrode, this condition can be met by making the regions 621 of a sufficiently high resistivity material. For example, an elastomer layer 30 mils thick has a capacitance of approximately 3 picofarads per square centimeter. If sheet 610 is formed of such an elastomer layer, the resistivity of top electrode assembly 620 can be made approximately $10^8$ ohms per square so that a user can write on display 600 with a stylus whose tip moves across the display surface at a velocity of approximately 100 centimeters per second or greater. A DC voltage of, for example, 80 volts can be used for this stylus.

Figure 6B:
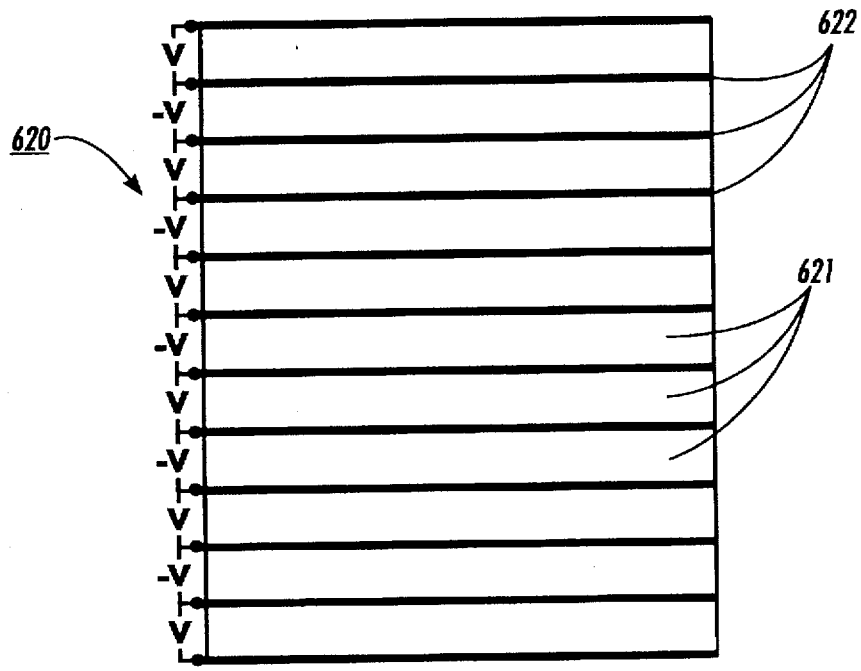
FIG. 6B depicts an electrode assembly used to produce an erasing field in a highlight color gyricon display.

FIG. 6B is a view from above top electrode assembly 620, showing the configuration of voltages of top electrode assembly 620 for producing the erasing field; the same configuration is used for bottom electrode assembly 630. A voltage V is applied across the surface of each of the rectangular regions 621, so that a uniform electric field E running substantially parallel to the surface of sheet 610 is created in the region of sheet 610. Because the resistivity of the elastomer sheet 610 is high, as is the resistivity of rectangular regions 621, the power draw is low. The polarity of the applied voltage alternates between positive and negative from one rectangular region to the next, as shown, thus minimizing the voltage requirement of the power supply. The bus bars 622 are low resistivity electrodes (e.g., 100 ohms per square) that allow uniform distribution of voltage across the high resistivity optically transparent surface material of the rectangular regions 621.

Figure 6C:
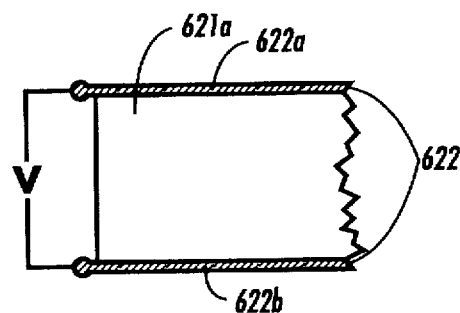
FIG. 6C is a close-up view of part of a rectangular region of the electrode assembly of FIG. 6B.
Figure 6D:
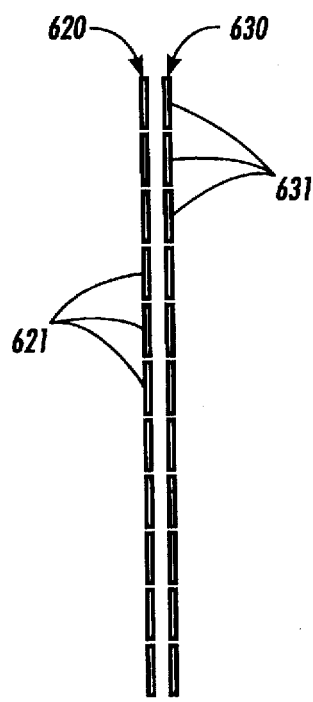
FIG. 6D is an end view of the electrode assembly of FIG. 6B.
Figure 6E:
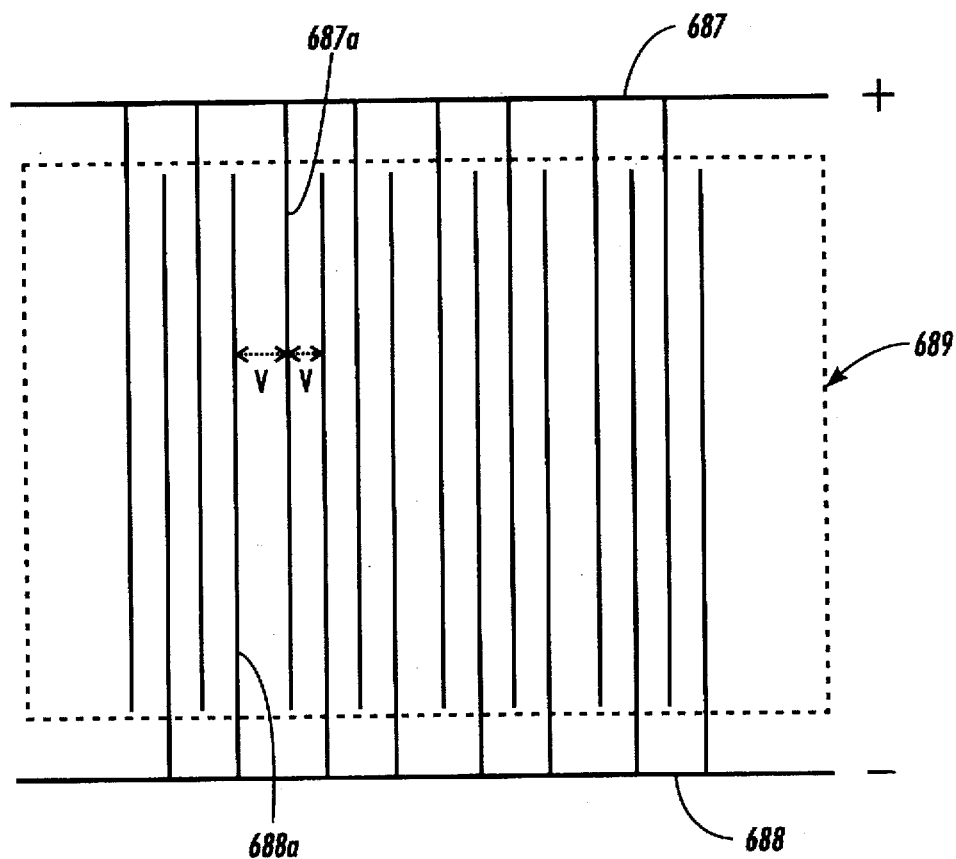
FIG. 6E illustrates bus bar headers suitable for producing an erasing field for a highlight color gyricon display.
Figure 6F:
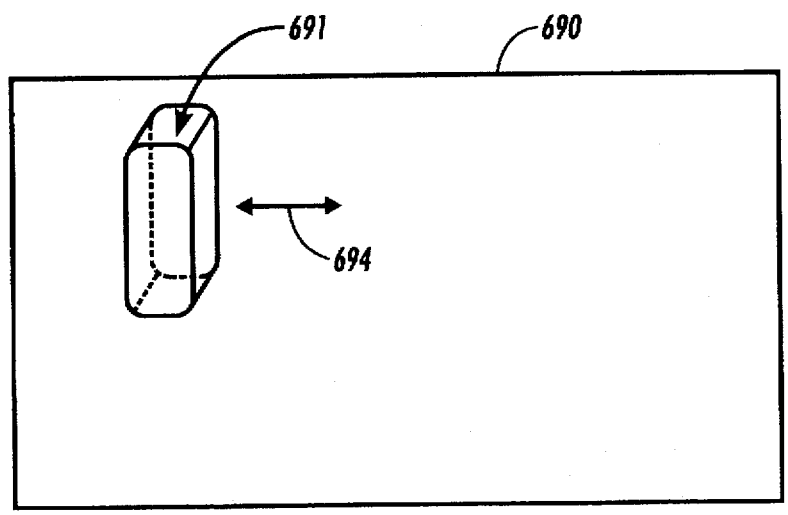
FIGS. 6F–6G illustrate an eraser for a highlight color gyricon display.

Bus bars 622 can be connected to one another and to the power supply by any appropriate technique, for example, using wired connections along one or more edges of sheet 610, or by printing bus bar headers on a glass or plastic backing in a pattern such as that illustrated in FIG. 6E, in which header 687 is held at a positive voltage and header 688 is held at a negative voltage. The potential difference between neighboring prongs 687a and 688a, for example, is a voltage V. Thus headers 687, 688 and their counterparts in the bottom electrode assembly produce an alternating uniform electric field in the plane of sheet 610 throughout an overlap region 689. Preferably, the length and width of overlap region 689 exceed, respectively, the length and width of sheet 610.

Bus bars 622 can be, for example, evaporated gold or aluminum electrodes, or screen-printed silver-filled epoxy. If electrodes 620, 630 are formed of ITO sputtered on glass, bus bars 622 can also be ITO, sputtered onto the glass in a separate operation involving the use of a mask. By using ITO on glass, both the electrodes and the bus bars can be made substantially transparent, thereby increasing the visibility of the underlying gyricon sheet.

FIG. 6C shows a close-up view of a portion of one of the rectangular regions 621. The particular region in question, region 621a, is situated between two of the bus bars 622, namely bus bars 622a and 622b. The voltage differential between first bus bar 622a and second bus bar 622b is V. The surface material of region 621a provides a high-resistivity electrical connection between low-resistivity bus bars 622a and 622b.

FIG. 6D shows an end view of electrode assemblies 620, 630 and their respective constituent regions 621, 631. (For simplicity, elastomer sheet 610 and bus bars 622 are omitted in this view.) As can be seen, the alternating pattern of applied positive and negative voltages is identical for both of the electrode assemblies 620, 630. This ensures that the electric field is uniformly parallel to the surface of sheet 610 within any given region of sheet.

To enable erasure, a power supply can be associated with the highlight color gyricon display. For example, in FIG. 6A, when a switch (not shown) is closed, the erasure power supply can be connected to the top and bottom electrode assemblies 620, 630, thereby establishing electric fields parallel to the sheet 610. The fields cause balls 611 to be oriented with their white central segments facing an observer at I, thus erasing the gyricon display 600. The power supply is required only momentarily when the display is erased, so that the actual power requirements can be quite modest and the power supply can be made small. For example, an electric field of about 5 volts per mil can be used to realign the gyricon balls, so that if the resistivity of electrodes 620, 630 is $10^8$ ohms per square and assuming that ball rotation completes in approximately 3 milliseconds, the energy required to erase display 600 can be, for example, 6 milliwatt seconds, which can be readily supplied with, for example, ordinary flashlight batteries.

The power requirement for erasure can be met, for example, by exposing two electrodes near the edge of display 600 and touching these electrodes to two similarly spaced electrodes on the writing stylus (which is assumed to have its own power supply) when erasure is desired. This is illustrated in FIG. 6H. A stylus 695 has electrodes 696a, 696b that protrude slightly from the end of the stylus opposite the writing tip. These electrodes are spaced so that they line up with similarly spaced electrodes 697a, 697b connected to display 600. For safety and convenience, electrodes 697a, 697b can be disposed in a recess 698, preferably located near an edge or corner of the visible surface of display 600.

FIGS. 6A–6D do not depict display 600 as including electrode assemblies that can be used for writing (as opposed to erasing) display 600. Writing on display 600 can be accomplished by means of a stylus or other external device. Alternatively or additionally, write electrodes can be incorporated into display 600 together with the erase electrodes, as illustrated in the cross-sectional view of FIG. 6I. Display 600 has elastomer sheet 610 with balls 611 sandwiched between top and bottom erase electrode assemblies 620, 630, as in FIGS. 6A–6D. Additionally, an upper addressable write electrode assembly 626 is situated above top erase electrode assembly 620, and a lower addressable write electrode assembly 636 is situated below bottom erase electrode asembly 630. Write electrode assemblies 626, 636 preferably have significantly lower resistivities than do their counterpart erase electrodes. For example, if top and bottom erase electrode assemblies 620, 630 have resistivities of $10^8$ ohms per square, then upper and lower write electrode assemblies 626, 636 can have resistivities of $10^2$ ohms per square. Both write electrode assemblies 626, 636 and erase electrode assemblies 620, 630 can be made matrix-addressable, to facilitate writing and erasure of individual pixels.

Erase electrode assemblies can be made external to display 600. For example, an erase electrode can be mounted in a special device for erasing electric paper. Any external device that applies an electric field substantially in the plane of elastomer sheet 610 can be used. An example of such a device is the electric paper eraser shown in FIGS. 6F–6G. A user can erase a display such as display 600 by holding eraser 691 against the visible surface of the display and wiping eraser 691 back and forth across the display surface in the direction indicated in FIG. 6F by arrows 694. Thus a user of display 600 can erase some or all of the displayed text, image, or other displayed matter by wiping the display with eraser 691 in a manner analogous to that in which a piece of conventional paper is erased with a rubber eraser, or in which a conventional whiteboard is wiped clean with a whiteboard eraser.

Figure 6G:
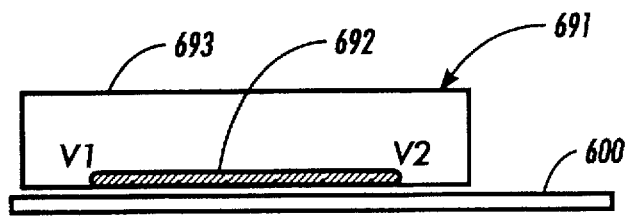
Figure 6H:
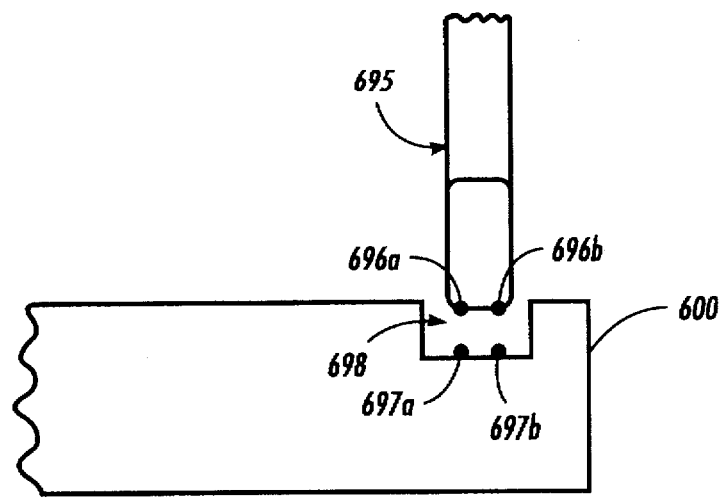
FIG. 6H illustrates a gyricon display having recessed erasure power electrodes, and a writing stylus adapted for use therewith.
Figure 6I:
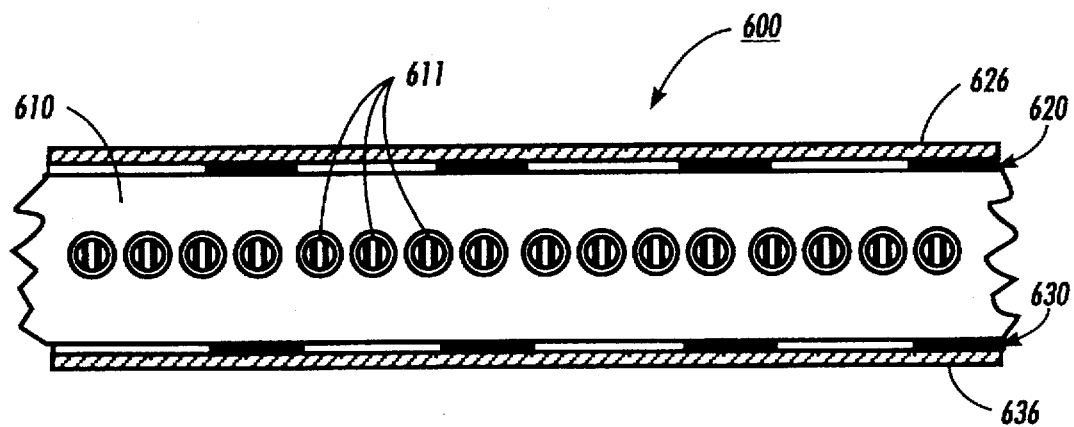
FIG. 6I illustrates an example of a highlight color gyricon display with built-in erasure and writing electrodes.

Eraser 691 is shown in cross-section in FIG. 6G. A resistive surface 692 is subjected to a potential difference between V1 and V2, resulting in an electric field E in and parallel to the plane of surface 692. An insulating housing 693 surrounds resistive surface 692, giving the user of eraser 691 a way to hold the eraser and also providing packaging for a power source and circuitry (not shown) used to produce the voltages V1 and V2 at either end of surface 692. Preferably, the electric field in resistive surface 692 penetrates into sheet 610 to sufficient depth, and is sufficiently parallel to the plane of sheet 610, to ensure a clean and thorough erasure.

Overlay Transparencies

Overlay transparencies superpose printed, graphical, or other visual information on a transparent (for example, clear or lightly tinted) background. They can be placed on top of an underlying opaque page such as a map, a printed text, or a colored background. Commonly in the prior art, overlay transparencies are made of flexible transparent plastic sheets upon which visual information is printed or marked. Such plastic sheets are non-reusable and are not capable of providing real-time display.

A gyricon display suitable for use as an overlay transparency can be constructed. The display can be made to have the qualities of reusability, physical flexibility about any axis, suitability to real-time imagery, and so forth that are characteristic of gyricon-based electric paper; however, the display appears transparent rather than opaque when it is blank. The display can be used in ambient light if a diffuser, such as a sheet of ordinary white paper, is placed behind it. The display is similar in construction to the highlight color display 500 of FIG. 5, except for the balls used, as will now be described.

Figure 7A:
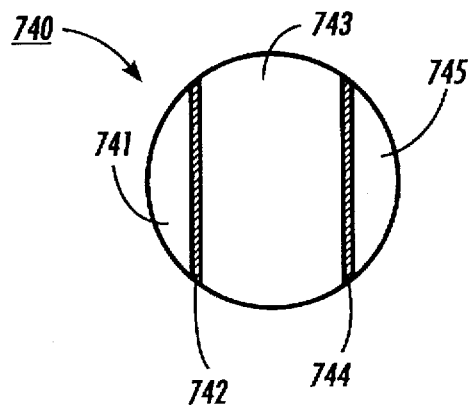
FIG. 7A illustrates a gyricon ball suitable for constructing an overlay transparency gyricon or a gyricon-based architectural screen.

FIG. 7A illustrates a ball suitable for constructing an overlay transparency gyricon display. Ball 740 is a five-segment ball with a broad transparent central segment 743, two thin pigmented segments 742, 744, and two transparent outer segments 741, 745. The transparent segments 741, 743, and 745 are chosen to have an optical refractive index that closely matches the refractive indices of the elastomer sheet and the dielectric fluid that permeates the sheet, so that the ball appears transparent when oriented with its transparent central segment 743 facing the observer (that is, in a 90-degree orientation comparable to the orientation of ball 560 in FIG. 5).

Ball 740 is made with segments of different zeta potentials, so that it can be oriented to different orientations by application of suitable electric fields. In particular, segment 741 can be made with the highest positive zeta potential of any segment in ball 740, and segment 745, with the highest negative zeta potential of any segment in ball 740.

By applying an electric field in or parallel to the plane of the sheet in which the balls are embedded, the balls can be oriented to present their transparent aspect to the observer, and thus the display can be erased. An electrode configuration like the one described for FIGS. 6A–6G can be used to effect erasure.

The pigmentation chosen for segments 742, 744 can depend on the intended use of the overlay transparency. If, for example, the overlay transparency is to be used to highlight elements of an underlying black-and-white textual document, the thin segment 742 can be made in an opaque color, such as red or yellow, and the other thin segment 744 can be made in another opaque color, such as blue or green. As another example, if the overlay transparency is to be used with a plain white or other suitably colored background, such as a background of a gray, beige, or other neutral color, the thin segment 742 can be made black and the other thin segment 744 can be made in a highlight color.

Ball 740 can be fabricated in a manner similar to that used to fabricate the five-segment ball 440 of FIG. 4A.

Figure 7B:
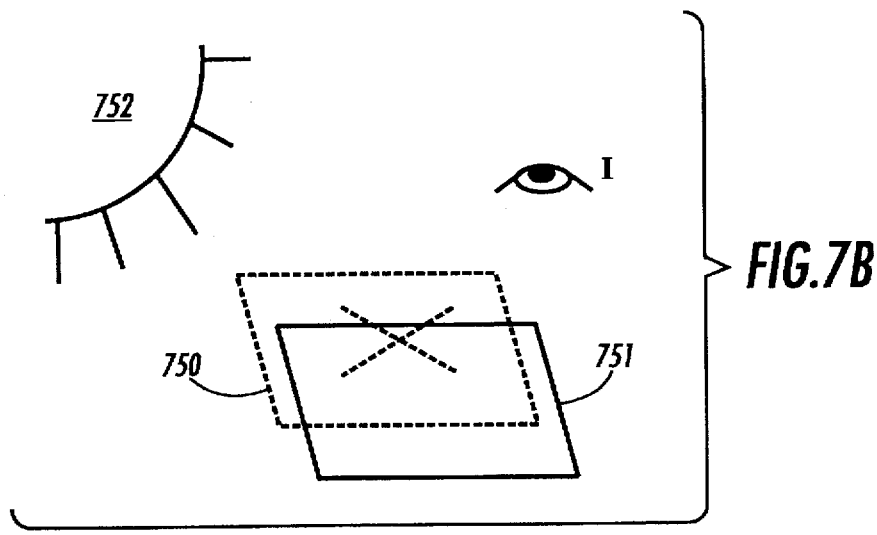
FIG. 7B illustrates the use of an overlay transparency gyricon.

FIG. 7B illustrates schematically the use of an overlay transparency gyricon in conjunction with an underlying document, such as a paper document. Overlay transparency 750 is placed over document 751 and illuminated by light from light source 752, such as sunlight or ambient light. The light incident on transparency 750 is modulated, being passed through the transparent segments of some balls and absorbed or partially reflected by the opaque segments of other balls, according to which segment of each ball is presented to the observer at I. Light that passes through transparency 750 to reach document 751 can there be absorbed (e.g., by black text) or reflected (e.g., by a white background). Light reflected from document 751 can then pass back through transparent portions of transparency 750 so as to reach the observer at I.

An overlay transparency gyricon can also be used in a backlit mode, for example with a collimated light source such as a projector to make a black-and-white projected image. This is illustrated schematically in FIG. 7C and in a particular example (an overhead projector 759) in FIG. 7D. In each of these figures, light source 753 provides a bright, preferably white light that is collimated by a condensing lens 754, modulated by overlay transparency 755, and thereafter projected by a projection lens 756 onto a view screen 757 so as to form an image viewable by an observer at I. If overlay transparency 755 is made up of balls like ball 740 that have opaque background and highlight color segments, it is not especially well-suited for backlit use, inasmuch as the background and highlight colors, being opaque, cannot be distinguished from one another in the image projected on screen 757. Nevertheless, this mode of use can be worthwhile in some instances, and is included here for completeness of exposition. (Gyricon devices that are capable of producing color projected images and are thus better suited for use in projective or other backlit modes modes include the additive and subtractive color gyricons that are described below with reference to FIGS. 10A–10C and FIGS. 11A–11C, respectively.)

Architectural Screens

Transmissive polychromal-ball gyricon technology can be applied to make cost-effective, electrically actuated privacy and light control screens that can be used in architectural and interior design applications, for example, in electronic window shades, electronic Venetian blinds, or electronic room partition screens. A gyricon suitable for an architectural screen application can be made similar in construction to the highlight color display 500 of FIG. 5, except for the balls used. These can be like the five-segment ball 740 illustrated in FIG. 7A, with a broad transparent central segment 743, two thin pigmented or dyed segments 742, 744, and two transparent outer segments 741, 745. The ball appears transparent when oriented with its transparent central segment 743 facing the observer.

By applying an electric field in or parallel to the plane of the sheet in which the five-segment balls are embedded, the balls can be oriented to present their transparent aspect to an observer, and thus the architectural screen can be made to transmit incident light. Similarly, an electric field perpendicular to the sheet can be used to display the pigmented or dyed aspects of the five-segment balls to the observer. The perpendicular field can be made addressable, for example at low resolution (for example, for each rectangular louver or shutter element of an electronic Venetian blind) or at high resolution (for example, for each pixel, with one or more balls being used per pixel) according to the particular application.

The pigmentation or dye chosen for ball segments 742, 744 can depend on the intended use of the architectural screen. For example, light-absorbing, light-reflecting, or light-scattering pigments can be used, or colored pigments or dyes can be used. Moreover, different balls in a gyricon can be differently pigmented or dyed, and patterns are possible, so that designs, patterns, or pictures can be imposed on the architectural screens. Thus gyricon architectural screens can be built that will be almost fully transparent or that will absorb light, reflect light, or even create changes in decor at the touch of a button, in response to a momentary application of low-level electrical power.

Transparent central segment 743 can be clear, but can also be, for example, tinted, translucent, or "smoke-glass" colored. Again, the particular choice made for transparent central segment 743 depends on the intended use of the screen, and different balls in a gyricon can use different kinds or colors of transparent segments.

An example application for the architectural screen is in a "smart" window. The windowpane can be built to incorporate a transmissive gyricon architectural screen, for example by forming the windowpane of two layers of glass with an elastomer sheet containing five-segment balls situated between the layers. Each glass layer is coated with a transparent electrode coating, such as ITO, disposed toward the elastomer sheet. The transparent electrode coatings are used to apply voltages to the gyricon.

Figure 7C:
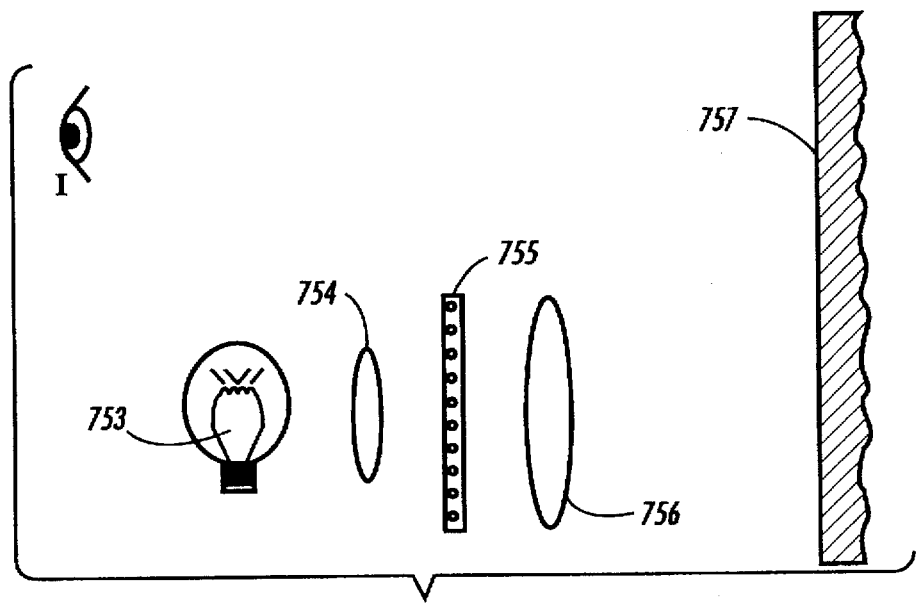
FIGS. 7C–7D show how a light-transmissive gyricon can be used in a projection mode.
Figure 7D:
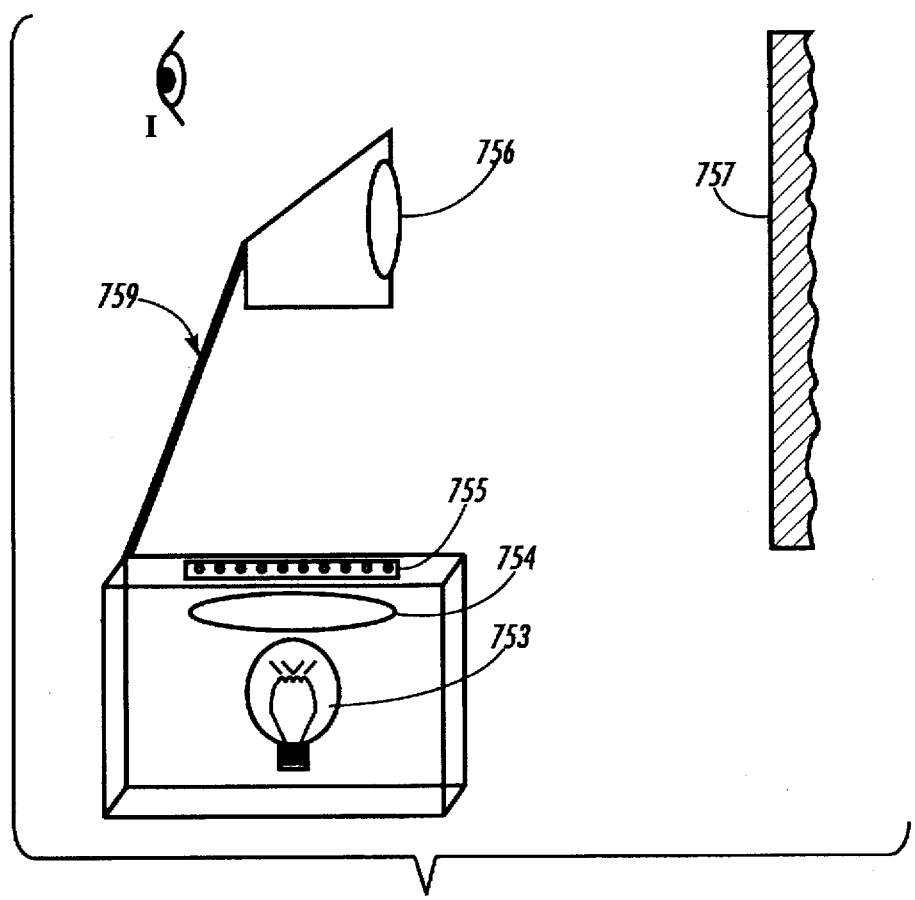
Figure 7E:
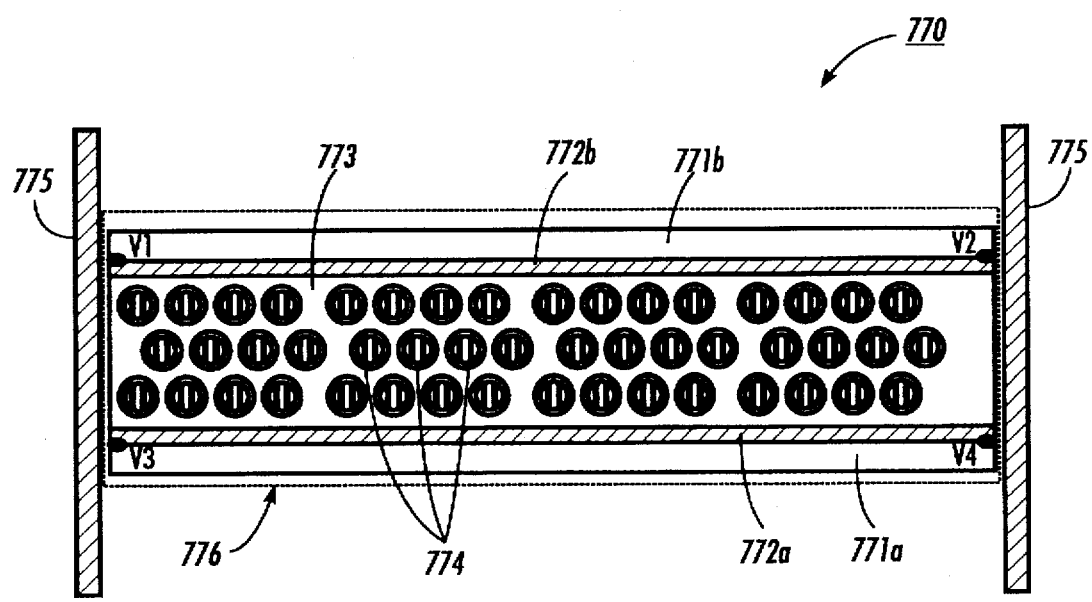
FIG. 7E illustrates an application of a gyricon in an architectural screen.

FIG. 7E is a cross-sectional view of such a window. Window 770 includes window frame 775 and windowpane 776. Windowpane 776 has outer layers of glass 771a, 771b. Layer 771a has a transparent electrode coating 772a disposed toward the interior of windowpane 776 and layer 771b has a transparent electrode coating 772b also disposed toward the interior of windowpane 776. Between the electrode coatings 772a, 772b is an elastomer sheet 773 permeated with dielectric fluid and containing five-segment balls 774. The entire windowpane is thus a gyricon. The electrodes can be used to apply voltages V1, V2, V3, V4 (here shown at the corners of windowpane 776, but more generally at the corners of any addressable areal region within windowpane 776) that can be used to rotate the five-segment balls to any desired orientation, using the variable-angle or canted electric field technique described in the next section with reference to FIGS. 8A–8C.

A gyricon architectural screen can be made that provides adjustable, continuously variable light transmission ranging from substantially complete transmission of incident light to substantially complete occlusion of incident light. This adjustability can be achieved by using an electrode configuration suitable for causing partial rotation of the balls, so that the balls can be oriented at any angle with respect to the surface of the gyricon sheet.

Variable-Angle (Canted) Electric Fields

More generally, an electrode configuration that can produce an electric field at any angle with respect to the surface of the gyricon sheet, and thus provide continuously variable ball orientation, can be used in a wide variety of gyricon devices. For example, it can be used with highlight color balls having transparent central segments to build a gray-scale overlay transparency, or with black-and-white opaque bichromal balls to build a gray-scale ambient-light reflective display. The same configuration can also be used to provide both the addressing (perpendicular) and erasure (parallel) fields in a highlight color gyricon display and, in particular, to provide individually eraseable pixels. (Although the electrode configuration's ability to provide a continuous range of electric field angles and ball rotations is not fully used in this case, nevertheless its ability to produce both the parallel and perpendicular fields with a single electrode structure can be advantageous.)

Figure 8A:
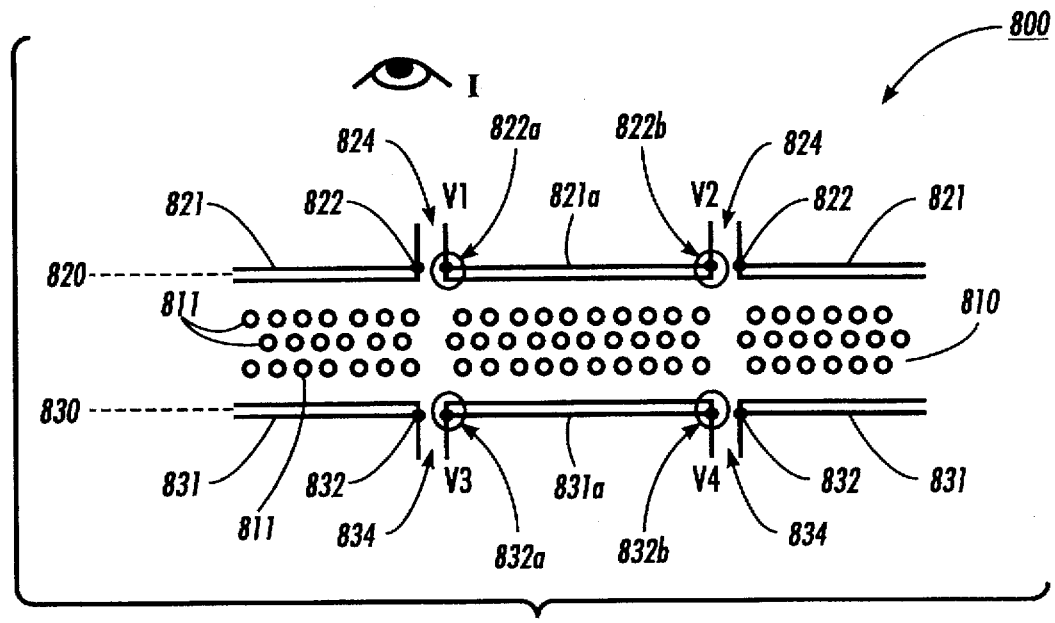
FIGS. 8A–8C illustrate an electrode configuration that provides a canted field for a gyricon.
Figure 8B:
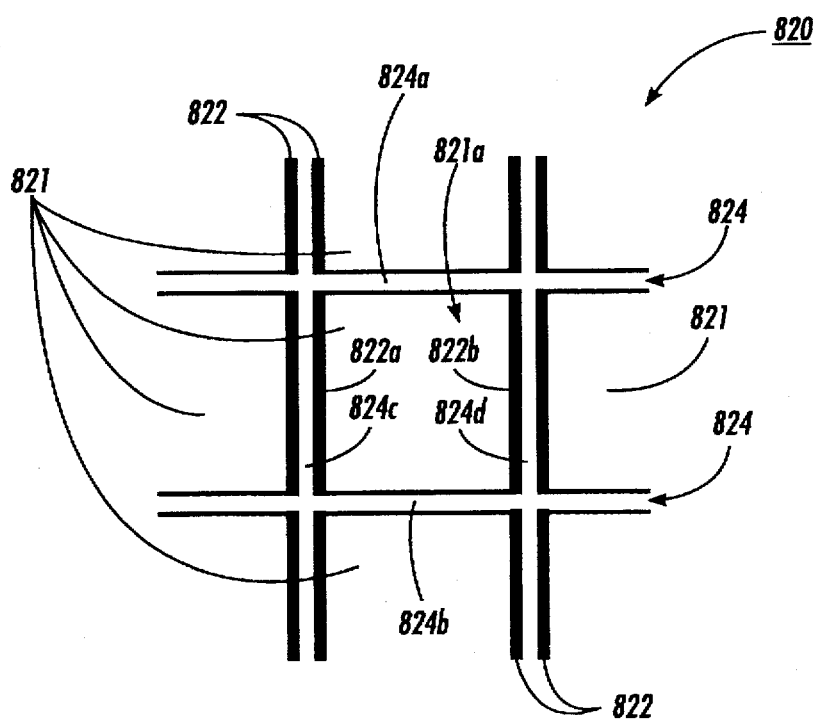
Figure 8C:
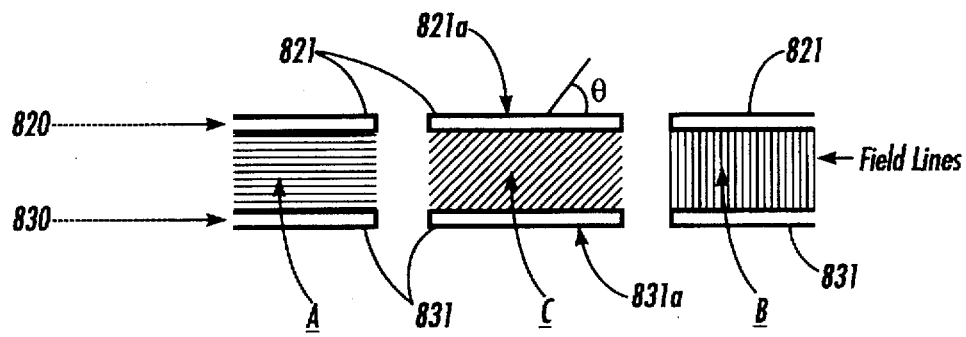

FIGS. 8A–8C illustrate an electrode configuration that provides an active matrix array so that individual gyricon balls or groups of balls can be addressed and can be rotated to any desired angle. The electrode configuration can generate an electric field oriented at an arbitrary angle to the surface of the gyricon sheet in the vicinity of any ball or group of balls (for example, a group of balls forming a pixel or subpixel). Hereinafter, this configuration sometimes will be called a canted-field electrode configuration.

FIG. 8A shows a side view of a portion of a gyricon 800 having a canted-field electrode configuration. Electrode assemblies 820, 830 are located on either side of an elastomer sheet 810 in which polychromal balls 811 are embedded. Top electrode assembly 820, which is closest to an observer at I, is made of an optically transparent conductor with a very high resistivity. Bottom electrode assembly 830, which is on the opposite side of sheet 810 from an observer at I, also has a very high resistivity and can also be transparent, depending on the application. Each of the top and bottom electrode assemblies 820, 830 is divided into rectangular regions; in particular, top electrode assembly 820 includes regions 821 and bottom electrode assembly 830 includes regions 831. The rectangular regions are separated by high-resistivity separators; in particular, separators 824 separate the regions 821 of top electrode assembly 820 and separators 834 separate the regions 831 of bottom electode assembly 830. Both electrode assemblies 820, 830 can be connected to a power supply (not shown). Separators 824, 834 can be, for example, made of glass or other substrate material.

For some applications, it is preferable that the top electrode assembly 820 be made so as not to electrically isolate the polychromal balls 811 from an externally applied addressing field, such as the field of a writing stylus. Since an electrode is electrically transparent to electric fields that change at a rate faster than the capacitive response time of the electrode, this condition can be met by making the regions 821 of a sufficiently high resistivity material.

Within each of the regions 821 are located individually addressable bus bars 822, and within each of the regions 831 are located individually addressable bus bars 832. Top electrode bus bars 822 are situated parallel to and directly above their counterpart bottom electrode bus bars 832. The voltage at each individual bus bar can be set using active matrix addressing electronics (not shown) incoporated into gyricon 800 or housed separately. (For example, active matrix addressing electronics can be pressed into contact with sheet 810 in a manner similar to that in which active matrix addressing electronics are pressed into contact with a liquid crystal layer in an LCD.) Thus each of the regions 821, 831 can be individually addressed and can correspond, for example, to a pixel or subpixel of a pixel-addressable display.

As an example, bus bars 822a and 822b are located on either side of top electrode region 821a, and bus bars 832a and 832b are located on either side of bottom electrode region 831a. Bus bar 822a is parallel to and directly above bus bar 832a, and bus bar 822b is parallel to and directly above bus bar 832b. The voltage at bus bar 822a is V1; at 822b, V2; at 832a, V3; and at 832b, V4. By addressing the bus bars 822a, 822b, 832a, 832b and setting the voltages V1, V2, V3, V4 appropriately, as described more fully below with reference to FIG. 8C, electric fields can be established in sheet 810 in the vicinity of these bus bars, so that the polychromal balls 811 within a parallelepiped-shaped portion of sheet 810 bounded by bus bars 822a, 822b, 832a, 832b can be addressed as an individual display element.

FIG. 8B shows a portion of top electrode assembly 820, viewed from above. Separators 824 criss-cross top electrode assembly 820, and paired bus bars 822 flank each of the regions 821. For example, region 821a is delimited by separators 824a, 824b, 824c, and 824d. Bus bars 822a, 822b are situated along either side of region 821a, within the perimeter established by separators 824a, 824b, 824c, and 824d. The structure of bottom electrode assembly 830 (not visible in FIG. 8B) is similar to that of top electrode assembly 820; in particular, bottom electrode region 831a is situated below top electrode region 821a, and bus bars 832a, 832b are situated parallel to and directly below bus bars 822a, 822b, respectively.

FIG. 8C shows three examples of electric fields that can be produced with the canted-field electrode configuration (fringing effects are negligible and, accordingly, are not shown). In the first example at A, the electric field lines run parallel to the planes of electrodes 820, 830, and thus parallel to the surface of sheet 810 (not shown in FIG. 8C). In the second example at B, the electric field lines run perpendicular to the planes of electrodes 820, 830 and thus perpendicular to the surface of sheet 810. In the third example at C, the electric field lines run at an angle θ with respect to the planes of electrodes 820, 830 and thus with respect to the surface of sheet 810.

The different fields illustrated in FIG. 8C can be generated by setting the voltages on the bus bars 822, 832 appropriately. For example, if in FIG. 8A the voltages V1, V2, V3, V4 at bus bars 822a, 822b, 832a, 832b, respectively are set so that V1=V3 and V2=V4, then electric field lines like those at A in FIG. 8C are generated in the vicinity of these bus bars, that is, electric field lines running parallel to the planes of electrodes 820, 830. If in FIG. 8A the voltages V1, V2, V3, V4 at bus bars 822a, 822b, 832a, 832b, respectively are set so that V1=V2 and V3=V4, then electric field lines like those at B in FIG. 8C are generated in the vicinity of these bus bars, that is, electric field lines running perpendicular to the planes of electrodes 820, 830. If in FIG. 8A the voltages V1, V2, V3, V4 at bus bars 822a, 822b, 832a, 832b, respectively are set so that V1>V3 and V2>V4, then electric field lines like those at C in FIG. 8C are generated in the vicinity of these bus bars, that is, electric field lines running at an angle θ with respect to the planes of electrodes 820, 830. The value of the angle θ is determined by the particular values of the voltages, and can be changed by adjusting the voltages. Thus a continuous, 360-degree range of electric field directions can be generated.

Figure 8D:
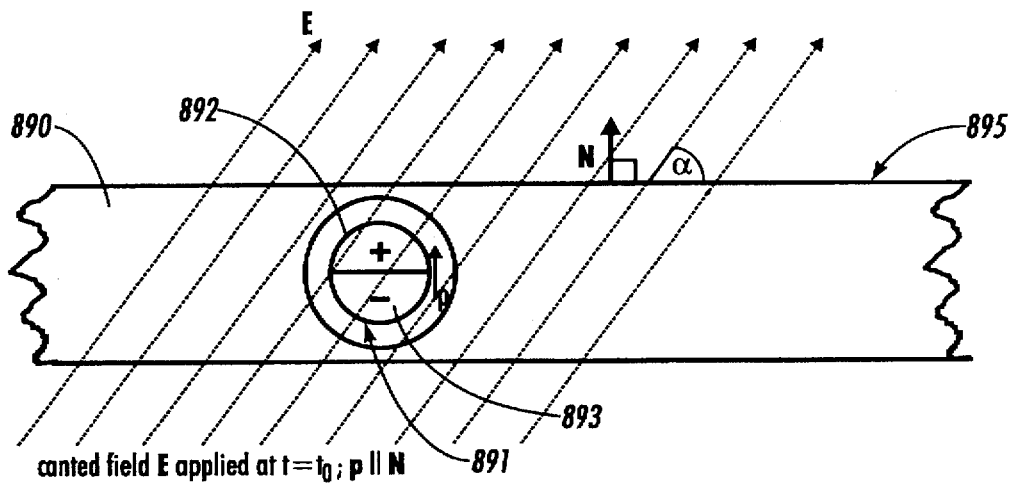
FIGS. 8D–8E are examples of the effects of a canted field on a gyricon ball.
Figure 8E:
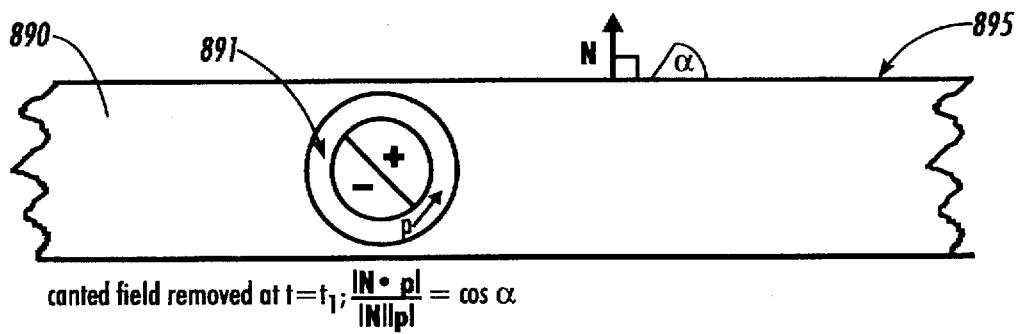

It will be appreciated that application of a canted field to a gyricon ball can cause the ball to rotate, for example, through an angle of less than 180 degrees. In FIG. 8D, exemplary gyricon ball 891 in substrate 890 has its maximum positive zeta potential at a first end 892 and its maximum negative zeta potential at a second end 893. Thus ball 891 has a dipole moment, here represented by a vector p. In a gyricon of the prior art, dipole moment vector p would, in the absence of an applied electric field, preferably be oriented either parallel or antiparallel to a vector N defining a normal to a surface 895 of the substrate 890 in which ball 891 was disposed. Application of an electric field to ball 891 would cause ball 891 to rotate, if at all, through a 180-degree angle, so that upon deactivation of the field, dipole moment vector p would once again be either parallel or antiparallel to surface normal vector N. Canted fields can likewise accomplish this 180-degree rotation, but they can also do more. According to the invention, application of a canted field oriented neither parallel nor antiparallel to the surface normal vector N causes the ball to rotate through an angle of less than 180 degrees so as to align with the canted field, and to remain there after the field is turned off until such time as another, differently oriented electric field is applied. For example, as shown in FIG. 8D, application of a canted field having electric field vector E at a time to will cause ball 891 to align with the field by rotating through an angle $\alpha$; removal of the field at a later time $t_1$ as shown in FIG. 8E leaves the ball's dipole moment vector p at the angle $\alpha$ to surface normal vector N. To summarize, whereas in the prior art, in which the application of an electric field served to rotate the dipole moment vector of a gyricon ball either through an angle of 180 degrees, or not at all, according to the invention, the application of a canted electric field can serve to rotate the dipole moment vector of the ball through any desired angle.

Figure 8F:
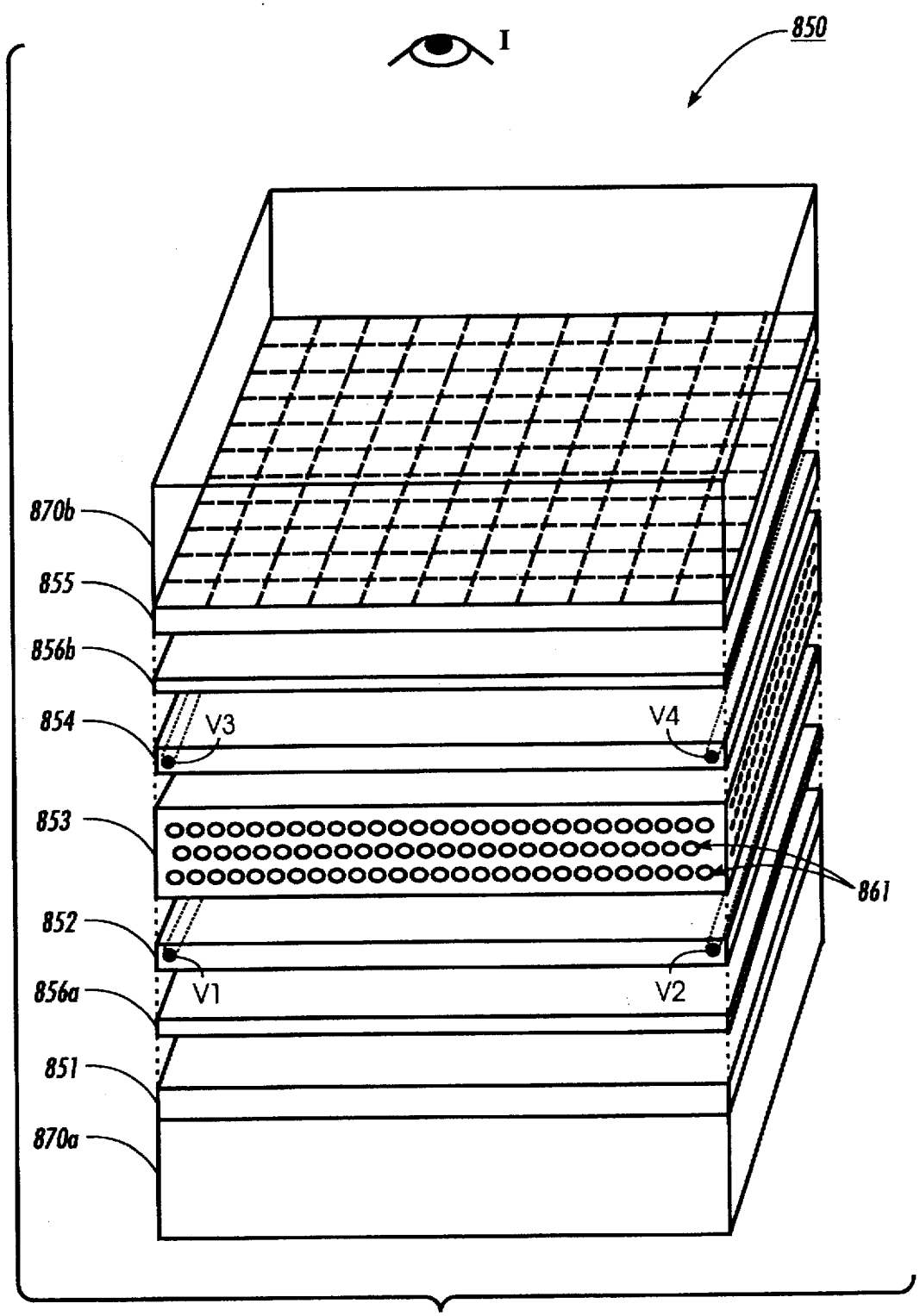
FIG. 8F illustrates an electrode configuration that is an alternative to the canted field configuration of FIGS. 8A–8C.

An alternative approach to the canted-field electrode configuration is illustrated in the exploded view of FIG. 8F. A gyricon 850 has elastomer sheet 853 with gyricon balls 861. Sheet 853 is surrounded by two high-resistivity erase electrodes 852, 854 that can generate electric fields in or parallel to the plane of sheet 853, in a manner similar to that previously described with reference to FIGS. 6A–6D. A low-resistance ground-plane electrode 851 is disposed on the opposite side of erase electrode 854 from sheet 853. A matrix addressing electrode assembly 855 is disposed on the opposite side of erase electrode 852 from sheet 853. Thin dielectric separator layers 856a, 856b separate, respectively, erase electrode 852 from ground plane 851 and erase electrode 854 from addressing electrode assembly 855. The layers 856a, 856b can be, for example, a deposited polymer or a plastic sheet. Surrounding the electrode configuration are two substrate layers 870a, 870b. At least one face of gyricon 850 is optically transparent. For example, if an observer at I is to view gyricon 850, then substrate layer 870b, addressing electrode assembly 855, dielectric separator 856b, and erase electrode 854 preferably should all be transparent. For some applications, such as the "smart" window application previously described with reference to FIG. 7E and other architectural screen applications, all components outside gyricon sheet 853 (that is, the electrodes 851, 852, 854, 855, both dielectric separators 856a, 856b, and both substrate layers 870a, 870b) can advantageously be made transparent.

The voltages V1, V2, V3, V4 provided by the erase electrodes 852, 854 should be set such that V1=V3 and V2=V4 for an in-plane erasure field, which when applied to balls 861 causes balls 861 to align with their electrical dipole moments in the plane of sheet 853. Alternatively, if other values of V1, V2, V3, and V4 are chosen, a canted field is produced by which balls 861 can be oriented with their dipole moments at an arbitrary angle to the plane of sheet 853.

The electrode configuration of FIG. 8F provides only a limited canted-field capability. This is because the erase electrodes 852, 854 do not provide pixels or other addressable image elements, but instead act on all the balls 861 together. Addressing electrode assembly 855, which does have addressable elements, in conjunction with ground plane 851 can only produce electric fields that are perpendicular to the plane of sheet 853, and cannot produce canted fields. Thus the electrode configuration of FIG. 8F is not readily adaptable to a display in which, for example, it is desired to have different canted field angles on a per-pixel or per-subpixel basis. Even so, the configuration can be useful in certain circumstances, as for example in a low-cose, low-resolution application in which it is desired to have a first subset of balls 861 of the gyricon to be oriented with their electrical dipole moments pointed upwards with respect to the the plane of sheet 853, a second subset oriented with their dipole moments pointed downwards with respect to the plane of sheet 853, and a third subset oriented with their dipole moments at a selected cant angle with respect to the plane of sheet 853, the selected angle being the same for all balls of the third subset. The configuration is also useful in conjunction with certain multithreshold gyricons, as will be discussed below with reference to FIGS. 14A–14G.

Pseudo-Four Color Gyricon

A gyricon with a canted-field electrode configuration can be used to provide a display having four colors plus white (or another suitable background color). A multichromal ball suitable for such a display can be made with seven segments including a transparent central segment, transparent first and second exterior segments, and four colored interior segments, two on each side of the central segment. The ball and display will now be described with reference to FIGS. 9A–9D.

Figure 9A:
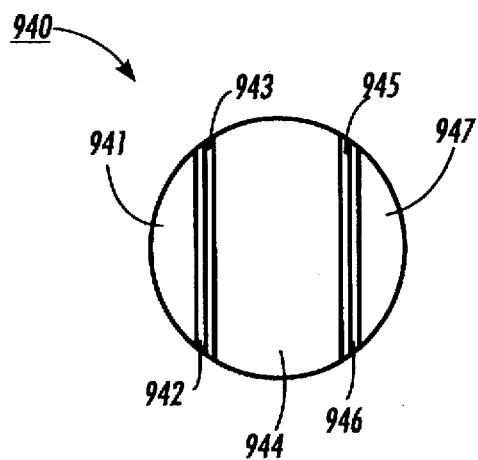
FIGS. 9A–9C are different views of a seven-segment ball for a pseudo-four color gyricon.

FIG. 9A shows a side view of a seven-segment polychromal ball 940. The broad central segment 944 and the endmost segments 941, 947 are transparent (for example, clear). Each of the four thinner segments 942, 943, 945, 946 can be a different color; for example, segment 942 can be red, segment 943 can be green, segment 945 can be yellow or black, and segment 946 can be blue. Many other color combinations are also possible. For example, combinations of achromatic and chromatic colors can be used; two segments can be made the same color (for instance, both segments 943 and 945 can be green, or both segments 942 and 946 can be red); and so forth. The fabrication techniques described above can be used to make ball 940; in particular, the broad central segment 944 can be composed of two thinner transparent segments of like material that effectively merge to form the broad central segment.

Ball 940 is made with segments of different zeta potentials, so that it can be oriented to different orientations by application of suitable electric fields. In particular, segment 941 can be made with the highest positive zeta potential of any segment in ball 940, and segment 945, with the highest negative zeta potential of any segment in ball 940.

Figure 9B:
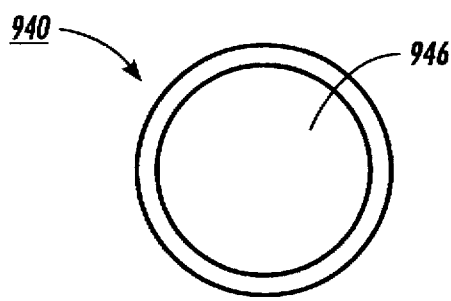
Figure 9C:
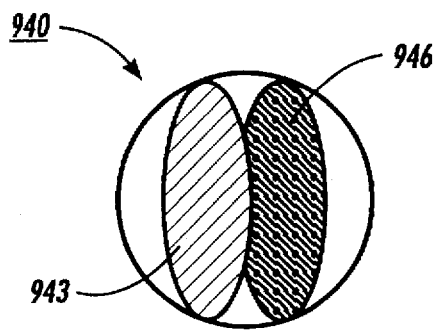

If ball 940 is rotated so that segment 946 faces an observer, the observer sees the color of segment 946, for example, blue. This is illustrated in FIG. 9B. Similarly, if ball 940 is rotated so that segment 942 faces the observer, the observer sees the color of segment 942, for example, red. If ball 940 is rotated to an orientation between these two extremes, for example, by using the canted-field electrode configuration to generate an angled electric field as was described with reference to FIG. 8C, the observer sees a combination of two colors. These will be either the colors of segments 942 and 945 (for example, red and yellow) or, as shown in FIG. 9C, the colors of segments 943 and 946 (for example, green and blue).

Figure 9D:
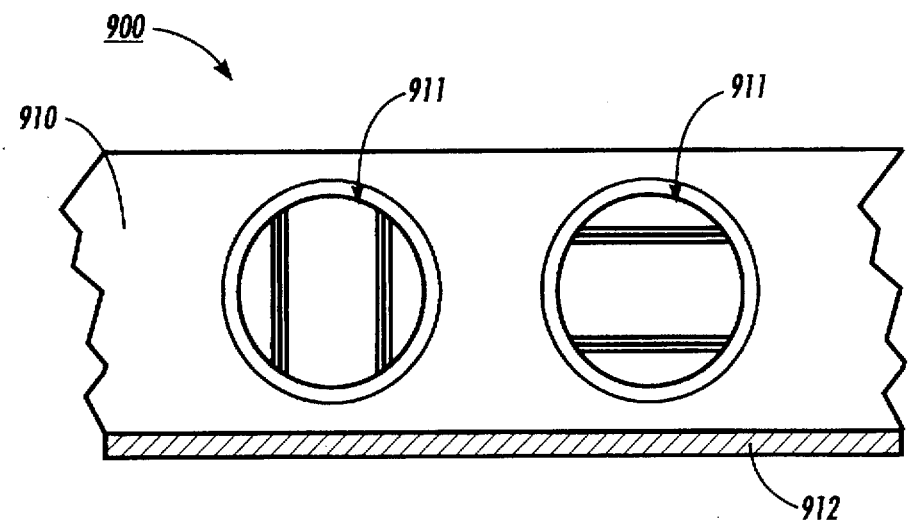
FIG. 9D illustrates a pseudo-four color gyricon that has a layer of backing material.

Finally, white can be obtained by using a white background below the ball, and turning the ball to the 90-degree position so that the broad central segment 944 faces the observer. The background can be provided, for example, by adhesively attaching an opaque white backing to the elastomer sheet on the side away from the observer. An example is shown in FIG. 9D, which illustrates a side view of a portion of a gyricon 900 that includes elastomer layer 910, seven-segment balls 911, and a layer of backing material 912 attached to elastomer layer 910. Alternatively, the backing can be omitted or can be made of a transparent material, so that the gyricon sheet can be used as an overlay transparency, for example, to be overlaid on a textual document or other opaque or reflective background.

With this arrangement, the resulting display provides good color saturation for the colors of segments 942 and 946, and lesser color saturation of the colors of segments 943 and 945. Thus it can display parts of the color gamut that are unobtainable with a two-color display.

Full-Color (RGB) Additive Color Gyricon

Figure 10A:
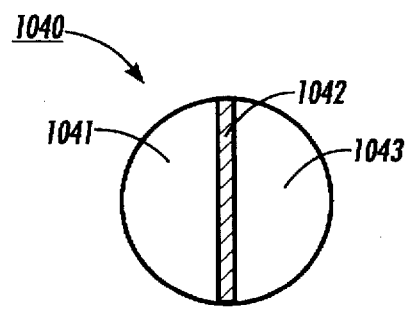
FIG. 10A illustrates a three-segment gyricon ball made up of a colored interior segment surrounded on either side by transparent exterior segments.

A gyricon with a canted-field electrode configuration can be used to provide a full-color, red-green-blue (RGB) additive color image. FIG. 10A illustrates a three-segment gyricon ball suitable for such a display. Ball 1040 has two broad transparent (for example, clear) outer segments 1041, 1043 and a thin central segment 1042. For an RGB display, central segment 1042 is pigmented or dyed red, blue, or green. Ball 1040 is made with segments of different zeta potentials, so that it can be oriented to different orientations by application of suitable electric fields. In particular, segment 1041 can be made with the highest positive zeta potential of any of the three segments in ball 1040, and segment 1043, with the highest negative zeta potential of any of the three segments.

To make a full-color RGB display, a gyricon sheet can be formed of balls like ball 1040. For a pixel-addressable RGB display, each pixel can include a red subpixel, a green subpixel, and a blue subpixel, with each subpixel containing one or more balls of its respective color. Preferably, a subpixel contains a large number of balls (for example, nine or more) located near to one another. A canted-field electrode configuration is provided such that each pixel or subpixel can be individually addressed and the ball or balls within that pixel or subpixel can be oriented at any angle with respect to the sheet's surface.

Figure 10B:
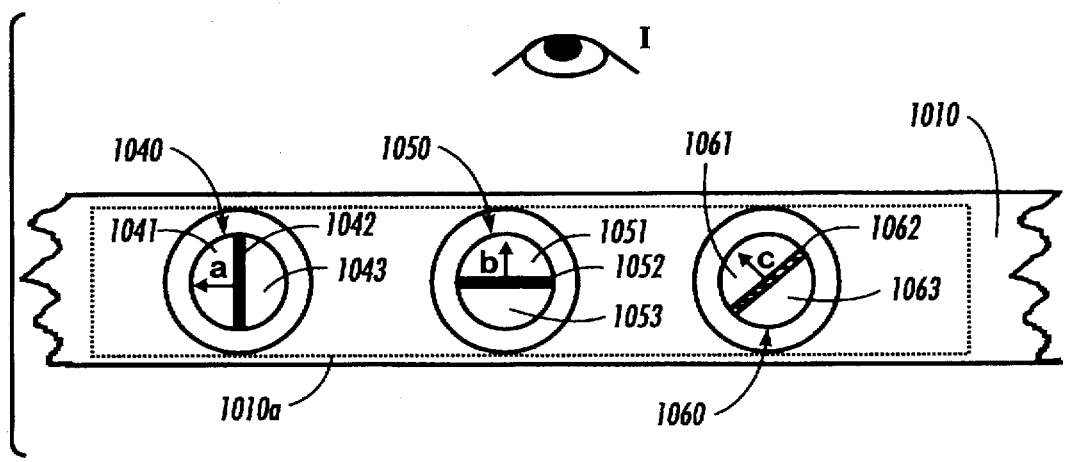
FIG. 10B illustrates an elastomer sheet for a full-color RGB (red-green-blue) gyricon.

FIG. 10B illustrates a side view of a portion of an elastomer sheet 1010 from an RGB gyricon. Sheet 1010 contains balls such as balls 1040, 1050, and 1060, each of which has two broad transparent outer segments and a thin, colored central segment. Ball 1040 is oriented in a direction indicated by arrow a, with its thin central segment 1042 seen edge-on by an observer at I. In this orientation, which can be achieved by applying an electric field parallel to the surface of sheet 1010 in the vicinity of ball 1040, ball 1040 appears substantially transparent to an observer at I. Ball 1050, which has transparent outer segments 1051, 1053 and central segment 1052, is oriented in a direction indicated by arrow b. In this orientation, which can be achieved by applying an electric field perpendicular to the surface of sheet 1010 in the vicinity of ball 1050, central segment 1052 is seen face-on so that ball 1050 appears as a fully saturated color to an observer at I. Ball 1060, which has transparent outer segments 1061, 1063 and central segment 1062, is oriented in a direction indicated by arrow c. In this orientation, which can be achieved by applying an electric field at an angle intermediate between parallel and perpendicular to the surface of sheet 1010 in the vicinity of ball 1060, central segment 1062 is seen at an angle, so that ball 1060 appears as a partially saturated color to an observer at I.

If, for example, central segments 1042, 1052, and 1062 are colored red, green, and blue, respectively, then the portion of sheet 1010 indicated as 1010a in FIG. 10B can serve as a pixel having one ball of each color; each of balls 1040, 1050, 1060 provides a subpixel of this pixel. (In practice, as indicated above, an RGB gyricon is likely to have many balls per subpixel. Nevertheless, the one-ball-per-subpixel arrangement illustrated here is also possible, and provides an easily understood example for purposes of exposition and discussion.)

The colored central segments of the balls used in an RGB gyricon, such as balls 1040, 1050, 1060, can be either light-reflective (i.e., of opaque colors) or light-transmissive (i.e., of transparent colors). If the central segments are light-reflective, the RGB gyricon provides a reflective display that can be viewed in ambient light. For example, an RGB gyricon having a transparent elastomer layer and balls with light-reflective central segments can be used as an overlay transparency, in a manner similar to that previously described for transparency 750 in FIG. 7B above. If the central segments are light-transmissive and if other components are suitably transparent, the gyricon provides a transmissive display that can be viewed by being backlit or used in conjunction with a projector, such as an overhead projector, or by being placed on a sheet of ordinary white paper or other diffuser.

For example, an RGB gyricon having a transparent elastomer layer and balls with light-transmissive central segments can be used in a projector in a manner similar to that previously described for transparency 755 in FIGS. 7C–7D above. However, whereas the projected image produced with the highlight color gyricon previously described was a black-and-white image, here the image projected on screen 757 appears in full color. This is because the central color segments of the balls of the gyricon are transmissive rather than opaque.

As another example, an RGB gyricon having a transparent elastomer layer and balls with light-transmissive central segments can be used in a manner similar to that previously described for transparency 750 in FIG. 7B above. However, whereas the black and highlight color segments of the balls in the highlight color gyricon previously described absorbed or reflected incident light, here the color segments of the balls within the RGB gyricon act as color filters. White light passing through the color segments of the balls can be reflected by an underlying white sheet of paper (such as document 751) and then pass back through the gyricon to the observer at I, where it will appear red, green, or blue as the case may be. Again, this is because the central color segments of the balls of the gyricon are transmissive rather than opaque.

As yet another example, in some cases it is useful to provide a display that is readable either by transmitted light or by ambient light. This can be done for an RGB gyricon having a transparent elastomer layer and balls with light-transmissive central segments, again by using an overlay arrangement in a manner similar to that previously described for transparency 750 in FIG. 7B above, but with the underlying document 751 being replaced by a special surface that appears white in reflected light, yet is reasonably transmissive to backlight. A suitable material for such a surface is so-called opal glass (available from the EDMUND SCIENTIFIC CO.; said to be "similar to ground glass but one surface is flashed with a milky white 'opal' covering to diffuse light evenly," Edmund Scientific Co. Catalog #14N1, p. 47). With this arrangement, the display appears white both by reflected ambient light and by transmitted backlight (e.g., projected light as in FIG. 7D) with the balls oriented with their center segments perpendicular to the plane of the gyricon, so as to reveal the opal glass to the observer. When the balls are oriented with their center segments parallel to the plane of the gyricon, the display takes on the colors of the colored center segments, both by reflected and by transmitted light.

The transmissive RGB gyricon does not, by itself, provide a black color. Thus in the previous two examples in which the transmissive RGB gyricon is used with a sheet of white paper or with opal glass, the available color gamut ranges from fully saturated colors to white, but does not include black. However, if underlying document 751 is a black and white document, such as an ordinary page of black printed text on white paper, then the black of this document can be perceived through the transparency 750. Thus an application for which the RGB gyricon transparency can be well-suited is as an "electric highlighter" overlay for black and white documents, the electric paper analog of a highlighting marker pen. For this application, RGB color capability is but one possibility, and other colors in addition to or instead of red, green, and blue can be used for the center segments of the balls that make up the gyricon. For example, an electric highlighter gyricon can be made from three-segment gyricon balls that have center segments of a transparent yellow or pink color, similar to the colors of conventional highlighting pens. (If the electric highlighter is to be used to provide a single highlight color only, then all the balls in the gyricon can have the same center segment color and the ball-placement techniques described below are thus not needed for the gyricon's fabrication.)

Figure 10C:
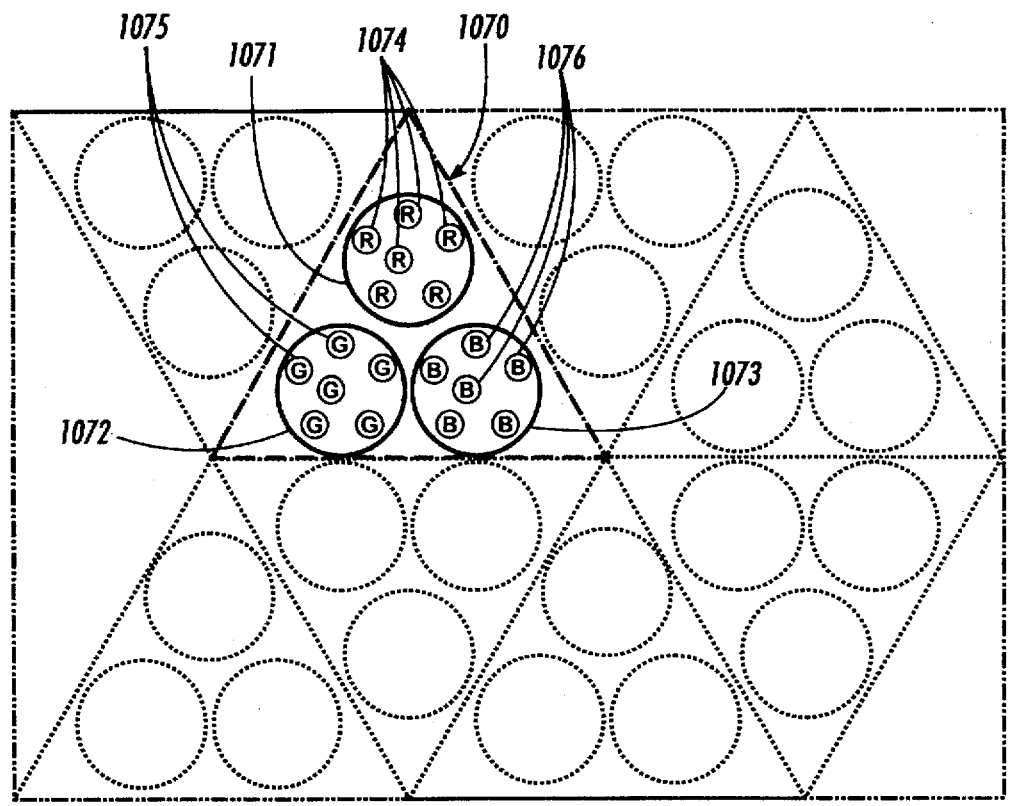
FIG. 10C shows a subpixel arrangement for a full-color RGB gyricon.

To control the red, green, and blue colors of an RGB gyricon independently of one another, it is necessary to be able to rotate balls of one color without affecting balls of the other two colors. This can be achieved, for example, by localizing balls of one color together in subpixels, as illustrated in FIG. 10C. A top view of an enlarged portion of elastomer sheet 1010 is shown. Pixel 1070 includes red subpixel 1071, green subpixel 1072, blue subpixel 1073. Each subpixel contains gyricon balls 1074, 1075, 1076 of its respective color only; for example, all the gyricon balls 1074 in red subpixel 1071 are red. The arrangement of the subpixels within each pixel can vary in different embodiments; for example, as shown in FIG. 10C, the subpixels can be arranged as the vertices of an equilateral triangle.

Techniques for placement of gyricon balls at specified positions within an elastomer sheet will be described below with reference to FIGS. 15A–15D. These techniques can be used, in particular, to position red, green, and blue gyricon balls in any desired pattern of subpixels.

Multilayer Subtractive Color Gyricon

A gyricon with a canted-field electrode configuration can also be used to provide a full-color, cyan-magenta-yellow (CMY) subtractive color image. In subtractive color imaging, unwanted color components are filtered out of incident light, typically by means of transparent color filters or dyes. Here, the gyricon balls, and more particularly their center segments, act as color filters.

A three-segment ball like the ball 1040 illustrated in FIG. 10A can be used for a subtractive color CMY gyricon, with central segment 1042 being pigmented or dyed a light-transmissive cyan, magenta, or yellow. The gyricon sheet contains three layers, situated one above the other. One layer contains cyan balls (that is, balls whose central segments are cyan); one contains magenta balls; and one contains yellow balls. Within a given layer, a group of one or more balls can serve to provide a component color for color subtraction.

Preferably, a large number of balls (for example, nine or more) located near one another are used for each component color in each pixel. A pixel is made up of a column of three color regions situated above one another, one region from each of the three layers.

Figure 11A:
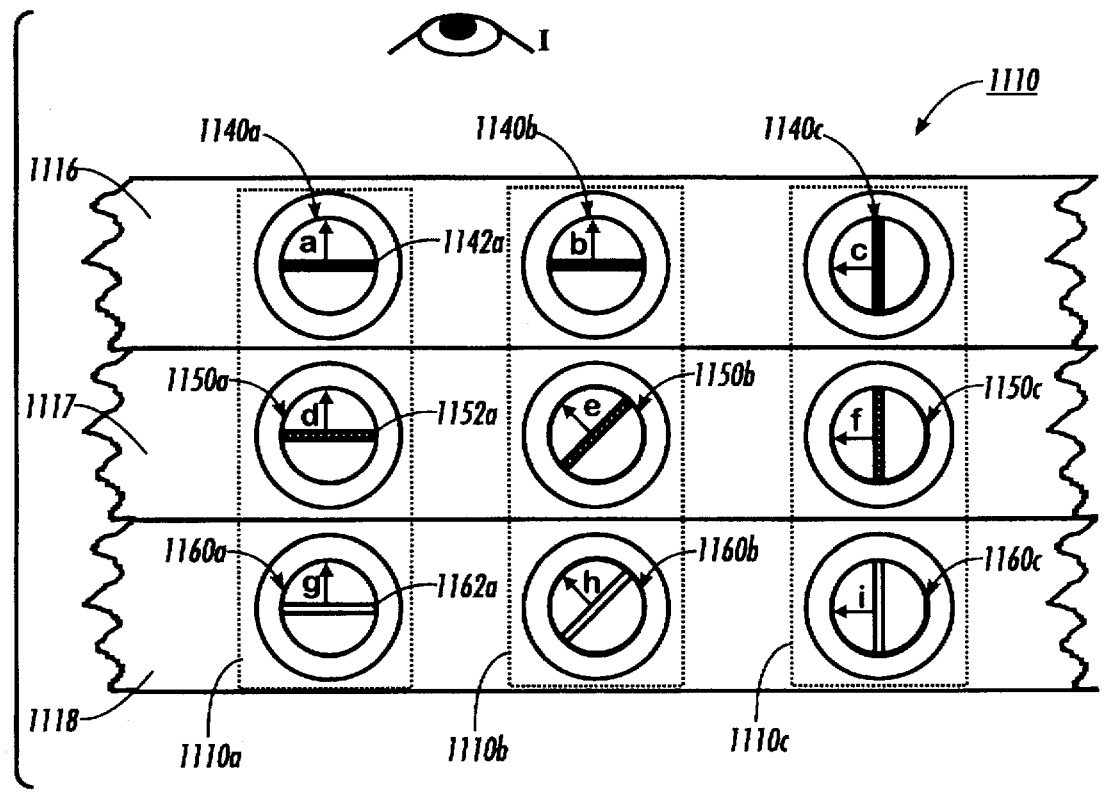
FIG. 11A illustrates an elastomer sheet for a full-color CMY (cyan-magenta-yellow) multilayer gyricon.

FIG. 11A illustrates a side view of a portion of an elastomer sheet 1110 from a CMY gyricon. Sheet 1110 has three layers 1116, 1117, 1118. Balls in layer 1116, including balls 1140a, 1140b, and 1140c, have central segments of a first color, such as yellow; for example, ball 1140a has yellow central segment 1142a. Balls in layer 1117, including balls 1150a, 1150b, and 1150c, have central segments of a second color, such as magenta; for example, ball 1150a has magenta central segment 1152a. Balls in layer 1118, including balls 1160a, 1160b, and 1160c, have central segments of a third color, such as cyan; for example, ball 1160a has cyan central segment 1162a. Each of the balls 1140a, 1140b, 1140c, 1150a, 1150b, 1150c, 1160a, 1160b, and 1160c can be made individually addressable. The orientation directions of these balls are indicated by arrows a, b, c, d, e, f, g, h, and j, respectively.

A pixel is formed by a combination of one or more color regions that can be seen in superposition by an observer at I. Thus, for example, the balls 1140a, 1150a, and 1160a in the rectangular columnar portion of sheet 1110 denoted as 1110a together can form a pixel. Similarly, the balls 1140b, 1150b, and 1160b in the rectangular columnar portion of sheet 1110 denoted as 1110b together can form another pixel, and the balls 1140c, 1150c, and 1160c in the rectangular columnar portion of sheet 1110 denoted as 1110c together can form still another pixel. (In practice, as indicated above, a CMY gyricon is likely to have many balls for each component color in each pixel. Nevertheless, the one-ball-per-color arrangement illustrated here is also possible, and provides an easily understood example for purposes of exposition and discussion.)

The balls 1140a, 1150a, and 1160a all are oriented with their central segments 1142a, 1152a, 1162a facing an observer at I, so that full color saturation obtains for the cyan, magenta, and yellow components. Accordingly, the pixel at 1110a appears black. The balls 1140c, 1150c, and 1160c all are oriented with their central segments edge-on with respect to an observer at I, so that all these balls look substantially transparent. Accordingly, the pixel at 1110c appears substantially transparent. Ball 1140b is oriented with its central segment facing an observer at I; ball 1150b, with its central segment at a first angle with respect to an observer at I; and ball 1160b, with its central segment at a second angle with respect to an observer at I. Accordingly, the yellow component of the pixel at 1110b appears fully saturated, the magenta component less saturated, and the cyan component still less saturated.

Figure 11B:
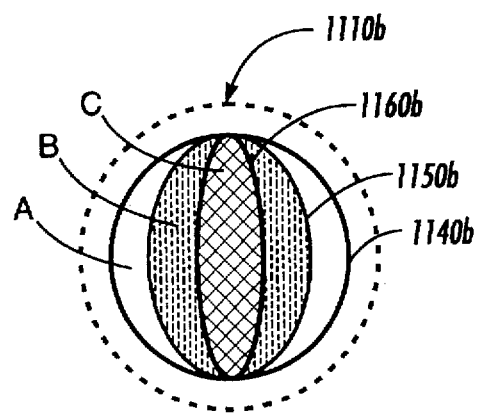
FIG. 11B illustrates a pixel in the sheet of FIG. 11A.
Figure 11C:
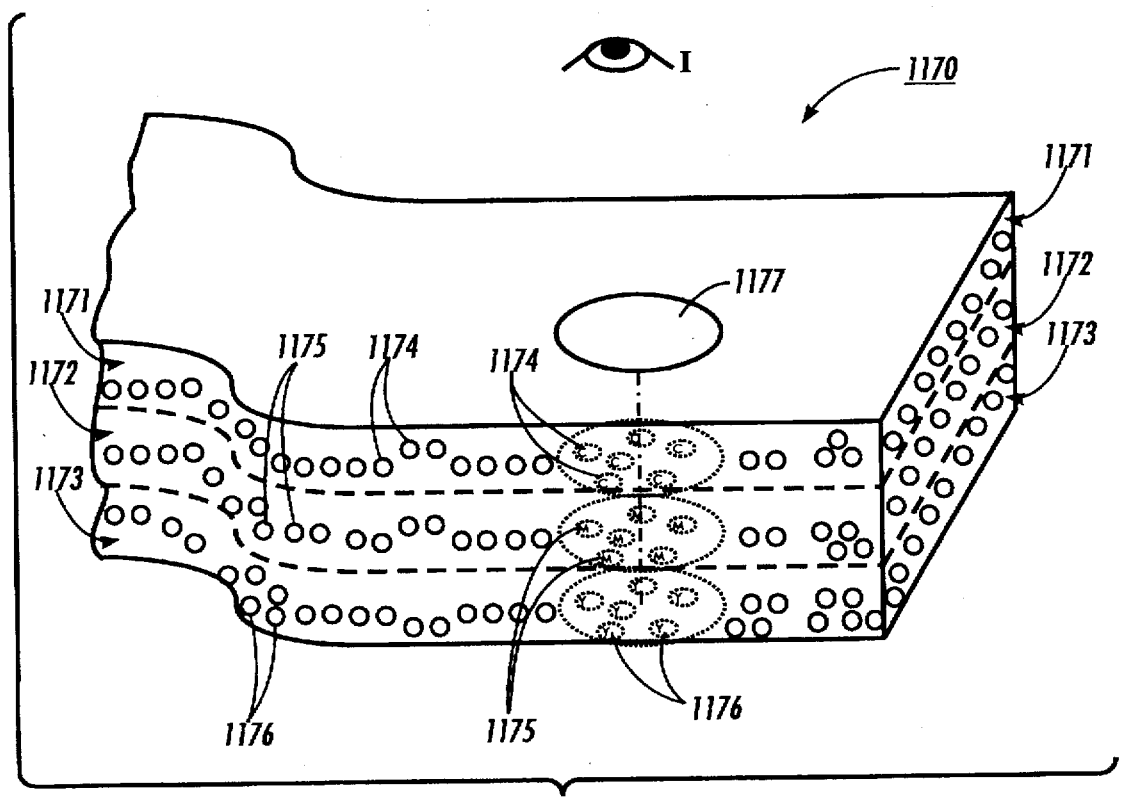
FIG. 11C depicts a cross-section of an elastomer sheet for a CMY multilayer gyricon.

FIG. 11B shows a view from above the pixel at 1110b. The central segment of ball 1140b appears as a circle A. The central segment of ball 1150b appears as a first ellipse B superposed on the circle A. The central segment of ball 1160b appears as a second, narrower ellipse C superposed on the first ellipse B. Thus in the narrow ellipse C, all three color components (yellow, magenta, cyan) are superposed.

Figure 11D:
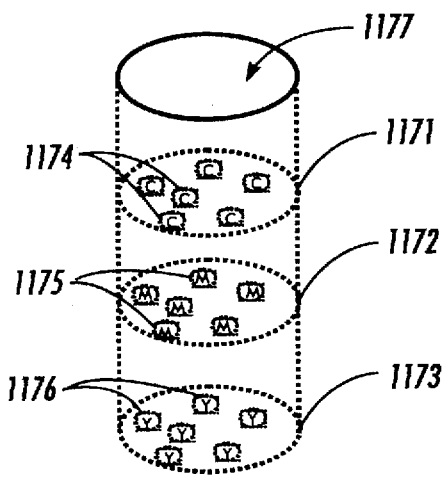
FIG. 11D is an exploded view of a pixel in the sheet of FIG. 11C.

A CMY gyricon can be fabricated either from three separate elastomer sheets (one for each color of balls) laid down on top of one another, or from a single sheet in which successive layers of different colored balls are laid down. In either case, each component color region in each pixel is preferably made up of a large number of balls, and therefore the balls of one sheet or layer need not be aligned with those of any other sheet or layer. This is illustrated in the cross-sectional view of FIG. 11C, which shows a portion of an elastomer sheet 1170 for a CMY gyricon. Sheet 1170 has a layer 1171 of cyan balls 1174 (that is, balls 1174 have cyan center segments), a layer 1172 of magenta balls 1175, and a layer 1173 of yellow balls 1176. A pixel 1177 visible to an observer at I includes a column-shaped portion of sheet 1170. FIG. 11D shows an exploded view of pixel 1177 separated from the remainder of sheet 1170. (If a CMY gyricon is constructed so that each pixel contains only one ball of each color, as shown in FIGS. 11A–11B, balls in the different layers preferably should be aligned so as to facilitate proper color subtraction.)

Preferably each of the three layers of a CMY gyricon can be addressed separately from the other two layers. One way to accomplish this is to provide a separate addressing electrode for each gyricon layer, as illustrated in the exploded view of FIG. 11E. Gyricon 1180 has a layer 1181 of cyan balls, a layer 1182 of magenta balls, and a layer 1183 of yellow balls. On either side of each layer is disposed a transparent addressing electrode in the form of a pixel array, so that a different canted field can be applied at each pixel position in each layer. Electrodes 1184a, 1184b are disposed on either side of cyan layer 1181. Electrodes 1185a, 1185b are disposed on either side of magenta layer 1182. Electrodes 1186a, 1186b are disposed on either side of yellow layer 1183. Electrodes of successive layers are shielded from one another by transparent conductors 1187a, 1187b, 1187c disposed between the electrodes of one layer and the next.

Figure 11F:
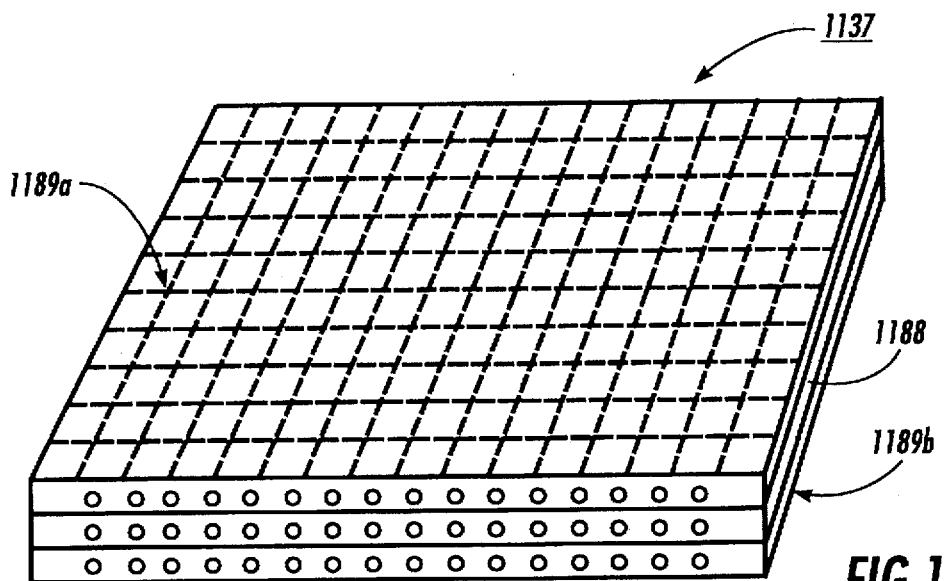
FIG. 11F illustrates a CMY gyricon having a single set of addressing hardware for all layers.
Figure 11J:
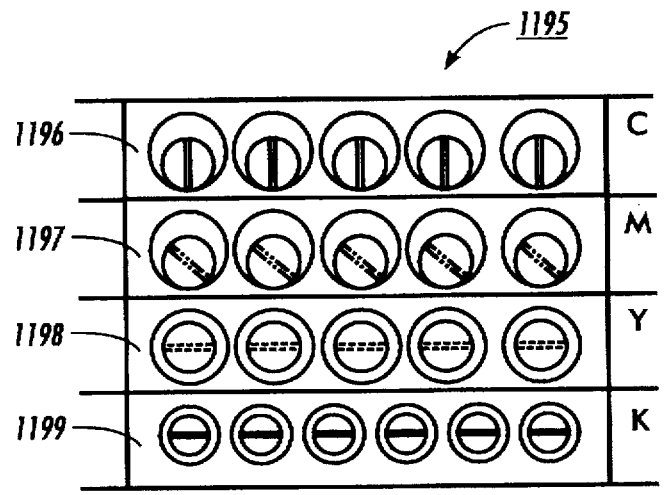
FIG. 11J (please note that there is no FIG. 11I) illustrates a full-color CMYK (cyan-magenta-yellow-black) multilayer gyricon.
Figure 11E:
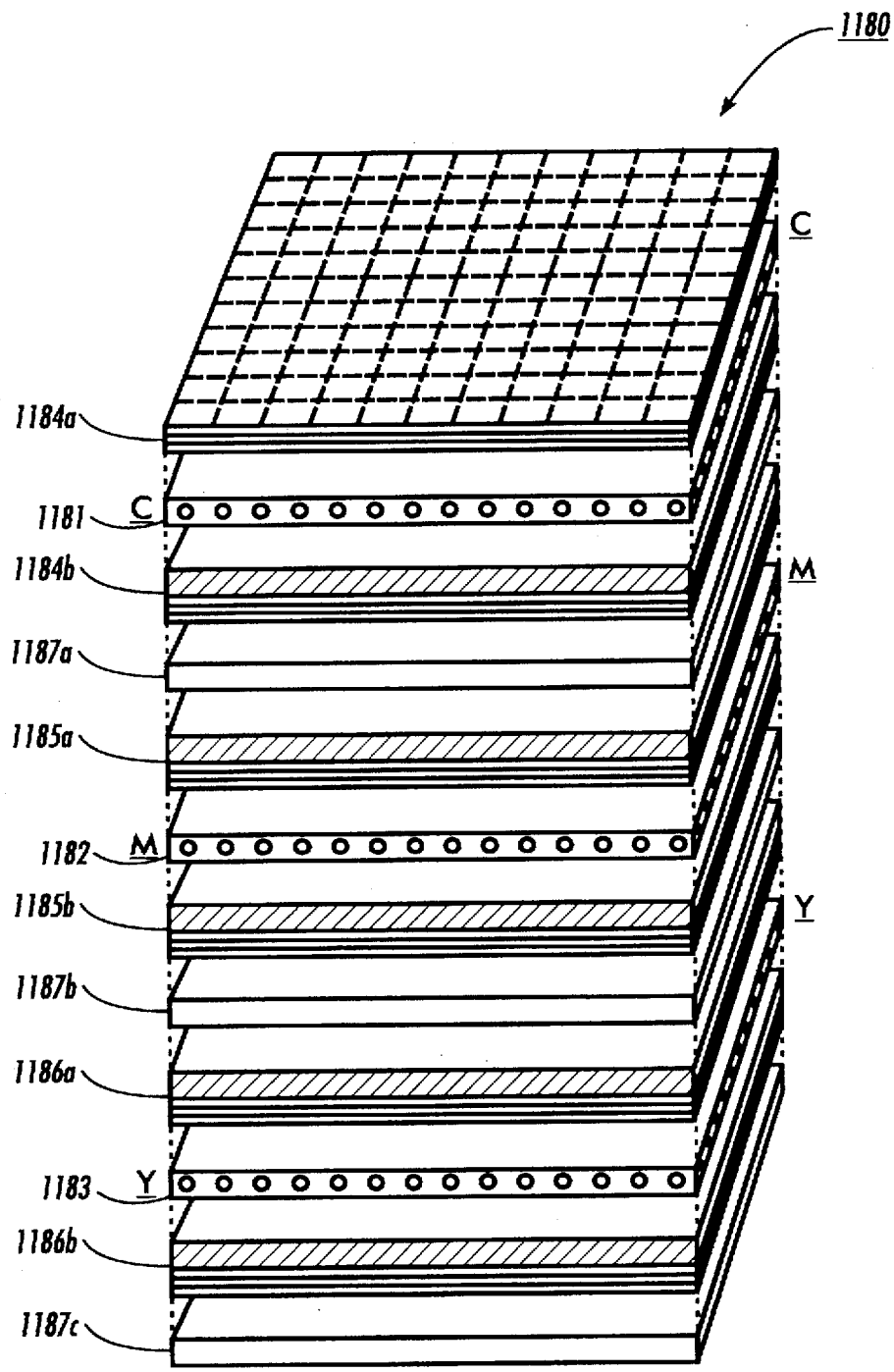
FIG. 11E illustrates an exploded view of a CMY gyricon having separate addressing hardware per layer.

A CMY gyricon having a separate electrode per layer, as shown in FIG. 11E, can be cumbersome and expensive to produce. Also, the many layers of electrodes and conductive shielding can cut down on the amount of light that passes through the gyricon, so that the gyricon image is less bright than it would otherwise be. Thus it can be preferable in some circumstances to address all layers of a CMY gyricon with a single electrode assembly. For example, in FIG. 11F, sheet 1188 of gyricon 1137 is a three-layer elastomer sheet, similar in construction to sheet 1170 of FIG. 11C. Electrodes 1189a, 1189b are disposed on either side of sheet 1188. It is desired to use the electrodes 1189a, 1189b to cause rotations of balls of any or all of the three layers of sheet 1188.

A single set of electrodes (as depicted in FIG. 11F) suffices to control an entire CMY gyricon if balls in different layers of the gyricon have different rotational thresholds. For example, in FIG. 11A, if balls in the top layer 1116 will begin to rotate only upon application of a strong electric field E1, balls in the middle layer 1117 upon application of an intermediate electric field E2, and balls in the bottom layer 1118 upon application of a weak electric field E3, then a single set of electrodes can be used to address balls of all three colors in a pixel (for example, to address all of balls 1140a, 1150a, 1160a of the pixel at 1110a). As another example, if in FIG. 11C, balls in top layer 1171 will begin to rotate only upon application of a strong electric field E1, balls in the middle layer 1172 upon application of an intermediate electric field E2, and balls in the bottom layer 1173 upon application of a weak electric field E3, then a single set of electrodes can be used to address all three color components of pixel 1177. In both examples, application of the strong electric field E1 will cause balls in all three layers to rotate. Application of the intermediate field E2 will cause only those balls in the middle and bottom layers to rotate. Application of the weak field E3 causes only those in the bottom layer to rotate. Thus the balls in all three layers can be rotated as desired by successive application of strong, intermediate, and weak addressing fields. This multipass, multithreshold addressing technique is further described below with reference to FIGS. 14A–14G.

A pixel-addressable subtractive color gyricon display can be constructed without any need for precision alignment of the addressing electrodes with respect to the gyricon sheet. Instead, pixels will be formed wherever the electrodes happen to be. This is an advantage of the subtractive color gyricon over the additive color gyricon previously described with reference to FIGS. 10A–10C. In the RGB gyricon subpixel arrangement as shown in FIG. 10C, for example, each of the subpixels 1071, 1072, 1073 must be aligned properly with the subpixel array elements of the addressing electrodes to ensure that an applied electric field causes one and only one subpixel of the appropriate color to be addressed. A misalignment between the array elements of the addressing electrode and the array elements of the gyricon sheet can cause portions of multiple subpixels of the sheet to be addressed by a single array element of the electrode, and can cause color errors, such as substitution of red subpixels for green and blue for red, in the produced image. With the subtractive color gyricon of FIGS. 11A–11D, addressed with a single electrode assembly as in FIG. 11F, none of these problems can arise. Instead, the addressing electrodes 1189a, 1189b need only be aligned to each other, and can be placed anywhere with respect to the gyricon sheet 1188. If a multiple-electrode assembly is used as in FIG. 11E, the electrodes for the different layers must be aligned with one another, but again, there is no need to align the layers of elastomer to the electrodes, or to align the layers to each other. For example, it is unnecessary to align cyan layer 1181 with its electrodes 1184a, 1184b, or to align cyan layer 1181 with magenta layer 1182 or yellow layer 1183.

Figure 11G:
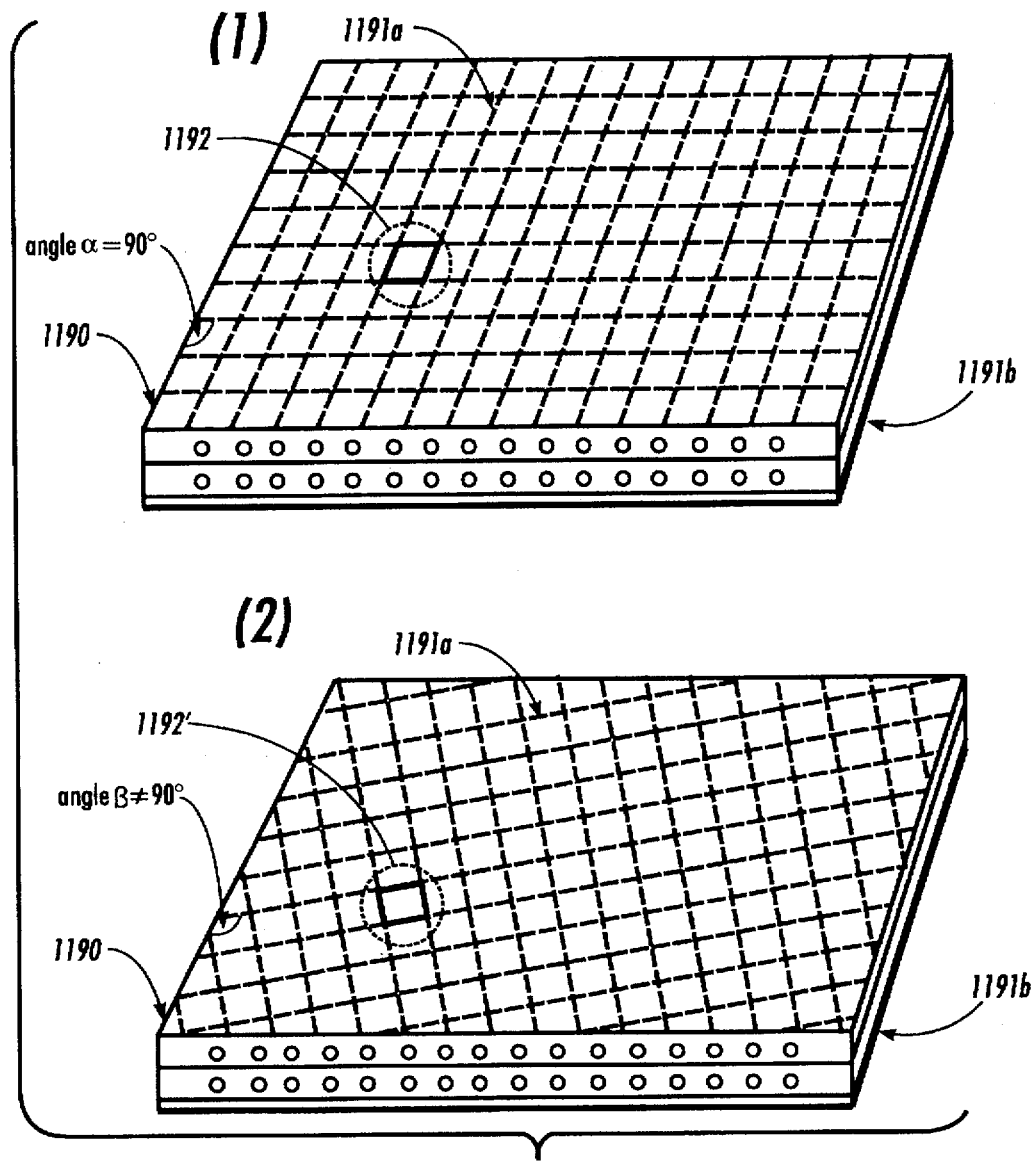
FIG. 11G is a series of views in which the position of the addressing hardware is changed relative to the position of the gyricon sheet.

The series of views in FIG. 11G further illustrates these ideas. In the first view of FIG. 11G, pixel array addressing electrodes 1191a, 1191b are placed on either side of a rectangular multilayer gyricon sheet 1190, oriented parallel to the boundaries of the rectangle of sheet 1190. Pixels, such as pixel 1192, are formed in rectangular columnar regions of sheet 1190. The locations of pixel 1192 and other pixels with respect to the boundaries of rectangular sheet 1190 is not predefined. Rather, the placement of electrodes 1191a, 1191b with respect to sheet 1190 defines where the pixels will be. If the electrodes are placed differently with respect to the sheet, the pixels will end up somewhere else in the sheet. For example, the second view of FIG. 11G shows what happens if the addressing electrodes 1191a, 1191b are removed from contact with sheet 1190 and thereafter are replaced such that they are now oriented at an angle β to the boundaries of the rectangle of sheet 1190. The pixel array is now skewed with respect to the boundaries of the rectangle. For example, the counterpart to pixel 1192 of the first view of FIG. 11G is pixel 1192' in the second view of FIG. 11G.

In contrast with the additive color gyricon, there are no subpixels of different colors in the subtractive color gyricon. Rather, the entire field of each pixel is filled with all the component colors, superposed on one another. This can improve the richness and accuracy of the resulting color image over what is obtainable with additive color techniques.

Figure 11H:
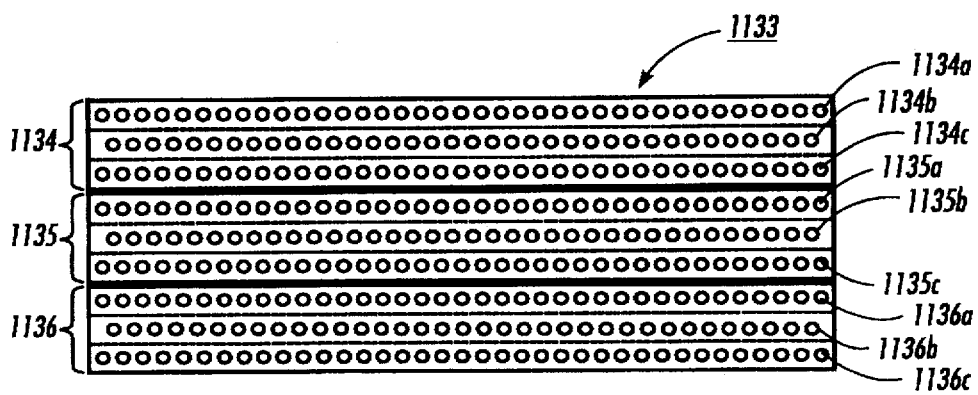
FIG. 11H illustrates close-packing of gyricon balls in a CMY gyricon.

To ensure the highest levels of color saturation and overall image quality in a subtractive color gyricon, each component color layer of each pixel can present a complete ball fill to the observer. For example, within each color layer, there can be two or more layers of balls, stacked one on another as illustrated in FIG. 11H. Gyricon sheet 1133 includes layers 1134, 1135, 1136 that contain three-segment balls having cyan, magenta, and yellow center segments respectively. The balls in layer 1134 are themselves arranged in three close-packed layers 1134a, 1134b, 1134c. The balls in layer 1135 are arranged in three close-packed layers 1135a, 1135b, 1135c. The balls in layer 1136 are arranged in three close-packed layers 1136a, 1136b, 1136c. Thus little or no light can pass through gyricon sheet 1133 without being color filtered when the balls are suitably rotated. To minimize light scattering and to obtain the highest light efficiencies, it is preferable for the balls to have the same refractive indicies as the elastomer and the dielectric fluid permeating the elastomer.

The colors of the cyan, magenta, and yellow center segments of the balls used in the CMY subtractive color gyricon are typically transparent colors rather than opaque colors. Thus the CMY gyricon can be used with a backlighting source, such as a projector, or with a reflective backing (e.g., a sheet of ordinary white paper or other diffuser) in ambient light. Typically, bright incident light is preferable, inasmuch as the gyricon acts to filter out incident light in order to produce the colors of the image. Examples of use are comparable to those previously described with reference to FIGS. 7B, 7C, and 7D above as adapted for the RGB gyricon with balls having transparent central segments. The use of the CMY gyricon as in FIGS. 7C–7D provides a full-color projected image on screen 757. The use of the CMY gyricon as in FIG. 7B provides an image in which light filtered by the transparent color segments of the balls can be reflected from an underlying surface (e.g., document 751) back through the gyricon and thence to the observer at I; note that, unlike the RGB gyricon, light can be effectively absorbed within the CMY gyricon if it is filtered through all three component colors.

A subtractive color gyricon need not be limited to cyan, magenta, and yellow component colors. Other colors can be substituted and additional layers carrying additional colors can be added. In particular, a full four-color CMYK (cyan-magenta-yellow-black) gyricon can be constructed by adding a fourth layer to the CMY gyricon. The CMYK gyricon provides a color capability analogous to the CMYK color scheme typically used in four-color printing.

FIG. 11J illustrates a CMYK subtractive color gyricon. Gyricon 1195 has layers 1196, 1197, 1198, and 1199 which contribute, respectively, cyan, magenta, yellow, and black component colors to the image. The gyricon balls used in layers 1196, 1197, 1198 are as described previously for layers 1116, 1117, 1118 in gyricon sheet 1110 of FIG. 11A. The balls used in the black layer 1199 are also three-segment balls, similar in construction to the balls used in the other layers. However, the center segments are opaque black rather than transparent chromatic colors as in the other layers. As for the CMY gyricon, the CMYK gyricon can be used with backlighting, such as a projector, or with a reflective backing. Examples of use are comparable to those previously described with reference to FIGS. 7B, 7C, and 7D above, as adapted for the CMY gyricon; note with reference to FIG. 7B that the black segments of the balls in layer 1199 can fully absorb incident light.

A subtractive color gyricon can also have fewer than three component colors. For example, a two-layer gyricon based on three-segment gyricon balls with transparent exterior segments can be made that includes a first layer of balls with black center segments (as in the CMYK display) and a second layer of balls with center segments of a transparent color. Such a gyricon would be useful for providing a display of black plus a highlight color over a white background or in a backlit mode. Another possibility is a two-layer gyricon that has a first layer of a first transparent color and a second layer of its complementary (also transparent) color. For example, the first layer can be blue and the second one yellow. This gyricon can produce each of its component colors plus black, which is produced by the subtraction of two complementary colors. Controlled by a canted-field electrode, the gyricon thus provides variable saturations of the component colors plus variable gray scale.

Additive Color Gyricon using Bi-state or Tri-state Light Valves

A gyricon in which the balls themselves have no chromatically colored segments can be used to provide a full-color, red-green-blue (RGB) display. Two approaches to such a display will be described. In both approaches, the balls in the gyricon sheet act as light valves, in that they can be used to reveal or obscure color dots to or from an observer. Using a canted-field electrode configuration as previously described, balls can be rotated through a continuous range of angles, thus allowing a continuous range of color saturation. Each of the dots can be red, green, or blue, and can be formed using, for example, an active light source, a backlit colored filter or transparency, or a reflective colored backing attached to the gyricon sheet and illuminated by ambient light. Thus the gyricon can be adapted for use in a backlit or projective mode or in ambient light.

The two approaches differ in the kind of gyricon balls used. In the first approach, a layer of three-segment balls that can act as bistate (two-state) light valves is used to reveal or obscure the color dots. The balls can be, for example, balls similar in construction to those used in the RGB and CMY gyricons discussed above, but with opaque (e.g., white or black) central segments instead of transparent chromatically colored central segments. In the second approach, a layer of four-segment ball that can act as tristate (three-state) light valves is used to reveal or obscure the color dots. The balls, which will be described, have black, white, and transparent (e.g., clear) segments. In an alternative embodiment of the second approach, two layers of three-segment balls are used in place of the four-segment ball, one layer in which the balls have black center segments and the other in which the balls have white center segments.

The terminology "bistate" and "tristate" light valves is not meant to imply that these light valves are restricted to only two states or three states as the case may be. Rather, the light valves have two or three basic states (eigenstates) and a range of intermediate states obtainable with the canted field electrode configuration. Thus, as will be discussed momentarily, the bistate light valve has two basic states: fully open, with the center segment oriented perpendicular to the surface of the gyricon sheet and the color dot maximally revealed; and fully closed, with the center segment oriented parallel to the surface and the color dot maximally obscured. Intermediate states, in which the light valve is partly open or partly closed are also attainable. Similarly, the tristate light valve has three basic states: fully open, with the center segment oriented perpendicular to the surface of the gyricon sheet and the color dot maximally revealed; fully closed/black, with a black center segment facing the surface and oriented parallel to the surface, and the color dot maximally obscured; and fully closed/white, with a white center segment facing the surface and oriented parallel to the surface, and the color dot once again maximally obscured.

Figure 12A:
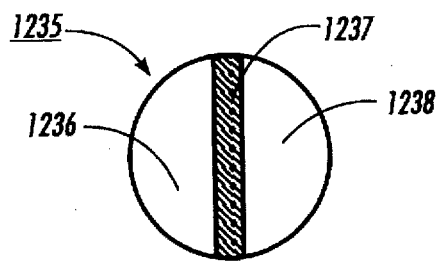
FIG. 12A illustrates a three-segment bistate light valve gyricon ball for use in an ambient color RGB display.

Turning now to the first approach, a three-segment ball such as that illustrated in FIG. 12A is used. Ball 1235 has two transparent (for example, clear) end segments 1236, 1238 and a central opaque segment 1237. Ball 1235 is made with segments of different zeta potentials, so that it can be oriented to different orientations by application of suitable electric fields. In particular, segment 1236 can be made with the highest positive zeta potential of any of the three segments in ball 1235, and segment 1238, with the highest negative zeta potential of any of the three segments.

Figure 12E:
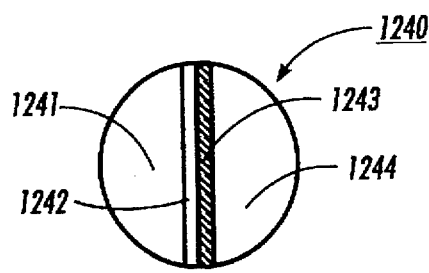
FIG. 12E illustrates a four-segment tristate light valve gyricon ball for use in an ambient color RGB display.
Figure 12B:
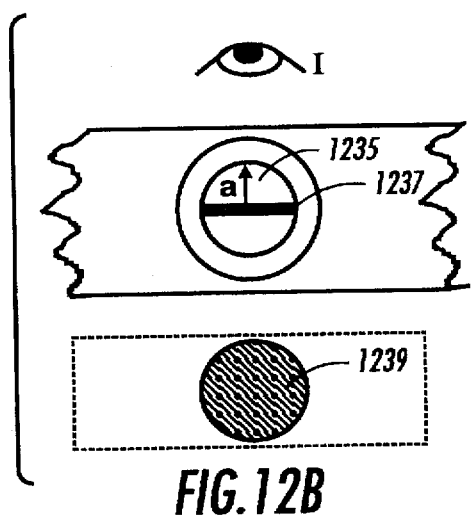
FIGS. 12B–12D are views of a bistate light valve gyricon ball as used to reveal or hide an underlying color dot.
Figure 12C:
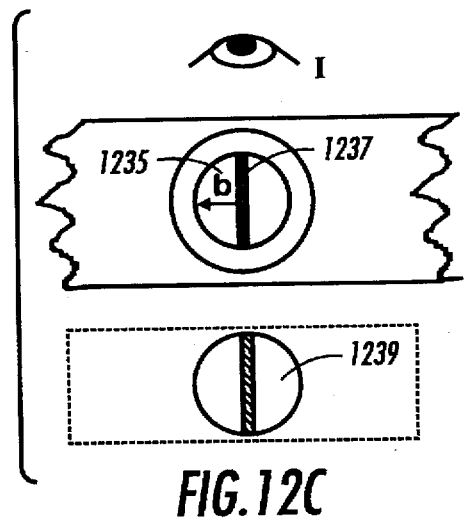
Figure 12D:
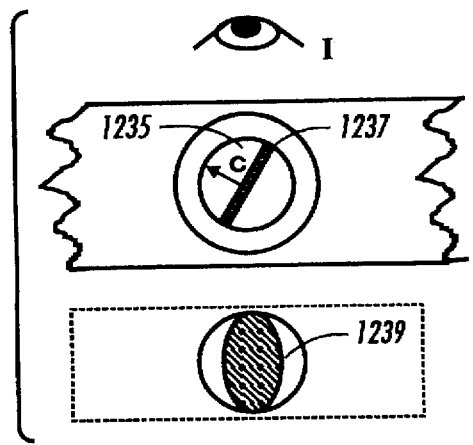

Ball 1235 can act as a bistate light valve, as is depicted schematically in the examples of FIGS. 12B–12D. In each of these examples, a color dot 1239 is situated below ball 1235 and an observer at I is situated above ball 1235 and opposite to color dot 1239. A canted-field electrode is used to orient ball 1235. In FIG. 12B, ball 1235 is oriented in the direction shown by arrow a, with its opaque central segment parallel to the plane of dot 1239, so that opaque central segment 1237 completely obscures dot 1239 from the view of the observer at I. As shown, dot 1239 appears black to the observer at I. In FIG. 12C, ball 1235 is oriented in the direction shown by arrow b, so that opaque central segment 1237 is transverse to the plane of dot 1239. As shown, substantially all (more precisely, all but a thin band) of dot 1239 is seen by the observer at I. In FIG. 12D, ball 123S is oriented in the direction shown by arrow c, so that opaque central segment 1237 is at an angle intermediate betwen parallel and perpendicular to the plane of dot 1239. (The canted-field electrode permits any intermediate angle to be obtained.) Opaque central segment 1237 partially obscures dot 1239 from the view of the observer at I.

A full-color RGB display can be built with balls like ball 1235, for example by placing a gyricon sheet formed of such balls in front of a background transparency or backing material patterned with transparent red, green, and blue color filters (for a backlit display), or in front of a background surface or backing material patterned with reflective red, green, and blue dots (for an ambient light display). Each pixel of the display includes a red, a green, and a blue dot, with each of these color dots corresponding to a subpixel. Each color dot is associated with its own independently addressable ball or, preferably, set of many balls that act as the light valve for that dot. Thus the color saturation of a subpixel can be controlled by adjusting the angle of the ball or balls over the dot to reveal or obscure more or less of the color dot. If many balls are used per subpixel, color saturation can also be controlled without canted fields by turning a greater or lesser number of the balls parallel or transverse to the plane of the color dots, using multithreshold techniques as described below with reference to FIGS. 14A–14G. The arrangement of the subpixels within each pixel can vary in different embodiments; for example, the subpixels can be arranged as the vertices of an equilateral triangle.

Examples of use of the bistate light-valve RGB gyricon in backlit and projective modes are comparable to those previously described with reference to FIGS. 7B, 7C, and 7D. Used in projective mode as in FIGS. 7C–7D, the gyricon provides a full-color RGB projected image on screen 757. Used in overlay mode as in FIG. 7B, the gyricon provides a transparent full-color overlay for the underlying document 751. In overlay mode, light incident on bistate light-valve gyricon 750 can be absorbed by, or reflected from, the center segments of the balls when the balls are oriented with their center segments parallel to the plane of the gyricon. When the balls are oriented with their center segments transverse to the plane of the gyricon, light is transmitted through the transparent segments of the balls, filtered by the transparent color filters, and reflected from white portions of the underlying document 751 back through the transparent color filters and the transparent ball segments of gyricon 750 to the observer at I.

An example of use of the bistate light-valve RGB gyricon as a self-contained (rather than overlay) ambient light display is also comparable to FIG. 7B, except that the patterned backing material of the gyricon itself takes the place of underlying document 751. Ambient light incident on the gyricon can be reflected by or absorbed by the opaque center segments of the balls, or can pass through the transparent segments of the balls to be reflected by the color dots of the patterned backing material and back through the gyricon sheet to the observer at I.

The first, bistate light-valve approach is well suited for a backlit display. It can be less suitable for a self-contained ambient light display because of light loss due to scattering, which can lead to a dim and desaturated or "washed-out" display appearance. For example, if the opaque center segments of the balls are black, then "white" is achieved by turning all three subpixels on at once. This "white" can appear gray as compared to the white offered by traditional reflective media, such as ordinary paper.

The second, tristate light-valve approach addresses this concern. The tristate light valves have black, white, and transparent states, with the underlying color dot being visible through the transparent portions of the gyricon balls. The availability of both white and black in conjunction with red, green, and blue provides an enhanced color gamut over the first, bistate light-valve approach, and makes the second approach particularly well-suited for use in ambient light displays.

FIG. 12E illustrates a four-segment gyricon ball suitable for an ambient light RGB display according to the second approach. Ball 1240 has two broad transparent (for example, clear) outer segments 1241, 1244 and two thin central segments 1242, 1243. Segment 1242 is pigmented white and segment 1243 is pigmented black. Ball 1240 is made with segments of different zeta potentials, so that it can be oriented to different orientations by application of suitable electric fields. In particular, segment 1241 can be made with the most positive zeta potential of any of the four segments in ball 1240, and segment 1244, with the most negative zeta potential of any of the four segments.

To make an ambient color display, a gyricon sheet formed of balls like ball 1240 can be placed over a reflective backing of red, green, and blue color dots. A canted-field electrode configuration is provided such that each ball can be individually addressed and oriented at any angle with respect to the sheet's surface. Each ball can provide a subpixel of a pixel-addressable display in which each pixel includes a ball located above a red dot, a ball located above a green dot, and a ball located above a blue dot, similarly to the first approach. However, because the ball has both black and white central segments, it can do more than just reveal or obscure the underlying dot. Rather, as the ball rotates through 180 degrees, the light from a subpixel will adjust as follows: black, dark color, saturated color, light color, white. For example, with a red dot, an observer will see a range of colors as follows: black, dark red, red, light red, white. (Preferably, as with the bistate light-valve approach, many balls are used per subpixel, in particular to obviate the need to align individual balls with individual subpixels during manufacture of the gyricon. Nevertheless, the one-ball-per-subpixel arrangement described here is also possible, and provides an easily understood example for purposes of exposition and discussion.)

Accordingly, the second approach can increase the brightness of the display, especially in the part of the color space between fully saturated color and white. The entire color cube of color space can be generated. Moreover, a light-colored primary color (for example, light red) can be generated with a single subpixel.

Figure 12F:
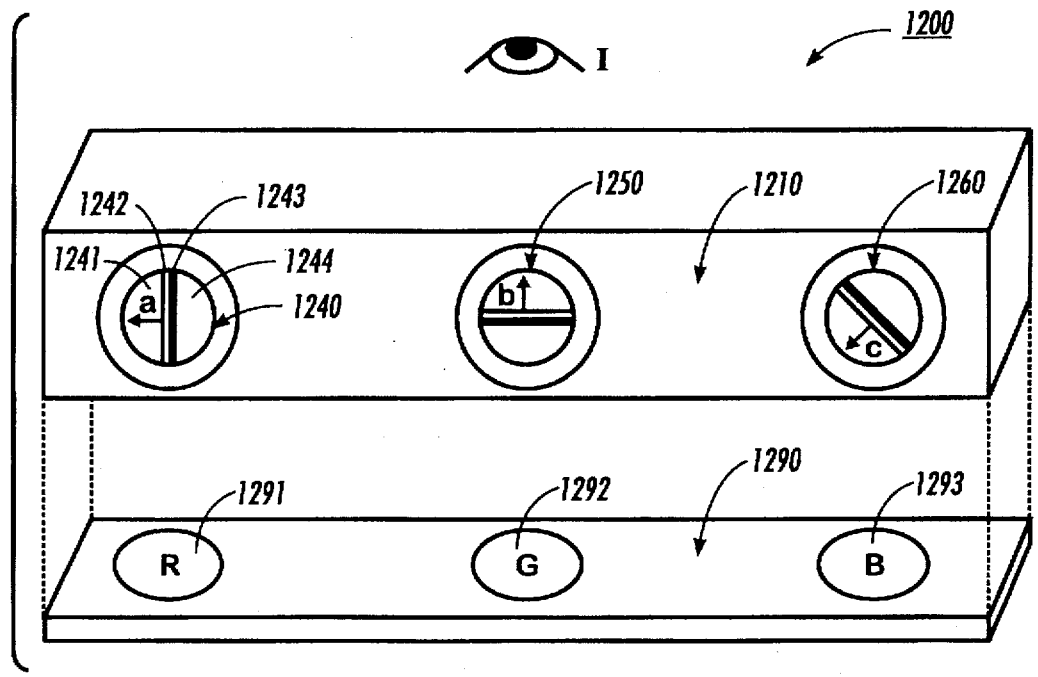
FIG. 12F is an exploded view of an ambient color RGB gyricon.

FIG. 12F illustrates an exploded view of a portion of an ambient color display gyricon 1200 in the second approach. Elastomer sheet 1210 is affixed to a backing 1290 that has red, green, and blue dots (dots 1291, 1292, and 1293, respectively). Embedded in sheet 1210 are four-segment balls including balls 1240, 1250, 1260, which can act as tristate light valves to reveal the dots of backing 1290 or to obscure the dots of backing 1290 using either their respective black or white center segments. Thus, for example, ball 1240, whose orientation direction is indicated by arrow a, presents a substantially transparent aspect to an observer at I, thus revealing a fully saturated red dot 1291. Ball 1250, whose orientation direction is indicated by arrow b, presents a white face to an observer at I and completely occludes the view of underlying green dot 1292. Ball 1260, whose orientation direction is indicated by arrow c, is oriented at an angle to the surface of sheet 1210 and thus presents a portion of a black face to an observer at I, while revealing a portion of the blue dot 1293 below.

Figure 12G:
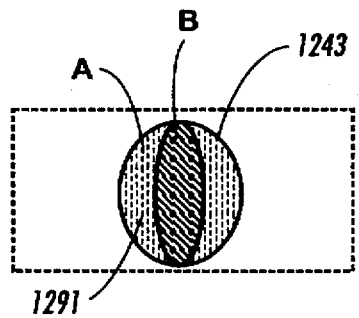
FIGS. 12G–12H are views of a tristate light valve gyricon ball partiallly hiding an underlying color dot.
Figure 12H:
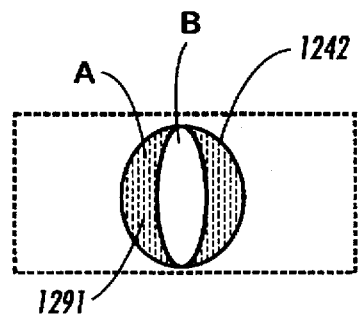

The view from the standpoint of an observer at I of the subpixel formed by ball 1240 in combination with red dot 1291 is schematically depicted for two different orientations of ball 1240 in the examples of FIGS. 12G and 12H. In both figures, red dot 1291 appears as a circle A. In FIG. 12G, the thin black segment 1243 of ball 1240 is seen as an ellipse B superposed on circle A. Thus the subpixel has black and red color components, and so appears dark red. In FIG. 12H, the thin white segment 1242 of ball 1240 is seen as an ellipse B superposed on circle A. Thus the subpixel has white and red color components, and so appears light red.

Examples of use of the tristate light-valve RGB gyricon in backlit and projective modes are comparable to those previously described with reference to FIGS. 7B, 7C, and 7D. Used in projective mode as in FIGS. 7C–7D, the gyricon provides a full-color RGB projected image on screen 757. It should be noted, however, that because the black and white center segments are opaque, they are not distinguishable from one another in the projected image. Thus the tristate light-valve gyricon has no color gamut advantage over the bistate light-valve when used in projective mode. The color gamut advantage obtains when the gyricon is used in overlay or self-contained ambient light modes as in FIG. 7B, the description of FIG. 7B here being modified as previously described for the bistate light-valve gyricon.

Figure 12I:
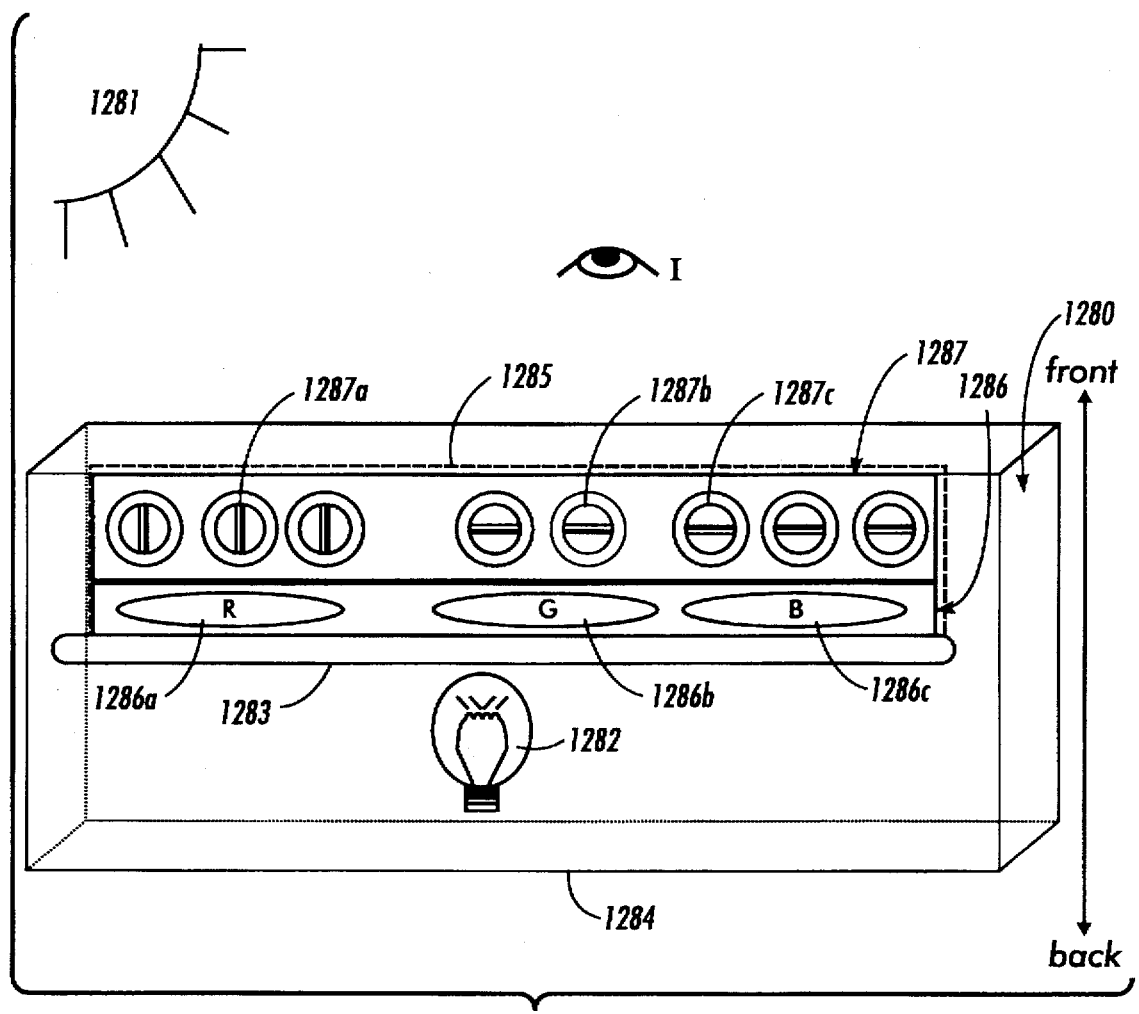
FIG. 12I illustrates an additional lighting mode for use with bistate and tristate light-valve gyricons.

An additional lighting mode will now be described with reference to FIG. 12I. This mode is particularly interesting for use with the tristate light-valve gyricon, although it can also be used with the bistate light-valve gyricon. Display 1280 includes a gyricon 1285 that is made up of a transparent elastomer layer 1287 of four-segment tristate light-valve balls (including balls 1287a, 1287b, 1287c) attached to a transparent backing material 1286 patterned with transparent color filters (including red subpixel filter 1286a, green subpixel filter 1286b, and blue subpixel filter 1286c). Gyricon 1285 is illuminated simultaneously from the front (that is, from the side closest to the observer at I) by ambient light originating at light source 1281, and from behind by a uniform diffuse white light, here provided by an electrically powered light source 1282 in conjunction with a diffuser 1283, both of which can be built into display housing 1284 as shown. Such built-in backlighting is appropriate, for example, if display 1280 is to be used as a display for a laptop computer or the like.

In operation of display 1280, backlight source 1282 serves to make the colors observable by the observer at I bright and vivid. For example, balls 1287a are oriented so that light from source 1282 is transmitted through diffuser 1283 and thence through red color filter 1286a can pass through the transparent segments of balls 1287a. The observer at I sees a red subpixel. A small amount of ambient light from source 1281 is transmitted through layer 1287 and red color filter 1286a and reflected by diffuser 1283 back through filter 1286a and layer 1287 to the observer at I; but the backlighting provides the most significant light source for the subpixel.

Ambient light from light source 1281 serves to illuminate the white center segments of balls in layer 1287, so that they are visible to the observer at I when the balls are oriented with the white center segments disposed toward the front of gyricon 1280. For example, balls 1287b are oriented so as to hide green color filter 1286b from the observer at I. The white center segments of balls 1287b are visible in ambient light to the observer at I, who sees a white subpixel. Backlighting from source 1282 is blocked by the opaque center segments.

Ambient light from light source 1281 is absorbed by the black center segments of balls in layer 1287. For example, balls 1287c are oriented so as to hide blue color filter 1286c from the observer at I. The black center segments of balls 1287c absorb ambient light. The observer at I sees a black subpixel. Again, backlighting from source 1282 is blocked by the opaque center segments.

Figure 12J:
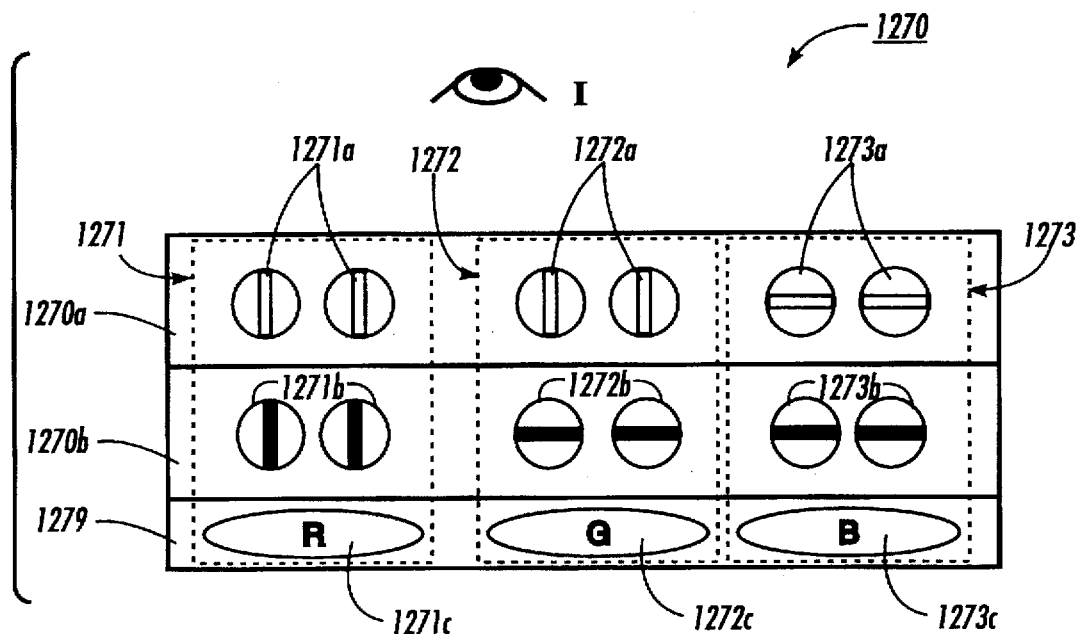
FIG. 12J illustrates an alternative, two-layer embodiment of the tristate light valve gyricon.

FIG. 12J illustrates an alternative embodiment of the tristate light valve gyricon. Here, two layers of three-segment balls are used. Elastomer sheet 1270 has layers 1270a and 1270b, each layer containing bistate light valve balls (similar in construction to ball 1235 of FIG. 12A). The balls in layer 1270a have white center segments. The balls in layer 1270b have black center segments. Backing material 1279 provides the color dots that are revealed or obscured by the balls so as to provide colors visible to an observer at I.

The two layers of balls cooperate to provide a tristate light valve, as shown: In region 1271 of sheet 1270, balls 1271a in upper layer 1270a and balls 1271b in lower layer 1270b are rotated so that their center segments are transverse to the plane of backing material 1279, thereby revealing the underlying dot 1271c to the observer at I. In region 1272 of sheet 1270, balls 1272a in upper layer 1270a are rotated so that their white center segments are transverse to the plane of backing material 1279, and balls 1271b in lower layer 1270b are rotated so that their black center segments are parallel to the plane of backing material 1279, obscuring the underlying dot 1272c and presenting a black appearance to the observer at I. In region 1273 of sheet 1270, balls 1273a in upper layer 1270a are rotated so that their white center segments are parallel to the plane of backing material 1279, obscuring the underlying dot 1273c and presenting a white appearance to the observer at I.

Balls in the two layers 1270a, 1270b can be separately addressed by using multithreshold, multipass addressing as per FIGS. 14A–14G below. If many balls are used per subpixel, there is no need to align the upper and lower layers with one another during manufacture.

The bistate and tristate light valve approaches both offer certain advantages over the RGB gyricon described previously with reference to FIGS. 10A–10C. Notably, there is no need to place different kinds of balls in different places within the elastomer sheet. Instead, the same balls are used throughout the gyricon, and the RGB subpixel regions of a reflective backing material, for example, can be printed on the material using conventional printing or color xerographic techniques. Furthermore, if many balls are used per subpixel, the elastomer sheet need not be precisely aligned with the backing material during manufacture. (However, it is necessary to align the subpixels of the backing material with the subpixels of the addressing electrodes.)

It will be appreciated that the bistate and tristate light valve approaches can be used with color displays other than RGB displays. For example, dots of additional colors can be added. As another example, a highlight color display can be made using a backing material of a single uniform highlight color, such as red or yellow, in place of the dot-patterned backing material previously described. Such a display, used for example with a canted-field electrode, can provide a full range of the highlight color, varying from white through light color to fully saturated color to dark color to black, and, like the CMY gyricon described earlier, does not require precise alignment between the gyricon sheet and the addressing electrode assembly. Instead, the pixels of this highlight color display are defined by the relative placement of the gyricon sheet and the electrodes, in a manner similar to that previously described with reference to FIG. 11G above. Still further, for use in ambient light, the center segments of the balls (for example) need not be black or white. For example, a highlight color overlay transparency for use with a white background (e.g., ordinary white paper) can be made by providing a transparent elastomer and tristate balls having black and highlight color center segments (e.g., black and red segments). Many other variations will be apparent to persons skilled in the art.

Figure 13:
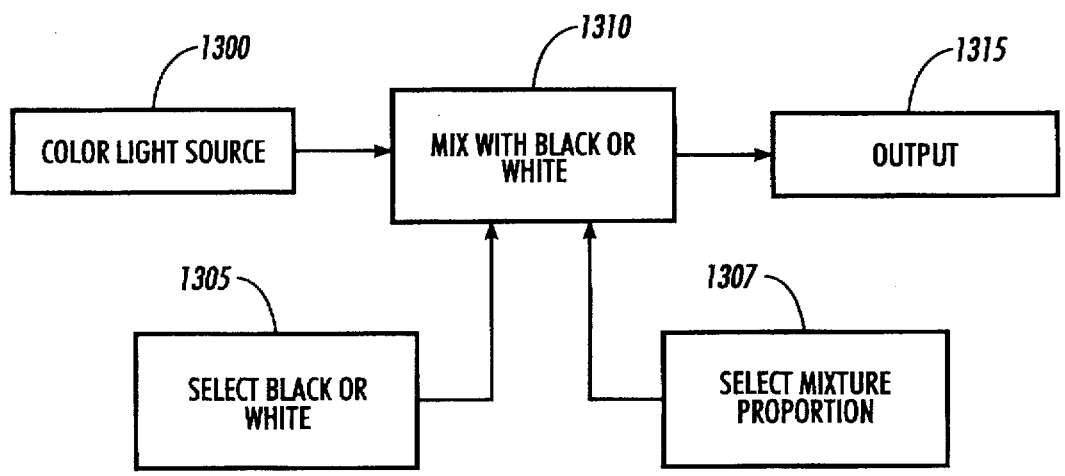
FIG. 13 schematically depicts the modulation of light in a generalized tristate light-valve color display.

The operational principles of the tristate light valve RGB display can be generalized beyond the embodiments described here. Notably, it is not necessary that the tristate light valves be gyricon-based. As other tristate light valves and devices or technologies suitable for producing such valves are developed, they can be adapted for use in color displays in which color sources, such as RGB or other chromatic color sources, are revealed or obscured by tristate light valves according to the principles that have been described above. This is illustrated schematically for a single pixel in FIG. 13. A light source 1300 provides a colored light, such as a chromatically colored light, for the pixel. A selector 1305 selects between black and white mixture colors, and a mixture control 1307 selects the proportions in which the colored light from light source 1300 and the mixture color (black or white) selected with selector 1305 are to be mixed. The colored light is mixed with the selected black or white mixture color in a color mixer 1310, and the resulting color mixture is provided to output 1315.

Multithreshold and Multipass Addressing Techniques

The CMY and CMYK subtractive color gyricons and the two-layer tristate valve gyricon described above require separate addressability for different balls in different layers. It can be advantageous to provide this separate addressability without using a separate addressing electrode for each layer. More generally, there are various circumstances in which it can be beneficial to use a single electrode to address separately different groups of different kinds of balls within a gyricon sheet. For example, one way to achieve variable color saturation in an RGB gyricon based on three-segment balls (as in FIGS. 10A–10C) or a CMY gyricon (as in FIGS. 11A–11C) without using canted fields is to provide a multiplicity of balls associated with each color in each subpixel. This multithreshold technique for controlling color presence will be described more fully below with reference to FIG. 14F.

Selective rotation of different kinds of gyricon balls disposed in the same vicinity within the elastomer sheet of the gyricon can be accomplished if each kind of ball has a distinct rotation threshold, that is, a minimum electric field strength to which it will respond. For example, in the two-layer arrangement of FIG. 12J, suppose that the balls in layer 1270a will begin to rotate only upon application of an electric potential gradient of at least 90 volts per 30 mils of elastomer thickness, and that the balls gyricon in layer 1270b will begin to rotate only upon application of an electric potential gradient of at least 80 volts per 30 mils of elastomer thickness. Then if the total thickness of sheet 1270 is 30 mils (that is, 15 mils per layer), an 80-volt electric potential difference applied across sheet 1270 will cause balls in layer 1270b to rotate but will not affect balls in layer 1270a. A 90-volt potential difference across sheet 1270 will cause balls in both layers 1270a and 1270b to rotate. For example, the balls in region 1271 can be oriented as shown, with their center segments oriented transversely to the plane of backing material 1279, by a single application of a 90-volt potential difference across both layers of sheet 1270 in region 1271. The balls in region 1273 can be oriented as shown, with their center segments oriented parallel to the plane of backing material 1279, by a single application of a 90-volt potential difference in the plane of sheet 1270 in region 1273. The balls in region 1272 can be oriented as shown, with the center segments of balls 1272a in layer 1270a oriented transversely to the plane of backing material 1279 and the center segments of balls 1272b in layer 1270b oriented parallel to the plane of backing material 1279, by an application of a 90-volt potential difference across sheet 1270 in region 1272 (which turns the balls to the same orientation as the balls in region 1271) followed by an application of an 80-volt potential difference in the plane of sheet 1270 in region 1272 (which turns balls 1272b in layer 1270b so that their center segments are parallel to the plane of backing material 1279 but leaves balls 1272a in layer 1270a unaffected).

Thus it can be seen that for two different kinds of balls, at most two different electric field applications, or "passes," suffice to orient the balls as desired. In general, if there are N distinct sets of balls to be addressed, at most N passes are required.

Figure 14A:
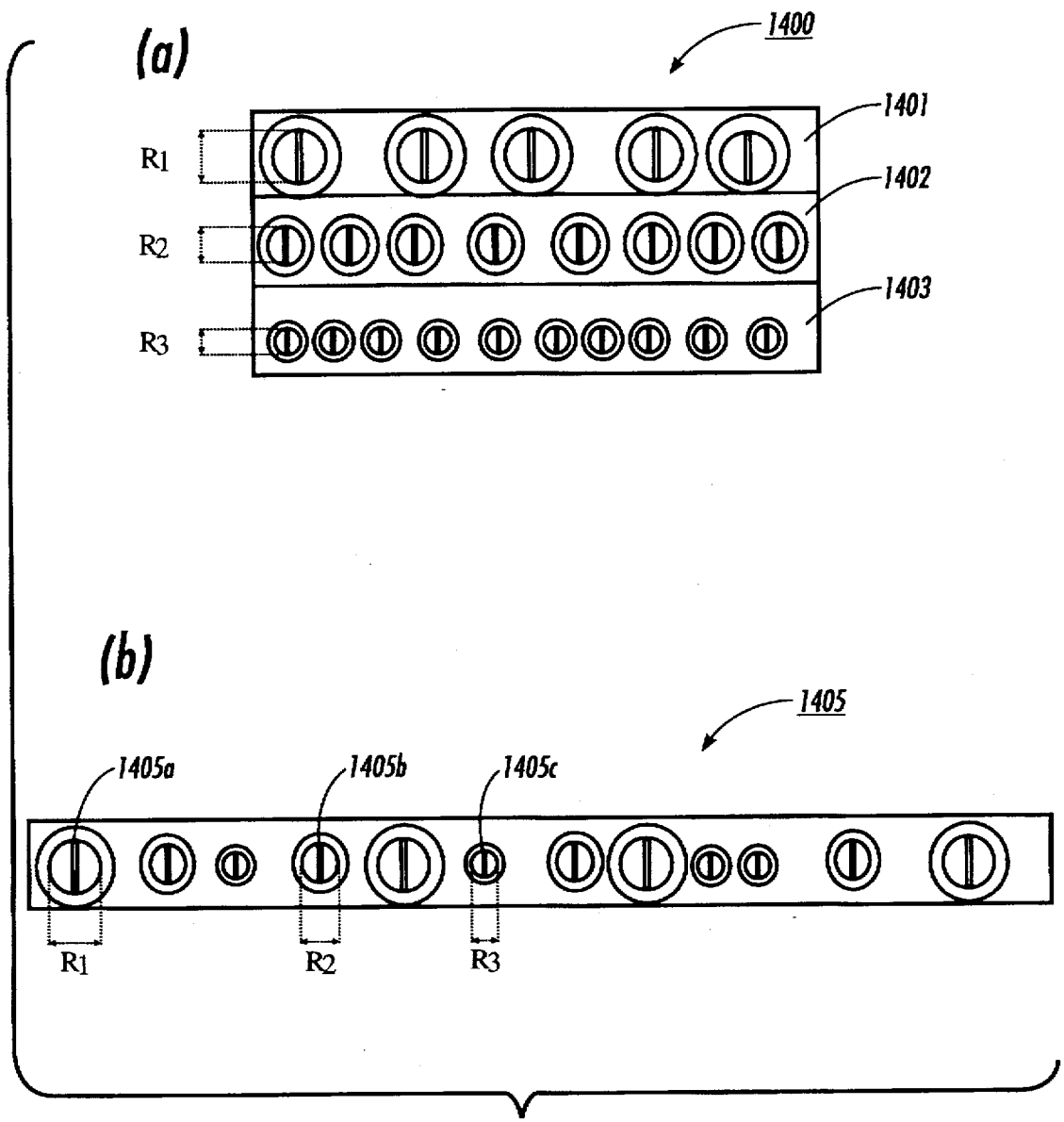
FIG. 14A is a series of views showing gyricon balls of different sizes and thresholds in multithreshold gyricons.

FIGS. 14A–14G illustrate various principles and applications of multithreshold, multipass gyricon addressing. FIG. 14A shows one way that different thresholds can be achieved: namely, by varying the size of the balls. Two examples are shown. In example (a) spherical balls in a first layer 1401 of a three-layer gyricon sheet 1400 have a first radius $R_1$, spherical balls in a second layer 1402 have a second radius $R_2$, and spherical balls in a third layer 1403 have a third radius $R_3$. In example (b) a single layer gyricon sheet 1405 includes balls 1405a, 1405b, and 1405c, having first radius $R_1$, second radius $R_2$, and third radius $R_3$ respectively. In both examples (a) and (b), $R_1>R_2>R_3$. Other things being equal, the amount of torque that must be applied to a ball of radius $R_1$ in order to cause the ball of radius $R_1$ to rotate from a standing start will tend to be greater than the amount of torque that must be applied to a ball of radius $R_2$ in order to cause the ball of radius $R_2$ to rotate from a standing start. Similarly, other things being equal, the amount of torque that must be applied to a ball of radius $R_2$ in order to cause the ball of radius $R_2$ to rotate from a standing start will tend to be greater than the amount of torque that must be applied to a ball of radius $R_3$ in order to cause the ball of radius $R_3$ to rotate from a standing start.

A simple calculation illustrates why. Assuming that the balls are of constant mass density and the electrical dipole moment of each ball arises from a separation of positive and negative surface charges in segments at opposite ends of the ball, it follows that balls in layer 1401 have greater mass, greater moment of inertia and greater dipole moment than balls in layer 1402, and balls in layer 1402 have greater mass, moment of inertia, and dipole moment than balls in layer 1403. However, it can be shown that the moment of inertia grows faster with increasing radius than does the dipole moment, as follows:

(1) Mass M of a uniform solid sphere of radius R and mass density $\rho$ is given by $M=4/3\pi nR_3$; moment of inertia I of a solid sphere of mass M and radius R about a central axis is given by $I=2/5\ MR_2$; thus moment of inertia I increases as the fifth power of the radius R.

(2) Electrical dipole moment p is proportional to quantity of charge q at either end of the ball times the distance D separating the positive and negative charges, that is, $p \propto qD$; quantity of charge q is proportional to surface charge density $\sigma$ times surface area over which the charge is spread, that is, $q \propto 4\Omega\sigma nR_2$ where $\Omega$ is the number of steradians subtended by the end segments of the ball; charge separation D is proportional to R; thus the electrical dipole moment p of the ball increases as the third power of the radius R.

(3) Torque of an electric field on a dipole is given by the cross product of the electric field vector with the dipole moment vector, that is, $\tau = p \times E$; applied torque equals the product of the moment of inertia time the angular acceleration of the ball in response to the applied torque, that is, $\tau = I\alpha$; setting these equal gives $|\alpha = p \times E|$.

(4) Therefore, the magnitude of the electric field E that must be applied to achieve a given angular acceleration $\alpha$, and thus to overcome a given amount of starting resistance to rotation, varies as the ratio of the moment of inertia I to the dipole moment p, that is, as $|+p=|+qD$. Solving this for E gives $E \propto (2/5\ R_2)\ (4/3\ \rho nR_3)+(4\Omega\sigma nR_2)R$, or $E \propto R_2$.

The foregoing calculation is a rough-and-ready estimate, rather than a precise formula. Nevertheless, it suggests that the greater the radius of the ball, the stronger the electric field that must be applied to cause rotation.

The calculation also suggests that other parameters, such as the dipole moment, can be varied to affect rotation threshold. In general, a wide variety of parameters, both of the balls themselves and of the cavities in the elastomer in which the balls rotate, can affect the rotational thresholds of the balls. (It is more precise to speak of "the rotational threshold of a particular ball in a particular cavity filled with a particular dielectric fluid in a particular elastomer," the overall threshold being a result of a complex interaction between the ball and its environment. Nevertheless, it is convenient to speak of "the threshold of the ball" as though the rotational threshold were associated with the ball alone. That practice is adopted here, it being understood that other factors come into play as well.)

Some of the factors that can affect the strength of the electric field that must be applied to cause rotation of a given ball include: the ball's electrical characteristics, such as the electrical dipole moment of the ball and monopole moment, if any, due to the zeta potentials of the ball segments which arise when the ball is disposed in dielectric fluid within the substrate; the ball's mechanical characteristics, especially those affecting moment of inertia, such as mass, distribution of mass within the ball, shape of the ball (including deviation of the ball from a purely spherical shape to an ellipsoidal or other shape), size, and radius or mean radius, as well as characteristics affecting the ball's interaction with its spherical cavity, such as the ball's coefficient of friction and surface roughness; the structure of the ball, including the sizes and shapes of any component segments or other regions within the ball and the disposition of these component segments or other regions relative to one another; and the materials that make up the ball and its segments or regions, including any material(s) used in the manufacture of any component region(s) within the ball and any material used to coat all or part of the surface of the ball. Additional factors that can affect the strength of the electric field that must be applied to cause rotation of a given ball include: the characteristics of the cavity in which the ball is situated, such as deviation from purely spherical shape (including use of piezoelectric fields to affect this, as disclosed in U.S. Pat. No. 4,126,854, incorporated hereinabove by reference, at col. 5, lines 16–29) and surface roughness or other factors affecting coefficient of friction of the ball against the cavity wall; the material and mechanical characteristics of the elastomer, including the stickiness of the elastomer material; and the characteristics of the plasticizer fluid permeating the elastomer and filling the cavity, including viscosity and dielectric properties. The foregoing lists of factors are illustrative and by no means exhaustive.

It should also be noted that other things being equal, a thicker elastomer layer requires a higher applied voltage perpendicular to the layer surface in order to cause rotation of balls of a given threshold. Similarly, for in-plane fields, the larger the width of the substrate region (e.g., the pixel or subpixel) to which the field is applied, the greater must be the voltage applied between one side of the pixel and the other. These observations follow from the definition of the electric field as the gradient of the electric potential; for a uniform electric field this reduces to $E=V/d$, where V is the applied voltage and d is the distance over which the voltage is applied.

Figure 14B:
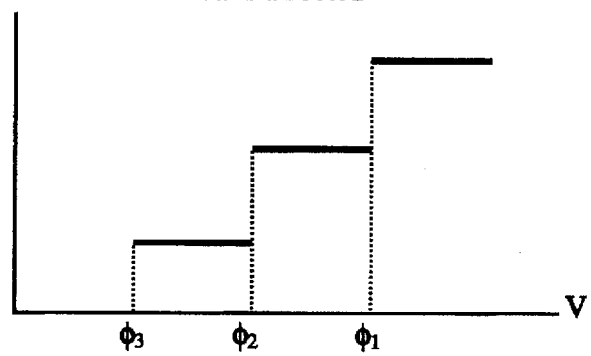
FIGS. 14B–14D are voltage response graphs for different multithreshold gyricons.

The graph of FIG. 14B illustrates the behavior in response to an applied voltage of an ideal gyricon in which the gyricon balls are of three different rotation thresholds. The graph plots the number of balls that rotate in response to application of a given electric field (ordinate) versus the voltage that must be applied to a given thickness of elastomer sheeting in order to produce that field (abscissa). For applied voltages below threshold potential $\phi_3$, no balls rotate. For applied voltages greater than or equal to threshold potential $\phi_3$ and less than threshold potential $\phi_2$, balls having the third (lowest) threshold rotate, while other balls are unaffected. For applied voltages greater than or equal to threshold potential $\phi_2$ and less than threshold potential $\phi_1$, balls having the third or second (intermediate) threshold rotate, while balls having a first (highest) threshold are unaffected. For applied voltages above threshold potential $\phi_1$, all the balls rotate.

Figure 14C:
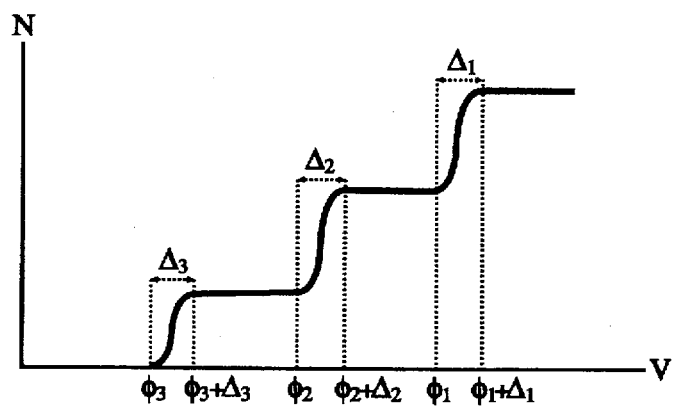

In a practical gyricon, the ideal graph of FIG. 14B is modified somewhat because of statistical variations among the balls. Typically, a given population of balls having approximately equal physical characteristics will have a range of thresholds clustered around a mean value, due to minor variations in size, shape, electrical characteristics and so forth from one ball to another. Thus the response graph is not likely to be the series of step functions of FIG. 14B. Instead, for a gyricon having three populations of balls, each population having a different average rotation threshold, the graph will be as shown in FIG. 14C. As the voltage is increased from zero, no balls rotate until a minimum threshold potential $\phi_3$ is reached, at which point balls of the third (lowest-threshold) population begin to rotate. As the voltage is further increased over the range between $\phi_3$ and $\phi_3+\Delta_3$, an increasing number of balls of the third population rotate until, after the voltage exceeds $\phi_3+\Delta_3$, all of the balls of the third population will rotate in response to the applied voltage. If the voltage is further increased to a second minimum threshold potential $\phi_2$, balls of the second (intermediate-threshold) population begin to rotate, along with all the balls in the third population. As the voltage is further increased over the range between $\phi_2$ and $\phi_2+\Delta_2$, an increasing number of balls of the second population rotate until, after the voltage exceeds $\phi_2+\phi_2$, all of the balls of the third and second populations will rotate in response to the applied voltage. Further increasing the voltage beyond a third minimum threshold potential $\phi_1$ causes some balls of the first (highes-threshold) population to rotate along with all the balls in the third and second populations. Finally, as the voltage is further increased over the range between $\phi_1$ and $\phi_1+\Delta_1$, an increasing number of balls of the second population rotate until, after the voltage exceeds $\phi_1+\Delta_1$, all of the balls of all three populations will rotate in response to the applied voltage.

When a sharp threshold response is desired (for example, when passive-matrix rather than active-matrix addressing electronics are to be used), the values of $\Delta_3$, $\Delta_2$, and $\Delta_1$ in FIG. 14C should preferably be made as small as possible. This can be done, for example, by tightening manufacturing tolerances for the balls so as to reduce the variance of any physical characteristics of the balls strongly affecting rotation threshold (e.g., radius). In any case, the values of $\Delta_3$, $\Delta_2$, and $\Delta_1$ should be sufficiently small that the ranges of voltages used for addressing different sets of balls do not overlap. That is, if individual sets of balls are to be separately addressed, the inequalities $\phi_3+\Delta_3<\phi_2$ and $\phi_2+\Delta_2<\phi_1$ must be strictly satisfied.

Figure 14D:
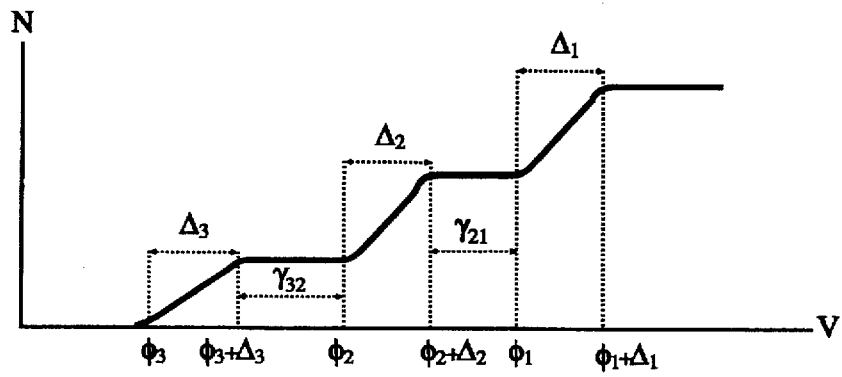

Alternatively, it can be advantageous in some cases to make the values $\Delta_3$, $\Delta_2$, and $\Delta_1$ larger rather than smaller. This is shown in FIG. 14D. The behavior of the balls in response to increasing applied voltage is similar to that described with reference to FIG. 14C. However, because $\Delta_3$, $\Delta_2$, and $\Delta_1$ are larger relative to their respective minimum thresholds $\phi_3$, $\phi_2$, and $\phi_1$ than was the case in FIG. 14C, the slope of the graph in the threshold regions is more gentle. If multithresholding is being used to control color saturation, as will be described with reference to FIG. 14F below, this means that the rate at which each color saturates with increasing applied voltage is more gradual with the wider $\Delta$ values of FIG. 14D than would be the case with the narrower $\Delta$ values of FIG. 14C. Thus finer control over color saturation is possible.

Once again, the inequalities $\phi_3+\Delta_3<\phi_2$ and $\phi_2+\Delta_2<\phi_1$ must be strictly satisfied, and preferably the gaps $\gamma_{32}$ and $\gamma_{21}$ between successive $\Delta$ ranges should be substantial. For example, if the overall elastomer sheeting thickness is 30 mils (that is, 10 mils per layer for a three-layer CMY gyricon), some possible minimum threshold values are $\phi_3=80$ volts, $\phi_2=90$ volts, and $\phi_1=100$ volts, with $\Delta_3=\Delta_2=\Delta_1=5$ volts. Consequently the gaps $\gamma_{32}$ and $\gamma_{21}$ are 5 volts.

Figure 14E:
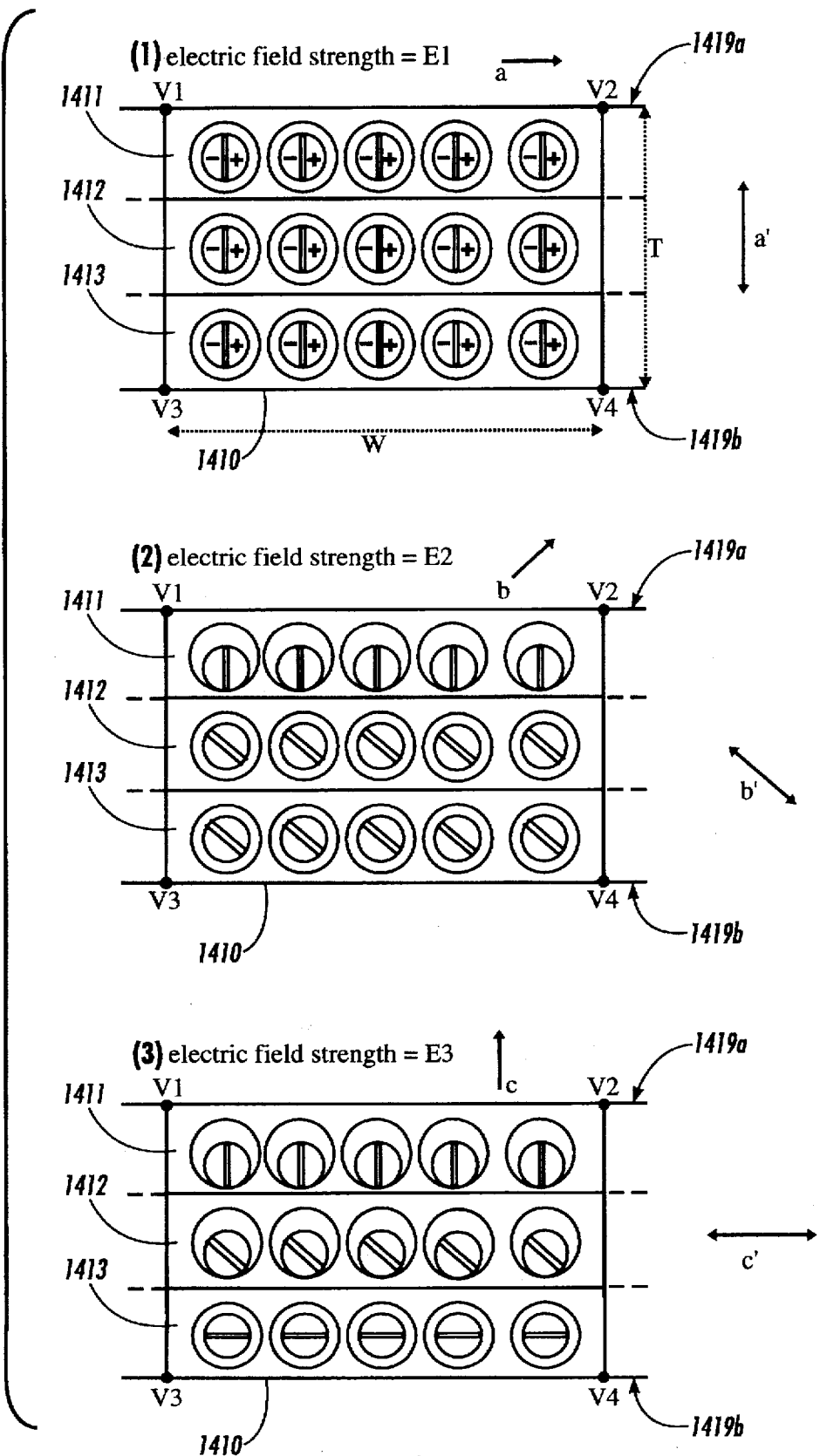
FIG. 14E is a series of views showing successive stages of addressing in a multilayer canted-field gyricon.

A gyricon in which the gyricon balls have multiple rotation thresholds can be addressed with multiple-pass addressing. The series of views in FIG. 14E depicts successive stages in addressing one pixel of a three-layer CMY gyricon in which all the balls within any given layer have a common, ideally sharp threshold (i.e., $\Delta_3=\Delta_2=\Delta_1=0$). The views of the series are all side views of a single-pixel region in gyricon sheet 1410. For a thickness T of elastomer, balls in layer 1413 have a lowest threshold potential $\phi_3$, balls in layer 1412 have an intermediate threshold potential $\phi_2$, and balls in layer 1411 have a highest threshold potential $\phi_1$. Each layer is to be addressed with a canted field, generated on a per-pixel basis by a canted-field electrode that can provide voltages V1, V2, V3, V4 at the periphery of the rectangular columnar region of sheet 1410 that makes up the pixel, as shown. The single-pixel region of sheet 1410 is assumed to have thickness T and width W.

In the first view of FIG. 14E, corresponding to the first addressing pass, the voltages are set such that V1=V3, V2=V4, and $(V3-V2)/W>\phi_1/T$. The resulting electric field E1 has a magnitude $(V3-V2)/W$ greater than the threshold electric field magnitude $\epsilon_1=\phi_1/T$ required to cause rotations of balls in layer 1411. The field E1 is oriented in the direction of arrow a. Application of the field E1 causes the balls of all three layers 1411, 1412, 1413 to align their respective dipole moments with the applied field. The dipole moment of each ball, which arises from the zeta potential difference between the end segments of the ball in the presence of the dielectric fluid permeating sheet 1410 (as indicated in the first view of FIG. 14E by + and − signs in the end segments) is perpendicular to the plane of the center segment of the ball. Thus the center segments of the balls of all three layers are caused to be oriented parallel to the direction of arrows a' (that is, perpendicular to the planar surfaces 1419a, 1419b of gyricon sheet 1410).

In the second view of FIG. 14E, corresponding to the second addressing pass, the voltages are set such that V3>V1, V1=V4, V4>V2, and $\phi_1/T>(V3-V2)/Y>\phi_2/T$, where $Y=(T^2+W^2)^{1/2}$. The resulting electric field E2 has a magnitude of $(V3-V2)/Y$, which is greater than the threshold electric field magnitude $\epsilon_2\phi_2/T$ required to cause rotations of balls in layer 1412. The field E2 is oriented in the direction of arrow b. Application of the field E2 causes the balls of layers 1412 and 1413 to align their respective dipole moments with the applied field and has no effect on balls of layer 1411. The center segments of the balls of layers 1412 and 1413 are caused to be oriented parallel to the direction of arrows b' (that is, at an acute angle with respect to the planar surfaces 1419a,1419b of gyricon sheet 1410).

In the third view of FIG. 14E, corresponding to the third addressing pass, the voltages are set such that V1=V2, V3=V4, and $\phi_2>V3-V2>\phi_3$. The resulting electric field E3 has a magnitude of $(V3-V2)/T$ and is oriented in the direction of arrow c. Application of the field E3 causes the balls of layer 1413 to align their respective dipole moments with the applied field, which in turn causes the center segments of the balls of layer 1413 to become oriented parallel to the direction of arrows c' (that is, parallel to the planar surfaces 1419a, 1419b of gyricon sheet 1410). The balls in layers 1411 and 1412 are not affected, because the applied voltage gradient is below their respective thresholds $\phi_1/T$ and $\phi_2/T$.

Multiple-pass addressing can also be used to address selectively balls of different rotation thresholds within a single layer of a single-layer or multilayer gyricon. An application of this technique is for controlling the color saturation of a chromatic color in an image element, the gray scale level for black in an image element, or, in general, the degree to which a color or other optical modulation characteristic is observably present in an image element, without the need for canted fields. For example, one way to achieve variable color saturation in an RGB gyricon based on three-segment balls (as in FIGS. 10A–10C) without using canted fields is to provide a multiplicity of balls associated with each color in each subpixel. To get a fully saturated color, all of the balls in the subpixel are turned with their center segments parallel to the surface of the elastomer sheet. To get a minimally saturated color, all of the balls in the subpixel are turned with their center segments perpendicular to the surface of the elastomer sheet. To get an intermediate color saturation, a subset of the balls in the subpixel are turned with their center segments parallel to the surface of the elastomer sheet, while the remaining balls of the subpixel are turned with their center segments perpendicular to the sheet surface. In other words, the more balls that are turned so that their center segments are parallel to the plane of the gyricon sheet, the more saturated the resulting color of the subpixel appears. The same principle can be used to control color saturation without the use of canted fields in other color gyricons, such as CMY(K) or bistate or tristate light-valve gyricons. It can also be used to provide gray-scale capability in, for example, gyricons based on black-and-white bichromal balls of the prior art. The darkness of the gray of a pixel depends on the percentage of balls in that pixel which have their white and black hemispheres facing toward the observable surface of the gyricon sheet.

Figure 14F:
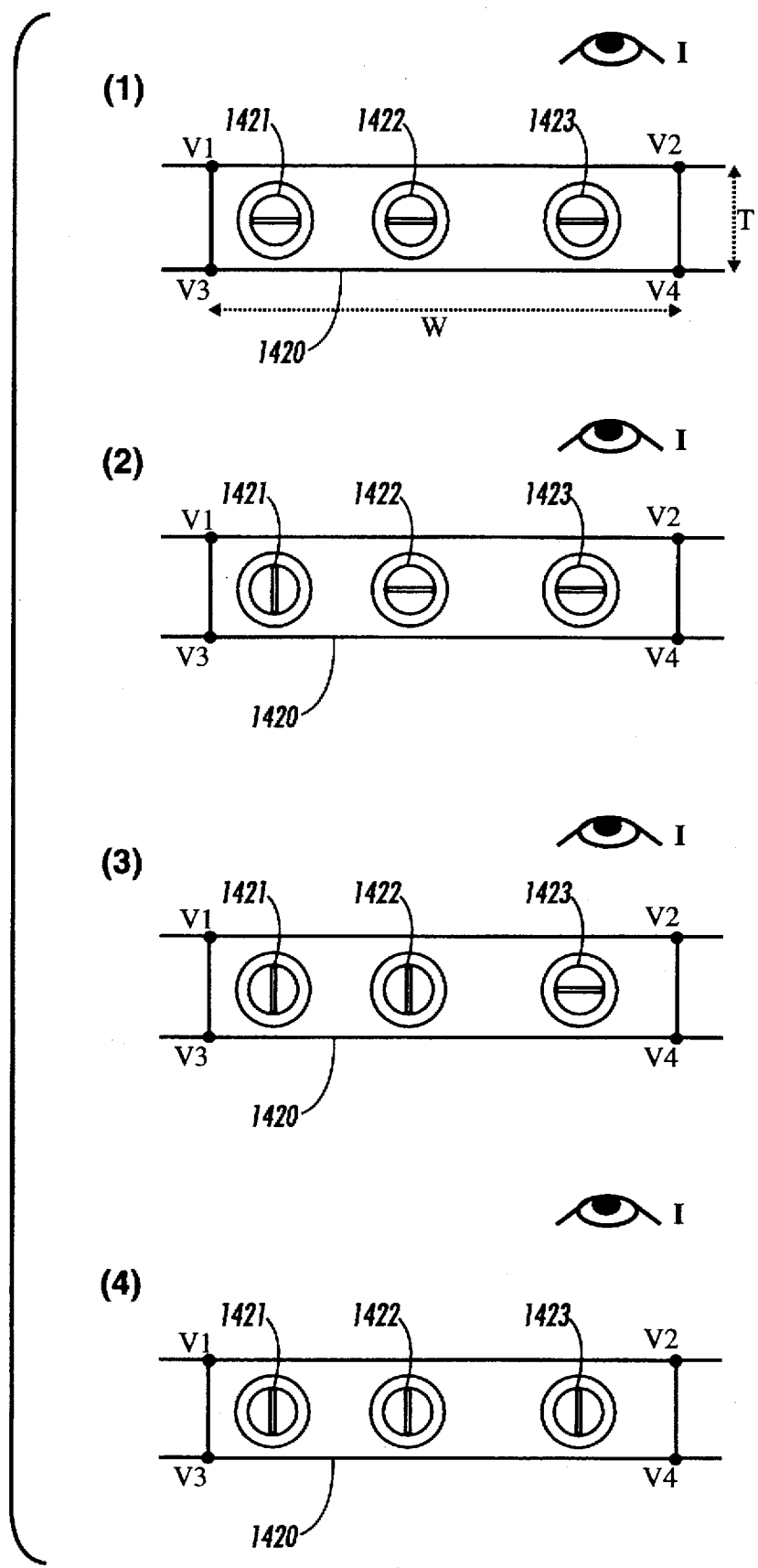
FIG. 14F is a series of views showing color saturations available in a multithreshold single-layer gyricon.

The series of views in FIG. 14F depicts several different degrees of color saturation obtainable in a single-layer gyricon having three different sets of balls disposed within the single layer, each set of balls having a different rotation threshold, all three sets being associated with the same observable color. Each of the gyricon balls is a three-segment ball with transparent end segments and a colored center segment. For example, if the colored center segments are red, the balls could be disposed in a single red subpixel of the RGB gyricon previously described with reference to FIGS. 10A–10C.

The views in FIG. 14F are all side views of a region constituting one addressable image element (e.g., subpixel) in gyricon sheet 1420. For clarity of exposition, a single ball of each threshold is shown, although in practice, preferably a large number of balls of each threshold are dispersed uniformly (e.g., randomly) throughout each pixel. For a thickness T of elastomer, ball 1423 has a lowest threshold potential $\phi_3$, ball 1422 has an intermediate threshold potential $\phi_2$, and ball 1421 has a highest threshold potential $\phi_1$. Once again, as in FIG. 14E, the layer thickness is T and the image element width is W, and ideally sharp thresholds are assumed (i.e., $\Delta_3=\Delta_2=\Delta_1=0$).

In the first view of FIG. 14F, balls 1421, 1422, and 1423 all are oriented with their center segments parallel to the plane of gyricon sheet 1420. An observer at I sees a maximally saturated color. This orientation of the balls is obtainable by applying an electric field perpendicular to the plane of gyricon with a field strength $E>\phi_1/T$, or in other words, a voltage difference V across sheet 1420 such that $V>\phi_1$.

In the second view of FIG. 14F, ball 1421 is oriented with its center segment perpendicular to the plane of gyricon sheet 1420, and balls 1422 and 1423 are oriented with their center segments parallel to the plane of gyricon sheet 1420. An observer at I sees a moderately saturated color. This orientation of the balls is obtainable by applying, in a first pass, an electric field in the plane of gyricon with a field strength $E_1>\phi_1/T$ (in other words, a voltage difference V such that $V/W>\phi_1/T$), and thereafter applying, in a second pass, an electric field perpendicular to the plane of the gyricon with a field strength E2 such that $\phi_1/T>E_2>\phi_2/T$ (in other words, a voltage difference V across sheet 1420 such that $\phi_1>V>\phi_2$). The first pass orients all three balls 1421, 1422, and 1423 with their center segments perpendicular to the plane of sheet 1420. The second pass reorients balls 1422 and 1423 so that their center segments become parallel to the plane of gyricon sheet 1420. The second pass has no effect on the orientation of ball 1421, because the applied field is less than the rotation threshold for ball 1421.

In the third view of FIG. 14F, balls 1421 and 1422 are oriented with their center segments perpendicular to the plane of gyricon sheet 1420, and ball 1423 is oriented with its center segment parallel to the plane of gyricon sheet 1420. An observer at I sees a lightly saturated color. This orientation of the balls is obtainable by applying, in a first pass, an electric field in the plane of gyricon with a field strength $E_1>\phi_1/T$ (in other words, a voltage difference V such that $V/W>\phi_1/T$), and thereafter applying, in a second pass, an electric field perpendicular to the plane of the gyricon with a field strength E2 such that $\phi_2/T>E_2>\phi_3/T$ (in other words, a voltage difference V across sheet 1420 such that $\phi_2>V>\phi_3$). The first pass orients all three balls 1421, 1422, and 1423 with their center segments perpendicular to the plane of sheet 1420. The second pass reorients ball 1423 so that its center segment becomes parallel to the plane of gyricon sheet 1420. The second pass has no effect on the orientation of balls 1421 and 1422, because the applied field is less than the rotation threshold for these balls.

In the fourth and final view of FIG. 14F, balls 1421, 1422, and 1423 all are oriented with their center segments perpendicular to the plane of gyricon sheet 1420. An observer at I sees a minimally saturated color. This orientation of the balls is obtainable by applying an electric field in the plane of gyricon with a field strength $E>\phi_1/T$, or in other words, a voltage difference V such that $V/W>\phi_1/T$.

From these examples, it can be seen that in order to provide variable color saturation with gyricon sheet 1420, a series of one or more electric fields can be applied. Each applied field of the series has its electric field vector oriented in one of two directions: either in the plane of sheet 1420, or else perpendicular to the plane of sheet 1420. Color saturation is controlled by controlling the proportion of balls oriented such that their colored center segments are parallel to the plane of sheet 1420 and thus observable to the observer at I. Each ball is in one of two dispositions: either "fully on," that is, oriented so as to make its maximal possible contribution to the observable color, or else "fully off," that is, oriented so as to make its minimal contribution to the observable color. In contrast with the canted-field technique described earlier, intermediate orientations are not used.

In general, a gyricon image element in which there are N different sets of gyricon balls, each set having a distinct threshold $\phi_n$, with each ball capable of being in one of two orientations, can provide up to $2^N$ different combinations of ball orientations if N addressing passes are used (that is, if each set is addressed individually). For example, if a red subpixel of the RGB gyricon previously described with reference to FIGS. 10A–10C has in it five sets of red-center-segment balls, each set having a distinct rotation threshold, and each ball in the subpixel can be oriented with its center segment either parallel to the observable surface ("fully on") or perpendicular to the observable surface ("fully off"), then up to $(2)^5=32$ different levels of red color saturation can be provided for the subpixel. Unfortunately, it is not always practical to provide access to all $2^N$ available combinations of ball orientations. Thus, in this example, accessing of all 32 saturation levels of the red subpixel requires that each of the five sets of balls be separately addressed, which in turn requires five-pass addressing. In general, to access any arbitrary one of the $2^N$ available combinations of ball orientations, N-pass addressing is required, which can be prohibitively time-consuming for even modest values of N.

An alternative approach to controlling variable color saturation in a multithreshold gyricon image element provides N+1 levels of available saturation and requires at most two addressing passes per population of balls. This approach works as follows: A cutoff value is selected, typically a value between two adjacent thresholds $\phi_i$ and $\phi_{i+1}$. The cutoff value serves to divide the N sets of balls of the population into two larger groups. All balls having rotation thresholds greater than the cutoff value are in a first group, and all balls having thresholds less than or equal to the cutoff value are in a second group. The two groups can be addressed in two passes: a first pass in which all balls in both the first and second groups are reset to a default orientation (for example, the "fully off" orientation), followed by a second pass in which balls in the second group only are oriented in a non-default orientation (for example, the "fully on" orientation) by application of an electric field having a strength equal to the chosen cutoff value.

An example of this alternative approach is seen in the foregoing description of the second and third views of FIG. 14F, in which it was explained how two addressing passes can be used to obtain the ball orientations shown. Expressed as a voltage to be applied across the elastomer thickness T, the cutoff value $\phi_c$ for the second view of FIG. 14F is chosen such that $\phi_1 > \phi_2 > \phi_2$, and for the third view of FIG. 14F, such that $\phi_2 > \phi_c > \phi_3$.

Further, it will be appreciated that if the cutoff value $\phi_c$ is chosen such that $\phi_c > \phi_1$ (for example, if $\phi_c = \infty$), the alternative approach can be used to obtain the ball orientations shown in the first view of FIG. 14F. Similarly, if the cutoff value is chosen such that $\phi_3 > \phi_c$ (for example, if $\phi_c = 0$), the approach can be used to obtain the ball orientations shown in the fourth and final view of FIG. 14F. In each of these cases, two-pass addressing is somewhat redundant, inasmuch as single-pass addressing would suffice. That is, for the first view of FIG. 14F, the results of the first addressing pass are completely undone by the second pass, and for the fourth view of FIG. 14F, the results of the first pass require no further correction by the second pass. Accordingly, in such cases it can be worthwhile to omit redundant addressing steps, in order to reduce addressing time.

The alternative, cutoff-value approach to multithreshold, multipass addressing is often to be preferred over the more general but more time-consuming N-pass approach described previously for color presence control applications. In particular, the two-pass approach works especially well for controlling color presence when N is large. The number of available gradations of control is N+1, and the number of addressing passes is never more than two. Thus fine control over color saturation, gray scale, and the like are facilitated.

Moreover, the cutoff-value addressing approach can obviate the need for very sharp thresholds. A nonzero value of $\Delta$ defines a range of thresholds for a given population of balls; choosing a cutoff value $\phi_c$ in this range divides the population in two. For example, referring once again to FIG. 14D, each ball in the first population has a rotation threshold somewhere between $\phi_1$ and $\phi_1 + \Delta_1$. A color saturation (for example) associated with the third population of balls can be controlled by resetting all the balls of the third population to a default orientation with an applied voltage exceeding $\phi_1 + \Delta_1$ in a first pass, and thereafter orienting a subset of the balls to a new, non-default orientation with an applied voltage at a cutoff value $\phi_c$ such that $\phi_1 < \phi_c < \phi_1 + \Delta_1$ in a second pass. This can be repeated for the balls in the second and third populations, reducing the applied voltage appropriately each time, until the desired saturations are established for each color. From this example, it can be appreciated that the threshold width $\Delta$ for each population can affect the degree of precision with which color saturation can be controlled. Assuming that the precision with which $\phi_c$ can be chosen is limited, then as $\Delta$ is reduced towards zero, there will be effectively fewer available cutoff values within each population and thus fewer gradations of color saturation control for the color associated with that population. Thus the cutoff-value multithreshold addressing approach turns a wide threshold width $\Delta$ to best advantage; sharp thresholds are not especially desirable in this approach.

For the three populations of balls in FIG. 14D, at most six addressing passes are required for the cutoff-value multithreshold addressing approach. In general, for K populations of balls, at most 2K addressing passes are required for this approach.

The series of views of FIG. 14G illustrates an example of the cutoff-value addressing approach as applied to a three-layer gyricon having three populations of three-segment balls, one population per layer. For example, the gyricon can be a CMY gyricon. Each layer's ball population has a different associated minimum threshold $\phi$ and a nonzero threshold width $\Delta$. In particular, it is assumed for purposes of this example that each layer's population of balls consists of several subpopulations, each subpopulation having a distinct (sharp) threshold in the range from $\phi$ to $\phi+\Delta$. The views of the series are all side views of a single-pixel region in gyricon sheet 1450 having thickness T (that is, each layer in sheet 1450 has thickness T/3) and width W.

For a thickness T of elastomer, balls in layer 1453 have a lowest minimum threshold potential $\phi_3$ and a nonzero threshold width $\Delta_3$; balls in layer 1452 have an intermediate threshold potential $\phi_2$ and a nonzero threshold width $\Delta_2$; and balls in layer 1451 have a highest threshold potential $\phi_1$ and a nonzero threshold width $\Delta_1$. Each layer is to be addressed with an electric field that can be oriented either parallel or perpendicular to the plane of sheet 1450.

The population of balls in layer 1453 includes balls 1453a, 1453b, 1453c, 1453d, and 1453e, which have individual rotation thresholds $\phi_{3a}$, $\phi_{3b}$, $\phi_{3c}$, $\phi_{3d}$, and $\phi_{3e}$, respectively, such that $(\phi_3+\Delta_3) > \phi_{3a} > \phi_{3b} > \phi_{3c} > \phi_{3d} > \phi_{3e} > \phi_3$. The population of balls in layer 1452 includes balls 1452a, 1452b, 1452c, 1452d, and 1452e, which have individual rotation thresholds $\phi_{2a}$, $\phi_{2b}$, $\phi_{2c}$, $\phi_{2d}$, and $\phi_{2e}$, respectively, such that $(\phi_2+\Delta_2) > \phi_{2a} > \phi_{2b} > \phi_{2c} > \phi_{2d} > \phi_{2e} > \phi_2$. The population of balls in layer 1451 includes balls 1451a, 1451b, 1451c, 1451d, and 1451e, which have individual rotation thresholds $\phi_{1a}$, $\phi_{1b}$, $\phi_{1c}$, $\phi_{1d}$, and $\phi_{1e}$, respectively, such that $(\phi_1+\Delta_1) > \phi_{1a} > \phi_{1b} > \phi_{1c} > \phi_{1d} > \phi_{1e} > \phi_1$.

In the first view of FIG. 14G, corresponding to the first addressing pass, an electric field $E1_\parallel$ is applied in the plane of sheet 1450. The field is of sufficient strength to rotate all the balls in all three layers; that is, the applied voltage $V1_\parallel$ is such that $(V1_\parallel/W) > (\phi_1+\Delta_1)/T$. All of balls 1451a, 1451b, 1451c, 1451d, 1451e, 1452a, 1452b, 1452c, 1452d, 1452e, 1453a, 1453b, 1453c, 1453d, and 1453e are rotated so that their dipole moments align with the applied field, which causes their center segments to be oriented perpendicularly to the plane of sheet 1450. In other words, all the balls are reset to their "fully off" orientations.

In the second view of FIG. 14G, corresponding to the second addressing pass, an electric field $E1_\perp$ is applied perpendicular to the plane of sheet 1450. The field is of sufficient strength to rotate some of the balls in layer 1451 and all of the balls in layers 1452 and 1453; that is, the applied voltage $V1_\perp$ across the thickness T of sheet 1450 is such that $(\phi_1+\Delta_1) > V1_\perp > \phi_1$. More particularly in this example, the applied voltage $V1_\perp$ is chosen such that balls 1451c, 1451d, and 1451e are affected by the applied voltage while balls 1451a and 1451b are not. Thus $\phi_{1b} > V1_\perp > \phi_{1c}$. (Put another way, $V1_\perp$ defines the cutoff value $\phi_c$ for the first population of balls.) In response to the applied field $E1_\perp$, balls 1451c, 1451d, and 1451e, along with all of balls 1452a, 1452b, 1452c, 1452d, 1452e, 1453a, 1453b, 1453c, 1453d, and 1453e, are rotated so that their dipole moments align with the applied field, which causes their center segments to be oriented parallel to the plane of sheet 1450. That is, all these balls 1451c, 1451d, 1451e, 1452a, 1452b, 1452c, 1452d, 1452e, 1453a, 1453b, 1453c, 1453d, and 1453e are oriented in their "fully on" orientations at the end of the second pass. Balls 1451a and 1451b remain in their reset, "fully off" orientations.

In the third view of FIG. 14G, corresponding to the third addressing pass, an electric field $E2_\parallel$ is applied in the plane of sheet 1450. The field is of sufficient strength to rotate all of the balls in layers 1452 and 1453 while leaving all of the balls in layer 1451 unaffected; that is, the applied voltage $V2_\parallel$ is such that $(\phi_1/T) > (V2_{81}/W) > (\phi_2+\Delta_2)/T$. Balls 1452a, 1452b, 1452c, 1452d, 1452e, 1453a, 1453b, 1453c, 1453d, and 1453e are rotated so that their dipole moments align with the applied field, which causes their center segments to be oriented perpendicularly to the plane of sheet 1450. In other words, all the balls in layers 1452 and 1453 are again reset to their "fully off" orientations, while balls in layer 1451 remain as they were.

In the fourth view of FIG. 14G, corresponding to the fourth addressing pass, an electric field $E2_\perp$ is applied perpendicular to the plane of sheet 1450. The field is of sufficient strength to rotate some of the balls in layer 1452 and all of the balls in layer 1453, without affecting any balls in layer 1451; that is, the applied voltage $V2_\perp$ across the thickness T of sheet 1450 is such that $(\phi_2+\Delta_2) > V2_\perp > \phi_2$. More particularly in this example, the applied voltage $V2_\perp$ is chosen such that balls 1452b, 1452c, 1452d, and 1452e are affected by the applied voltage while ball 1452a is not. Thus $\phi_{2a} > V2_\perp > \phi_{2b}$. (Put another way, $V2_\perp$ defines the cutoff value $\phi_c$ for the second population of balls.) In response to the applied field $E2_\perp$, balls 1452b, 1452c, 1452d, and 1452e, along with all of balls 1453a, 1453b, 1453c, 1453d, and 1453e, are rotated so that their dipole moments align with the applied field, which causes their center segments to be oriented parallel to the plane of sheet 1450. That is, all these balls 1452b, 1452c, 1452d, 1452e, 1453a, 1453b, 1453c, 1453d, and 1453e are oriented in their "fully on" orientations at the end of the fourth pass. Ball 1452a remains in its reset, "fully off" orientation.

In the fifth view of FIG. 14G, corresponding to the fifth addressing pass, an electric field $E3_\parallel$ is applied in the plane of sheet 1450. The field is of sufficient strength to rotate all of the balls in layer 1453 while leaving all of the balls in layer 1451 and 1452 unaffected; that is, the applied voltage $V3_\parallel$ is such that $(\phi_2/T) > (V3_\parallel/W) > (\phi_3+\Delta_3)/T$. Balls 1453a, 1453b, 1453c, 1453d, and 1453e are rotated so that their dipole moments align with the applied field, which causes their center segments to be oriented perpendicularly to the plane of sheet 1450. In other words, all the balls in layer 1453 are yet again reset to their "fully off" orientations, while balls in layers 1451 and 1452 remain as they were.

In the sixth and final view of FIG. 14G, corresponding to the sixth addressing pass, an electric field $E3_\perp$ is applied perpendicular to the plane of sheet 1450. The field is of sufficient strength to rotate some of the balls in layer 1453, without affecting any balls in layers 1451 and 1452; that is, the applied voltage $V3_\perp$ across the thickness T of sheet 1450 is such that $(\phi_3+\Delta_3) > V3_\perp > \phi_3$. More particularly in this example, the applied voltage $V3_\perp$ is chosen such that ball 1453e is affected by the applied voltage while balls 1453a, 1453b, 1453c, and 1453d are not. Thus $\phi_{3d} > V3_\perp > \phi_{3e}$. (Put another way, $V3_\perp$ defines the cutoff value $\phi_c$ for the third population of balls.) In response to the applied field $E3_\perp$, ball 1453e is rotated so that its dipole moment aligns with the applied field, which causes its center segment to be oriented parallel to the plane of sheet 1450. None of the other balls is affected.

This completes the addressing sequence of FIG. 14G. After the sixth pass is complete, an observer at I sees a pixel in which the color provided by the center segments of the balls in layer 1451 is moderately saturated, the color provided by the center segments of the balls in layer 1452 is heavily saturated, and the color provided by the center segments of the balls in layer 1453 is very lightly saturated. Again, it is worth noting that although the balls are illustrated in FIG. 14G as having five discrete thresholds and neatly arranged in order of decreasing rotation threshold, this is done only for purposes of clarifying the exposition. In practice, each population of balls will have a large number of thresholds, which will be statistically distributed over the interval between $\phi_1$ and $(\phi_1\Delta_1)$ for layer 1451, over the interval between $\phi_2$ and $(\phi_2+\Delta_2)$ for layer 1452, and over the interval between $\phi_3$ and $(\phi_3+\Delta_3)$; and balls of these different thresholds will be spatially distributed throughout their respective layers.

The parallel and perpendicular addressing fields used in FIGS. 14F and 14G can be generated separately for each pixel or other image element, using an electrode configuration that is similar in appearance to the canted-field electrode configuration previously described with reference to FIG. 8A. However, only parallel and perpendicular fields are needed, so the voltages V1, V2, V3, and V4 can be constrained such that either V1=V2 and V3=V4, or else V1=V3 and V2=V4. Thus the voltage control circuitry can be simplified as compared with the control circuitry necessary to provide a fully general canted-field capability.

Alternatively, the parallel and perpendicular fields can be generated with the less complex and less expensive electrode configuration depicted in FIG. 8F, in which the in-plane "erase" field is applied to the entire gyricon sheet at once, and only the perpendicular field is separately addressable for each image element. This configuration works well with the cutoff-value approach to multithreshold, multipass addressing as exemplified in FIG. 14G, because if the default orientation is "fully off" then the first addressing pass for each population of balls in every pixel is always a bulk erasure. The second pass, which turns some of the balls to "fully on," can vary in applied voltage from pixel to pixel. The electrode configuration of FIG. 8F is not sufficient for more general N-pass approach in which all $2^N$ possible combinations of ball orientations are to be made accessible.

It should be noted in conjunction with the multithreshold approaches for color presence control that if the different rotation thresholds for the balls of each color in a gyricon are achieved by using balls of different sizes, the choice of which balls should be larger and which balls should be smaller can depend on the number of steps of presence resolution required for each color. For example, suppose that in a multilayer CMYK gyricon, balls in the cyan layer have a first mean radius, balls in the magenta layer have a second mean radius, balls in the yellow layer have a third mean radius, and balls in the black layer have a fourth mean radius. It is advantageous in this case for the balls having the largest radius to be in the yellow layer, and the balls having the smallest radius to be in the black layer, because typically the human eye resolves more gradations of gray-scale than gradations of color saturation, and resolves gradations of yellow less well than gradations of other colors. If multithresholding is used, the number of available gradations for a given color in a given pixel depends on the number of separately addressable balls of that color in the pixel; the more balls of a given color, the finer the control that can be had over the presence of that color in the final color mix. Thus, since the least precise control is required for yellow and the most precise control is required fro black, there can be relatively fewer yellow balls per pixel as compared with the number of cyan or magenta balls per pixel, and relatively more black balls per pixel as compared with the number of cyan or magenta balls per pixel (that is, $N_{yellow} < N_{cyan} < N_{black}$ and $N_{yellow} < N_{magenta} < N_{black}$).

The multithreshold, multipass techniques illustrated in FIGS. 14F–14G can be usefully compared with the canted-field techniques described earlier with reference to FIGS. 8A–8C. The two sets of techniques provide two distinct sets of approaches to controlling the degree of presence (e.g., color saturation, gray-scale level, etc.) of any given color in any single image element of a gyricon. Briefly summarized, these two sets of approaches can be contrasted as follows:

The canted-field approaches work by varying the angle of each ball with respect to the gyricon's observable surface, and thus the degree to which each ball contributes to the observable color. Each ball can be rotated by the canted field to any angle of a continuous range of angles. All balls in a given region are rotated at once. Addressing takes place in a single operation.

The multithreshold, multipass approaches work by varying the proportion of balls rotated, and thus the number of balls available to contribute to the observable color. Each ball can be rotated to one of two positions, either "fully on" (maximum contribution to the observable color) or "fully off" (minimum contribution to the observable color); unlike the canted-field approach, there are no intermediate positions. Not all balls in a given region need be rotated at once. Addressing takes place in series of passes; for example, all balls can be reset to the "fully off" orientation in a first pass, and then a subset of balls can be oriented in the "fully on" orientation in a second pass.

As previously mentioned with reference to FIG. 14E, multithreshold and canted field techniques can be used together in a single gyricon, with multithresholding being used to select particular groups (e.g., layers) of balls and canted fields being used to control color presence within each selected group.

Fabrication Techniques for Strategic Placement of Different Balls in a Gyricon Sheet The RGB gyricon of FIGS. 10A–10C is constructed from three different kinds of balls, namely, balls with red center segments, balls with green center segments, and balls with blue center segments. These three different kinds of balls are placed in different subpixel regions in the gyricon sheet. A red subpixel contains balls with red center segments only, and does not contain balls of the other two kinds. Similarly, a green subpixel contains balls with green center segments only, and a blue subpixel contains balls with blue center segments only. To build this gyricon, then, requires a manufacturing technique for placing the different kinds of balls in their respective different locations in the elastomer sheet, so that the desired geometric pattern of red, green, and blue subpixels (e.g., the pattern of FIG. 10C) is obtained.

There are other occasions when it is desirable to create a display from assembled patches of distinctly colored gyricon balls. As an example, in the case of an automobile display, the speedometer might be displayed using bichromal red and white balls; the odometer, a region of green and white bichromal balls; the fuel gauge, black and white bichromal balls; and the tachometer fluorescent blue and white bichromal balls. Yet another example would be in a decoratively patterned gyricon-based architectural screen, made according to the, principles previously described with reference to FIGS. 7A and 7E. For example, a pattern of different balls having different kinds of transparent center segments (e.g., some clear, others "smoke-glass" colored, still others tinted pink or another chromatic color), might be desired.

In general, there can be various circumstances in which it is necessary or advantageous to place different kinds of gyricon balls at different preferred chosen locations in the elastomer layer during the manufacturing process. By "different kinds" is meant any physical distinctions between balls of one set and balls of another set, including different optical properties (of which color is only one example) and distributions of optical properties among regions within the balls; any and all of the aforementioned electrical, mechanical, structural, and material properties, such as size, shape, electrical monopole and dipole moments, and so forth, that were previously mentioned as being among the properties that can affect ball rotation thresholds; and, in general, any other physical characteristics that can be used to differentiate between different balls, such as, for example, ferromagnetic properties in gyricon balls that have such properties (see U.S. Pat. No. 4,126,854, incorporated hereinabove by reference, at col. 6, lines 16–30, for an example of this).

Various techniques can be used to obtain patterned or other strategic ball placement during manufacture of the gyricon elastomer sheet. One such technique is a nonfusing xerographic technique in which the desired pattern of gyricon balls of different kinds is xerographically "printed" on a partially cured elastomer using "toners" that comprises the gyricon balls themselves. In this manner, different kinds of gyricon balls can be placed at any desired locations on the partially cured sheet. Once the balls are placed as desired, additional elastomer material in uncured liquid form is poured over them so that the resulting elastomer sheet has the gyricon balls disposed inside it rather than on top of it.

The xerographic technique is informed by the observation that the spheroidal gyricon balls are, in certain ways, very much like the toner particles used in conventional xerography. In particular, they are dielectric and easily triboelectrically charged, like toner particles, and typically they are about the same size as toner particles. This means that the gyricon balls can be placed in a xerographic development system, in place of ordinary toner, and if the development system is subsequently placed in a xerographic engine the latter can produce images made from the balls.

A common form of xerographic development system works by mixing toner particles with steel or ferrite (magnetic) beads in a sump. In the process of mixing the toner particles with the steel or ferrite beads, the toner particles develop a triboelectric charge. A fraction of this mixture of toner particles and beads is brushed against the surface of a photoconductor drum that has an imagewise distribution of charges of the opposite polarity on its surface. This can be obtained by uniformly charging the surface of the photoconductor drum with ions from a corona discharge apparatus and subsequently imagewise discharging the photoconductor by exposing it to light from an image, as is well understood in the xerographic arts. The toner particles adhere to areas of the photoconductor drum that have a high density (voltage) of charge of the opposite polarity. This creates an imagewise toner image.

In conventional xerography, the toner image formed on the photoconductor drum is subsequently transferred to paper, usually by placing a sheet of paper in contact with the photoconductor drum and placing another corona discharge apparatus on the opposite side of the paper, attracting the toner to the paper surface. Thereafter, the toner is fused (melted) into the paper. Here, of course, it is preferred not to melt the gyricon balls, and the preferred receiving surface is not paper but rather the elastomer sheet of the gyricon itself. Accordingly, a nonfusing xerographic process is used. (Other nonfusing xerographic processes are known; see, for example, U.S. Pat. No. 5,075,186, incorporated hereinabove by reference). Toner made from gyricon balls is imaged onto a photoconductor drum and is transferred from the photoconductor onto an adhesive receiving medium, which can conveniently be made of elastomer material in a sticky, partially cured state.

Figure 15A:
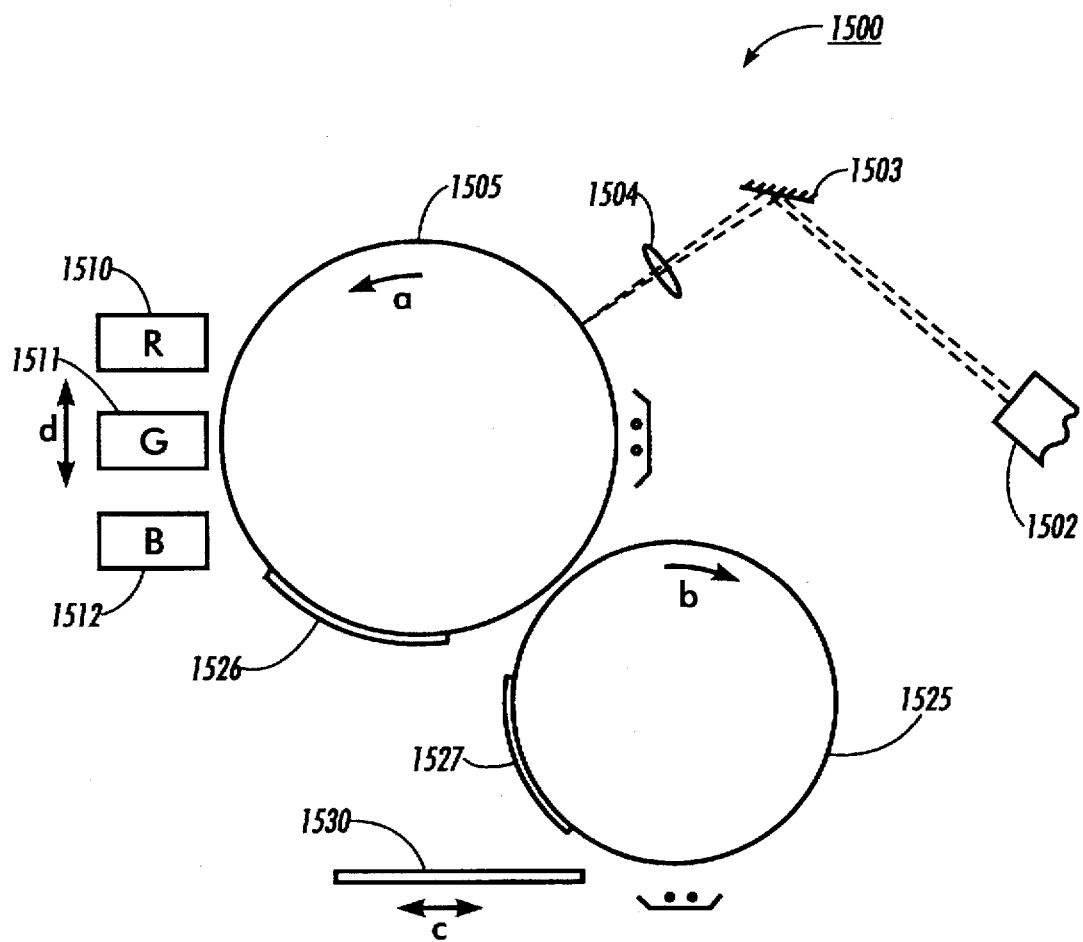
FIG. 15A illustrates a nonfusing xerographic apparatus for gyricon ball placement.

An example of a nonfusing xerographic color printer 1500 suitable for gyricon ball placement is shown in FIG. 15A. For purposes of discussion of FIG. 15A it will be assumed that three sets of gyricon balls, one red, one green, and one blue (e.g., three-segment balls with red, green, and blue center segments, respectively) are to be placed in the gyricon sheet, it being understood that any two or more sets can be placed with this technique.

A photoconductor drum 1505 is exposed to a first laser light image, which imagewise discharges drum 1505. Laser light for the image is produced by scanning laser 1502 in conjunction with mirror 1503 and lens 1504, in a manner like that used in known laser printing and digital xerographic techniques. As drum 1505 rotates counterclockwise (in the direction of arrow a), red development housing 1510, which contains a mixture of ferrite beads and toner made from the red balls, is moved (as indicated by arrows d) into near contact with drum 1505. The mixture of magnetic beads and toner brushes the surface of the photoconductor drum 1505. A magnetic field (not shown) holds onto the magnetic beads. A bias voltage between development housing 1510 and drum 1505 allows the toner (here, the red balls) to stick to the surface of drum 1505 only in those areas of the photoconductor drum where the charge has previously been removed by exposure to the first laser light image. In this manner an imagewise layer of red balls is built up on the surface of the photoconductor drum. This image 1526 is next transferred to a storage drum 1525 by creating a high electrical field between the surface of photoconductor drum 1505 and the surface of storage drum 1525. Storage drum 1525 rotates (as indicated by arrow b) in the opposite direction to drum 1505. The image 1526, formed of the red balls, is shown stored on storage drum 1525.

Next, the photoconductor drum 1505 is again uniformly charged by means of a corona discharge apparatus and this time it is discharged by a second laser light image, again produced with laser 1502. This time, green development housing 1511, which contains a mixture of ferrite beads and toner made from the green balls, is engaged, and it imagewise deposits green balls on the surface of photoconductor drum 1505 in the same manner as was done previously for the red ball image 1526. The green ball image 1527, here seen while still present on drum 1505, is transferred to storage drum 1525 in such a way that it exactly superimposes on the red ball image 1526 that is already there.

In like manner, a third image (not shown) made from toner from blue development housing 1512 can be produced on photoconductor drum 1505 and transferred to storage drum 1525, exactly superimposed on the previously superimposed red and green ball images 1526, 1527.

When all three (or more) colored images have been accumulated on the surface of storage drum 1525, the images are transferred to a receiving surface 1530. In a conventional xerographic printer, the receiving surface is normally paper, and the next step thereafter is heat fusing of the toner image to paper. Here, the receiving surface is an adhesive surface that will position the balls for inclusion in the elastomer layer of the gyricon, and there is no fusing step.

It has been found that a thin layer of partially cured SYLGARD 184 elastomer, a preferred elastomer material for making gyricon sheets, is very sticky. If receiving surface 1530 is a surface of partially cured elastomer, and this surface is moved (arrows c) in the same direction as the surface of storage drum 1525, at the same surface speed, and is allowed to come very close to the surface of storage drum 1525, a significant fraction of the colored ball image stored on storage drum 1525 will transfer to receiving surface 1530. (The surface of storage drum 1525 can advantageously be coated with a non-stick substance, such as TEFLON, so that it can actually be placed in direct contact with the sticky elastomer of receiving surface 1530.) If a strong electrical field is placed across these two surfaces, an even larger fraction of the colored ball image will transfer.

Pouring uncured elastomer onto the surface of the transferred colored ball image, removing the trapped air (for example, by the application of a vacuum or the use of a centrifuge), and curing the elastomer Will result in encapsulation of the colored ball image. Thus the superposition of colored ball images that has been formed on storage drum 1525 becomes the pattern of balls in the elastomer sheet of the gyricon. After plasticization by application of a dielectric plasticizer fluid to swell the elastomer sheet, rendering the balls free to rotate therein, the gyricon will be ready for use.

Figure 15B:
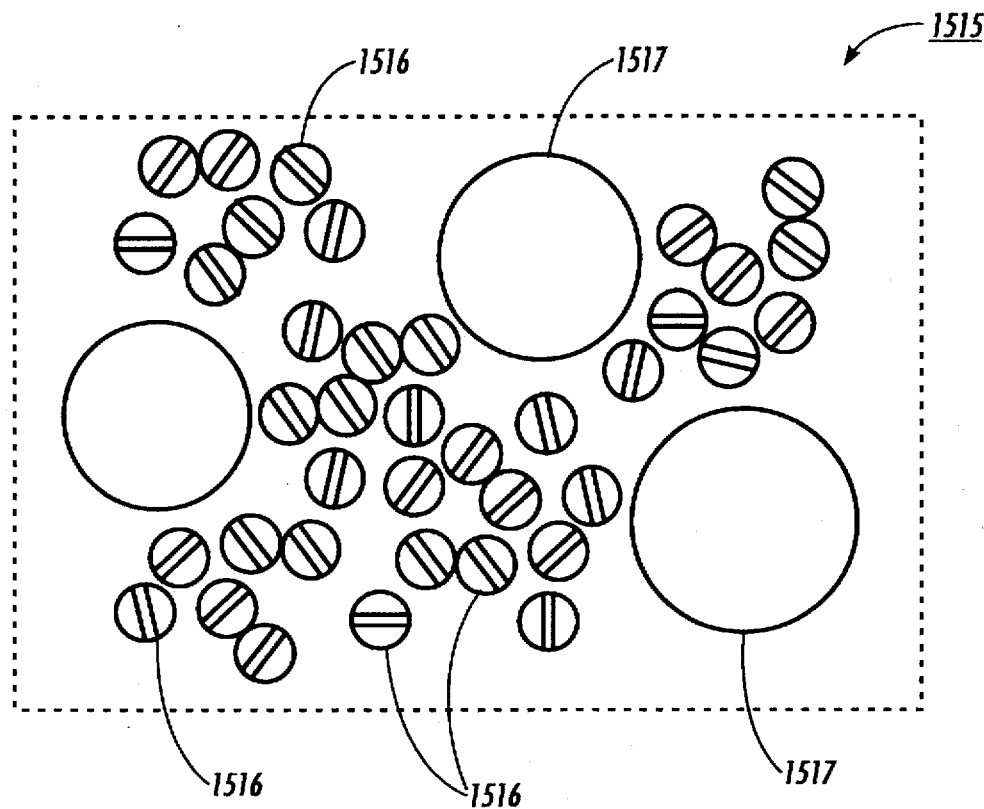
FIG. 15B is a highly magnified view a toner-and-bead powder mixture for use in the apparatus of FIG. 15A.

FIG. 15B is a highly magnified view of a powder mixture of toner and beads for use in the development housings 1510, 1511, 1512 of the xerographic apparatus of FIG. 15A. Powder 1515 includes a large number of gyricon balls 1516 mixed together with a large number of beads 1517 made from ferrite or other magnetic substance. Beads 1517 serve to impart triboelectric charge to balls 1516, in a manner similar to that in which in which ferrite beads serve to impart triboelectric charge to particles of a dry ink or other marking substance in conventional xerographic toner. Typically, the number of beads 1517 will be approximately equal to the number of balls 1516, and the beads 1517 are also spheroidal but about an order of magnitude larger in size than balls 1516. However, it will be understood that different kinds of gyricon balls, different bead materials and sizes, and different proportions of balls to beads in the mixture can be used, as appropriate for the particular application.

Figure 15C:
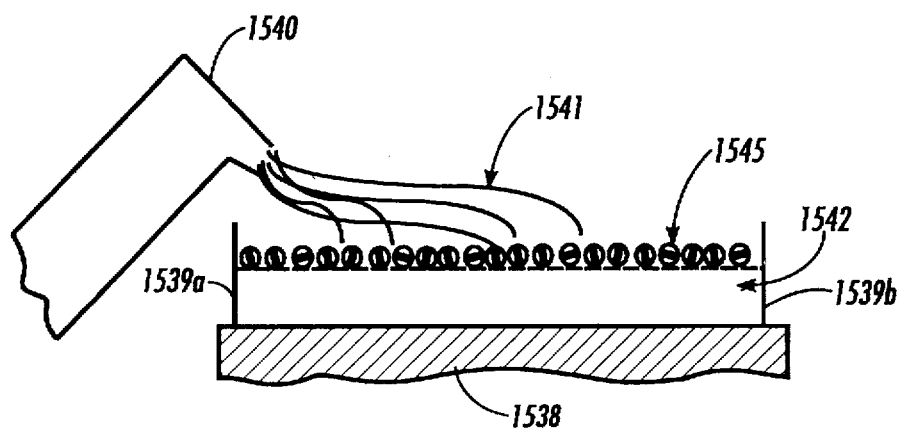
FIG. 15C illustrates a liquid elastomer being dispensed over a partially cured elastomer in which gyricon balls have been placed.

FIG. 15C illustrates the step of pouring the uncured elastomer onto the transferred colored ball image. A section 1542 of partially cured elastomer from receiving surface 1530, onto which the colored ball image has been transferred from storage drum 1525, has been removed to a holding platform 1538 and placed between retaining walls 1539a, 1539b as shown. Balls 1545 are the gyricon balls that make up the transferred colored ball image. Uncured elastomer 1541, which is a liquid, is dispensed from vessel 1540 onto the partially cured elastomer section 1542 and over balls 1545, in such a manner as to cover balls 1545 while not moving them from their respective positions in the elastomer. Thus the colored ball image formed of balls 1545 remains undisturbed as the additional uncured elastomer 1541 is poured over it. Retaining walls 1539a, 1539b hold the dispensed uncured elastomer in place during the curing process.

The xerographic ball placement technique is useful for fabricating any gyricon that includes two or more distinct kinds of balls that are not uniformly distributed throughout the entirety of the elastomer material. Another technique for obtaining low cost, imagewise colored ball distributions takes advantage of the fact that the gyricon balls are highly spherical and, in the absence of electrostatic charges on their surfaces, exhibit excellent flow characteristics. Thus a kind of "silk screening" is possible.

Figure 15D:
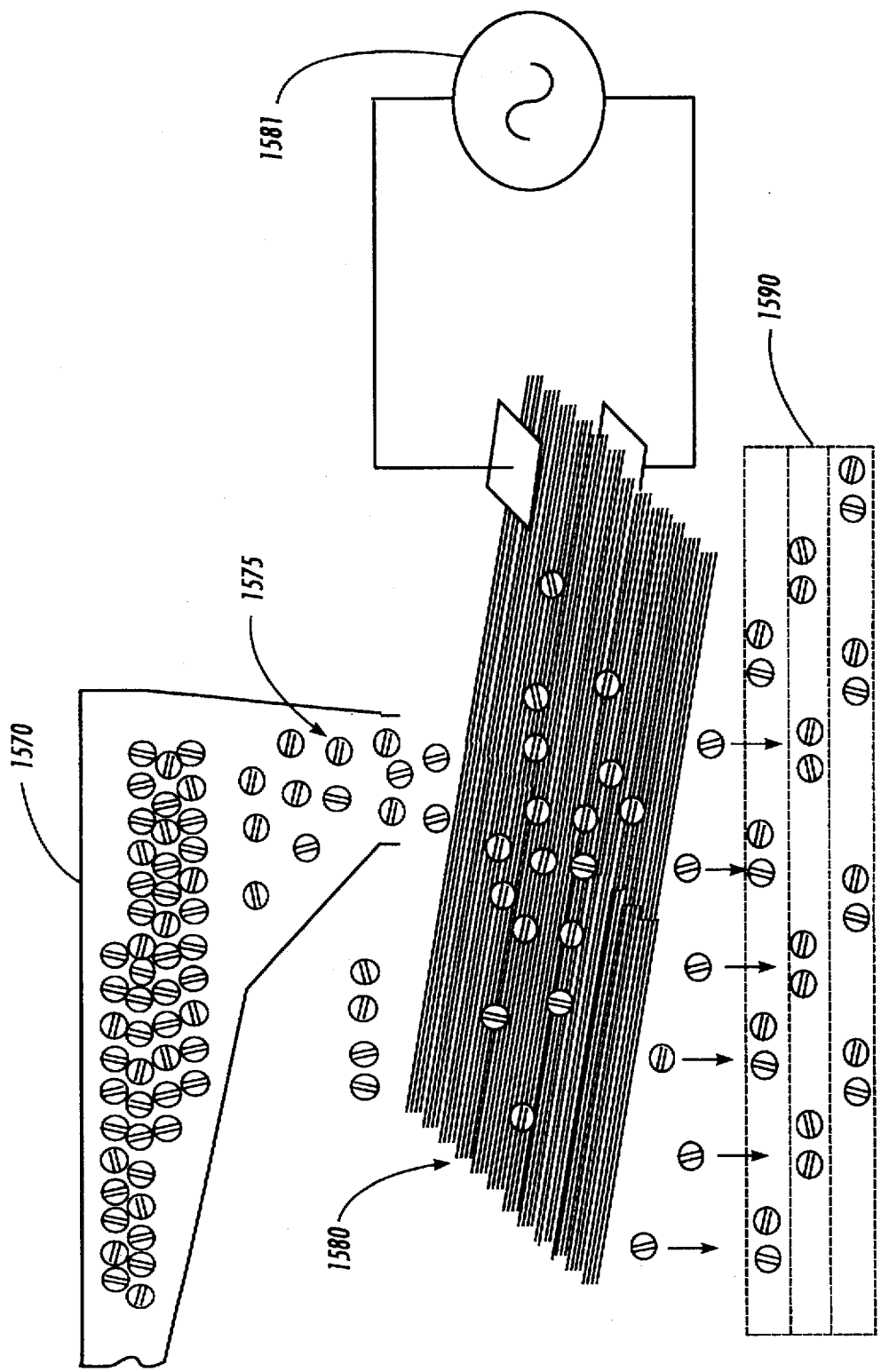
FIG. 15D illustrates a silk-screen apparatus for gyricon ball placement.

The silk screen ball placement technique is illustrated in FIG. 15D. Balls 1575 are dispensed from dispenser 1570 onto a screen 1580 that is disposed above a sticky layer 1590 of partially cured elastomer. Screen 1580 has holes that define the desired image or pattern in which balls 1575 are to be placed in the gyricon sheet. The holes are large enough for balls to 1575 to pass through, yet small enough to give the desired resolution of ball placement. Balls 1575 are placed on screen 1580 and, with appropriate vibration supplied by agitator 1581, pass through the holes of screen 1580 in an imagewise manner. Upon impacting the surface of the partially cured elastomer layer 1590, balls 1575 are stuck to the surface.

The foregoing process can be repeated, using different screens for different kinds of balls, until the desired pattern of different balls is placed on the elastomer surface. For example, a first silk screen can be used to place red balls in elastomer layer 1590, and thereafter a second silk screen can be used to place green balls in elastomer layer 1590. An additional screening step is used for each additional color. Finally, when all the balls are in place, uncured elastomer can be poured over the surface, in a manner similar to that which was shown in FIG. 15C, so as to cover over the placed balls. Next, trapped air is removed from the elastomer, which is then ready to be cured and plasticized.

Conclusion

The foregoing specific embodiments represent just some of the possibilities for practicing the present invention. Many other embodiments are possible within the spirit of the invention. For example:

A gyricon used in a full-color display or full-color electric paper application need not be restricted to conventional RGB or CMY/CMYK color schemes. To improve the color gamut, additional colors can be incorporated. Moreover, as indicated above with regard to the highlight color application, a special custom color can be provided, for example to ensure accurate rendering of a company logo.

The electrical anisotropy of a gyricon ball need not be based on zeta potential. It is sufficient that there is an electrical dipole moment associated with the ball, the dipole moment being aligned with respect to the ball in such a way as to facilitate a useful rotation of the ball in the presence of an applied external electric field. (Typically, the dipole moment is oriented along an axis of symmetry of the ball.) Further, it should be noted that a gyricon ball can have an electrical monopole moment in addition to its electrical dipole moment, as for example when the dipole moment arises from a separation of two positive charges of different magnitudes, the resulting charge distribution being equivalent to a positive electrical monopole superposed with a electrical dipole.

Although the gyricon balls that have been described above are rotationally responsive to DC addressing voltages (whereas those disclosed by Goodrich in U.S. Pat. No. 4,261,653 are not), these balls can also respond to certain AC addressing voltages. In particular, multisegmented zeta-potential-based gyricon balls are suitable for use in raster-scanned addressable displays operating at video frame rates. Moreover, it will be appreciated that certain aspects of the present invention are adaptable even to gyricons in which the balls are rotationally responsive only to non-DC voltages (e.g., RF voltages in Goodrich's case).

The optical anisotropy of a gyricon ball need not be based on color. Other optical properties can vary as different aspects of the gyricon ball are presented to an observer, including (but not limited to) polarization, birefringence, phase retardation, light scattering, and light reflection. In general, the gyricon balls can be used to modulate light in a wide variety of ways.

The incident light that encounters a gyricon need not be restricted to visible light. Given suitable materials for the gyricon balls, the incident "light" can be, for example, infrared light or ultraviolet light, and such light can be modulated by the gyricon.

On several occasions the foregoing description refers to a planar gyricon sheet and to electric fields that are parallel to the sheet, in the plane of the sheet, perpendicular to the sheet, at a specified angle to the sheet, and so forth. However, persons of skill in the art will appreciate that a gyricon sheet made of a flexible material can be temporarily or permanently deformed (for example, flexed, folded, or rolled) so as not to be strictly planar overall. In such cases, electric field angles can be measured, for example, with respect to the sheet in a locally planar neighborhood that includes the gyricon ball or balls of interest. Also, it will further be appreciated that in practice the electric fields can vary somewhat from the parallel, perpendicular, and other angles described, for example, due to manufacturing tolerances or slight imperfections of particular gyricon sheets and electrode assemblies.

The gyricon's paper-like advantages of flexibility, light weight, and so forth make it particularly useful for electric paper applications. However, as noted earlier, the gyricon can also be used in rigid or fixed flat-panel displays, such as for computer screens, automobile dashboards, display signs, etc. Moreover, as seen above with regard to electric Venetian blinds and windowshades, a gyricon need not be used as an information display medium. The light-modulating capabilities provided by the gyricon of the present invention can find many other applications.

The canted-field and multithreshold techniques described hereinabove lend themselves to further applications. One possibility is to use canted-field electrodes in conjunction with an elastomer sheet containing black-and-white gyricon balls of the prior art. The canted fields can rotate the balls to any desired angle, that is, any desired mixture of black and white, thereby making the gyricon capable of gray-scale imaging. Another possibility is to write on RGB multithreshold electric paper with a voltage source, such as a powered stylus, that provides three distinct voltages or voltage ranges. This allows the user to write on electric paper in three different colors.

Full-color gyricons have been described hereinabove that provide color saturation control, for example by way of canted fields and multithresholding techniques. However, a full-color pixel-addressable gyricon that provides only two saturations of each color per pixel, namely, fully saturated or minimally saturated, and does not provide variable color saturation control, can nevertheless be useful. In particular, a CMY display can be built that is suitable for halftone color applications.

Accordingly, the scope of the invention is not limited to the foregoing specification, but instead is given by the appended claims together with their full range of equivalents.

The claimed invention is:

1. An electrode assembly for a light-modulating apparatus, the apparatus comprising a plurality of electrically and optically anisotropic spheroidal balls rotatably disposed in a substrate, the apparatus having a plurality of addressable elements each occupying a spatial volume bounded by a plurality of edges, each element containing at least one of the spheroidal balls, the electrode assembly comprising:

addressing means for selecting an element from among the plurality of elements;

means for establishing a first electric potential in a vicinity of the selected element along a first edge of the selected element;

means for establishing a second electric potential in a vicinity of the selected element along a second edge of the selected element parallel to the first edge;

means for establishing a third electric potential in a vicinity of the selected element along a third edge of the selected element parallel to the first and second edges; and means for establishing a fourth electric potential in a vicinity of the selected element along a fourth edge of the selected element parallel to the first, second, and third edges.

2. The electrode assembly of claim 1 and further comprising:

a first planar electrode subassembly incorporating the means for establishing the first and second electric potentials; and a second planar electrode subassembly, situated parallel to the first planar electrode subassembly and incorporating the means for establishing the third and fourth electric potentials.

3. The electrode assembly of claim 2 wherein each of the first and second electrode subassemblies comprises:

a region of transparent, high-resistivity electrode material disposed in a vicinity of the cell; and a high-resistivity strip material disposed in a parallelogram about the region of transparent material;

and wherein each of the four means for establishing an electric potential comprises a bus bar disposed at an edge of a region of transparent material.

4. Electrode apparatus for addressing an array of optical elements, each element comprising at least one electrically and optically anisotropic spheroidal ball rotatably disposed in a substrate, the electrode apparatus comprising:

means for choosing an element of the array;

means for generating an electric field in a vicinity of the chosen element, the field having a direction of orientation; and means for adjusting the direction of orientation of the field over a continuous angular range of directions.

5. Apparatus comprising:

a substrate having a surface;

a plurality of electrically and optically anisotropic spheroidal balls disposed in the substrate; and means for selectively producing an electric field in a vicinity of at least one ball disposed rotatably in the substrate, the electric field having an electric field vector, the vector being oriented at an orientation angle with respect to a planar portion of the surface proximate to the vicinity, the orientation angle being an angle other than a right angle.

6. The apparatus of claim 5 and further comprising:

control means, coupled to the field-producing means, for adjusting the orientation angle of the electric field vector over a continuous angular range.

7. The apparatus of claim 5 wherein the field-producing means further includes means for selectively producing an electric field having an electric field vector oriented at a right angle with respect to the planar portion of the surface proximate to the vicinity.

8. The apparatus of claim 5 wherein:

the substrate comprises a layer of material having a front surface and a rear surface, the balls of the plurality being disposed within the layer; and the field-producing means comprises a first addressing electrode disposed proximately to the front surface of the layer, and a second addressing electrode disposed proximately to the rear surface of the layer.

9. The apparatus of claim 5 wherein the balls disposed in the substrate include multisegmented balls, each multisegmented ball having a plurality of segments arrayed substantially parallel to one another, each segment being adjacent to at least one other segment and to no more than two other segments, adjacent segments being adjoined to one another at substantially planar interfaces, the plurality of segments including a first segment having a first thickness and a first optical modulation characteristic, a second segment having a second thickness and a second optical modulation characteristic, and a third segment having a thickness different from at least one of the first and second thicknesses and an optical modulation characteristic different from at least one of the first and second optical modulation characteristics, each multisegmented ball having an anisotropy for providing an electrical dipole moment, the electrical dipole moment rendering the ball electrically responsive such that when the ball is rotatably disposed in the substrate and is subjected to an electric field produced by the field-producing means while the electrical dipole moment of the ball is provided, the ball tends to rotate to an orientation in which the electrical dipole moment aligns with the produced electric field.

10. The apparatus of claim 9 wherein the first segment of each multisegmented ball has an optical modulation characteristic such that the first segment has a chromatic color.

11. The apparatus of claim 5 wherein the balls disposed in the substrate include multisegmented balls, each multisegmented ball having a plurality of segments adjoining one another, each segment being adjacent to at least one other segment and to no more than two other segments, the segments including a first segment having a first optical modulation characteristic, a second segment having a second optical modulation characteristic, and a third segment having an optical modulation characteristic different from at least one of the first and second optical modulation characteristics, each multisegmented ball having an anisotropy for providing an electrical dipole moment, the electrical dipole moment rendering the ball electrically responsive such that when the ball is rotatably disposed in the substrate and is subjected to an electric field produced by the field-producing means while the electrical dipole moment of the ball is provided, the ball tends to rotate to an orientation in which the electrical dipole moment aligns with the produced electric field, each multisegmented ball having a plurality of observable aspects, the aspects being observable by an observer situated favorably to observe the surface of the substrate, the aspects including a first aspect associated with the first optical modulation characteristic, the first aspect being observable when the ball is rotationally oriented in a first orientation with respect to the observer under the influence of a first electric field applied in a vicinity of the ball while the ball is disposed rotatably within the substrate and the electrical dipole moment of the ball is provided, the first electric field having an electric field vector perpendicular to a planar portion of the surface proximate to the vicinity of the ball, and a second aspect associated with the second optical modulation characteristic, the second aspect being observable when the ball is rotationally oriented in a second orientation with respect to the observer under the influence of a second electric field applied in the vicinity of the ball while the ball is disposed rotatably within the substrate and the electrical dipole moment of the ball is provided, the second applied electric field being produced by the field-producing means and having an electric field vector including an electric field vector component parallel to the planar portion of the surface proximate to the vicinity of the ball.

12. A method for producing a canted electric field for a light-modulating apparatus comprising a plurality of electrically and optically anisotropic spheroidal balls rotatably disposed in a substrate, the apparatus having a plurality of light-modulating elements each occupying a spatial volume bounded by a plurality of edges, each element containing at least one of the spheroidal balls, the method comprising the steps of:

selecting a light-modulating element from among the plurality of elements;

establishing a first electric potential in a vicinity of the selected element along a first edge of the selected element;

establishing a second electric potential in a vicinity of the selected element along a second edge of the selected element parallel to the first edge;

establishing a third electric potential in a vicinity of the selected element along a third edge of the selected element parallel to the first and second edges; and establishing a fourth electric potential in a vicinity of the selected element along a fourth edge of the selected element parallel to the first, second, and third edges.

13. A method comprising the steps of:

providing light from a light source incident on a modulating device comprising a plurality of electrically and optically anisotropic spheroidal balls rotatably disposed in a substrate, the substrate having a surface;

selectively producing an electric field in a vicinity of at least one ball thus disposed in the substrate, the electric field having an electric field vector, the vector being oriented at an orientation angle with respect to a planar portion of the surface proximate to the vicinity, the orientation angle being an angle other than a right angle; and modulating with the modulating device at least a portion of the light incident on the modulating device.

14. The method of claim 13 and further comprising the step of:

adjusting the orientation angle of the electric field vector over a continuous angular range.

15. The method of claim 13 wherein the step of selectively producing an electric field in a vicinity of at least one ball comprises:

producing an electric field in a vicinity of a ball having an electrical dipole moment, thereby causing the ball having the dipole moment to rotate under the influence of the electric field so as to align the dipole moment with the electric field vector.

16. In a light-modulating apparatus comprising a plurality of electrically and optically anisotropic spheroidal balls rotatably disposed in a substrate, the substrate having a surface, the apparatus having an array of addressable elements, each array element including at least one ball of the plurality, a method comprising the steps of:

selecting an array element;

selecting a preferred direction of orientation for balls of the selected array element, the direction of orientation forming an angle with a vector normal to a planar portion of the substrate surface in a vicinity of the selected array element, the angle being greater than 0 degree and less than 180 degrees; and aligning balls of the selected array element with the preferred direction of orientation by applying an electric field in the vicinity of the selected array element, the electric field having an electric field vector oriented parallel to the selected preferred direction, thereby causing balls of the selected array element to rotate so as to align with the preferred direction of orientation.

17. The method of claim 16 and further comprising the steps of:

ceasing to apply the electric field in the vicinity of the selected array element; and maintaining balls of the selected array element thus aligned with the preferred direction of orientation, notwithstanding cessation of application of the electric field in the vicinity of the selected array element.

18. The method of claim 17 and further comprising the steps of:

selecting a new direction of orientation for balls of the selected array element, the new direction of orientation forming a new angle with the vector normal to the planar portion of the substrate surface in the vicinity of the selected array element, the new angle being greater than or equal to 0 degrees and less than or equal to 180 degrees; and aligning balls of the selected array element with the new direction of orientation by applying an electric field in the vicinity of the selected array element, the electric field having an electric field vector oriented parallel to the selected new direction, thereby causing balls of the selected array element to rotate through a rotation angle, the rotation angle being other than a multiple of 90 degrees, so as to align with the new direction of orientation.

19. The method of claim 16 wherein each ball of the selected array element comprises a plurality of segments arrayed substantially parallel to one another, each segment being adjacent to at least one other segment and to no more than two other segments, adjacent segments being adjoined to one another at substantially planar interfaces, and wherein the aligning step comprises:

aligning balls of the selected array element so that the planar interfaces are perpendicular to the preferred direction of orientation.

20. The method of claim 16 wherein each ball of the selected array element has a plurality of observable aspects each associated with a degree of color saturation, the degree of color saturation ranging from a minimum degree of color saturation to a maximum degree of color saturation, and wherein the aligning step comprises:

applying the electric field in the vicinity of the selected array element, thereby causing balls of the selected array element to rotate so as to present, to an observer situated favorably to observe the selected array element, an aspect associated with a degree of color saturation intermediate between the minimum and maximum degrees of color saturation.

* * * * *